(12) United States Patent
Walker et al.

(10) Patent No.: US 9,241,178 B2
(45) Date of Patent: Jan. 19, 2016

(54) BROADCAST CONTENT VIA OVER THE TOP DELIVERY

(71) Applicant: QUALCOMM Incorporated, San Diego, CA (US)

(72) Inventors: Gordon Kent Walker, Poway, CA (US); Charles N. Lo, San Diego, CA (US); Jun Wang, Poway, CA (US); Daphna Zeilingold, San Diego, CA (US); Joseph P. Barone, San Diego, CA (US); Ed O. Tiongson, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/678,326

(22) Filed: Apr. 3, 2015

(65) Prior Publication Data

US 2015/0215655 A1 Jul. 30, 2015

Related U.S. Application Data

(63) Continuation of application No. 13/802,677, filed on Mar. 13, 2013, now Pat. No. 9,009,764.

(60) Provisional application No. 61/623,398, filed on Apr. 12, 2012, provisional application No. 61/677,243, filed on Jul. 30, 2012.

(51) Int. Cl.
*H04N 21/647* (2011.01)
*H04N 21/2381* (2011.01)
(Continued)

(52) U.S. Cl.
CPC ............ *H04N 21/2381* (2013.01); *H04L 65/00* (2013.01); *H04N 21/235* (2013.01);
(Continued)

(58) Field of Classification Search
CPC .......... H04N 21/647; H04N 21/64707; H04N 21/64738; H04N 21/64723
See application file for complete search history.

(56) References Cited

U.S. PATENT DOCUMENTS 6,108,365 A 8/2000 Rubin et al.
6,625,457 B1 9/2003 Raith
(Continued)

FOREIGN PATENT DOCUMENTS

EP 1549096 A1 6/2005
WO WO-2009044345 A2 4/2009
WO WO-2009146265 A1 12/2009

OTHER PUBLICATIONS

Catt: "Consideration about SFN management", 3GPP TSG RAN WG3 Meeting #55, St. Missouri, USA Louis. vol. R3-070217, No. 55 Feb. 12, 2007, pp. 1-3, XP002495738, Retrieved from the Internet: URL:http://www.quinti1lion.co.jp/3GPP/TSGRAN/TSG_RAN2007/TSG_RAN_WG3_lu2.html [retrieved on Feb. 16, 2007].
(Continued)

*Primary Examiner* — Robert Hance

(57) ABSTRACT

Systems, methods, and receiver devices enable broadcasters with restricted content license areas (e.g., Designated Market Areas ("DMAs") to distribute content via Over the Top ("OTT") IP networks. Embodiments enable client reporting and authentication as well as broadcast content encryption. In an embodiment, information from the client may be reported back to the broadcasters, such as a view history/use report. In an embodiment, hand off between DMAs may be enabled. In an embodiment, local advertisement insertion in network content may be enabled. Embodiments may enable Multicast-Broadcast Single Frequency Network ("MBSFN") operation across DMA boundaries.

15 Claims, 30 Drawing Sheets

(51) Int. Cl.

| | |
|---|---|
| *H04N 21/654* | (2011.01) |
| *H04N 21/258* | (2011.01) |
| *H04N 21/414* | (2011.01) |
| *H04N 21/442* | (2011.01) |
| *H04N 21/45* | (2011.01) |
| *H04N 21/6405* | (2011.01) |
| *H04N 21/6408* | (2011.01) |
| *H04W 4/02* | (2009.01) |
| *H04W 4/06* | (2009.01) |
| *H04W 4/20* | (2009.01) |
| *H04L 29/06* | (2006.01) |
| *H04N 21/235* | (2011.01) |
| *H04N 21/24* | (2011.01) |
| *H04N 21/435* | (2011.01) |
| *H04N 21/643* | (2011.01) |
| *H04N 21/81* | (2011.01) |
| *H04N 21/845* | (2011.01) |

(52) U.S. Cl.
CPC .......... *H04N 21/24* (2013.01); *H04N 21/2402* (2013.01); *H04N 21/2407* (2013.01); *H04N 21/25841* (2013.01); *H04N 21/25875* (2013.01); *H04N 21/25891* (2013.01); *H04N 21/41407* (2013.01); *H04N 21/435* (2013.01); *H04N 21/44204* (2013.01); *H04N 21/4524* (2013.01); *H04N 21/4532* (2013.01); *H04N 21/6405* (2013.01); *H04N 21/647* (2013.01); *H04N 21/6408* (2013.01); *H04N 21/64322* (2013.01); *H04N 21/64707* (2013.01); *H04N 21/64723* (2013.01); *H04N 21/64738* (2013.01); *H04N 21/654* (2013.01); *H04N 21/812* (2013.01); *H04N 21/8456* (2013.01); *H04W 4/02* (2013.01); *H04W 4/021* (2013.01); *H04W 4/06* (2013.01); *H04W 4/206* (2013.01)

(56) References Cited

U.S. PATENT DOCUMENTS

| | | | |
|---|---|---|---|
| 8,023,883 B1 | 9/2011 | Lee et al. | |
| 8,340,011 B2 | 12/2012 | Kenagy | |
| 8,364,540 B2 | 1/2013 | Soroca et al. | |
| 8,599,718 B2 | 12/2013 | Velazquez et al. | |
| 2002/0152090 A1 | 10/2002 | Kobayashi et al. | |
| 2004/0052380 A1 | 3/2004 | Sprunk | |
| 2005/0143098 A1 | 6/2005 | Maillard | |
| 2007/0098165 A1 | 5/2007 | Yoshikawa | |
| 2007/0293249 A1* | 12/2007 | Wang | H04L 12/189 455/466 |
| 2009/0011777 A1 | 1/2009 | Grunebach et al. | |
| 2009/0235309 A1 | 9/2009 | Roe | |
| 2009/0254951 A1 | 10/2009 | Lee et al. | |
| 2010/0011391 A1 | 1/2010 | Carpenter et al. | |
| 2010/0098153 A1 | 4/2010 | McCarthy et al. | |
| 2010/0146530 A1 | 6/2010 | Bolyukh et al. | |
| 2010/0241514 A1 | 9/2010 | Ofek et al. | |
| 2011/0122834 A1 | 5/2011 | Walker et al. | |
| 2011/0138064 A1 | 6/2011 | Rieger et al. | |
| 2011/0154421 A1* | 6/2011 | Chun | H04N 21/2385 725/109 |
| 2011/0173648 A1 | 7/2011 | Perry, II | |
| 2011/0196983 A1 | 8/2011 | Goodmon et al. | |
| 2012/0066321 A1 | 3/2012 | Perry, II | |
| 2012/0174150 A1 | 7/2012 | Reddy et al. | |
| 2012/0263089 A1 | 10/2012 | Gupta et al. | |
| 2013/0007814 A1 | 1/2013 | Cherian et al. | |
| 2013/0182643 A1 | 7/2013 | Pazos et al. | |
| 2013/0276017 A1 | 10/2013 | Walker et al. | |
| 2013/0276035 A1 | 10/2013 | Walker et al. | |
| 2013/0294320 A1* | 11/2013 | Jactat | H04L 12/189 370/312 |
| 2013/0294321 A1 | 11/2013 | Wang et al. | |
| 2014/0068260 A1 | 3/2014 | Oney et al. | |
| 2014/0173643 A1 | 6/2014 | Bhatia et al. | |
| 2014/0201323 A1 | 7/2014 | Fall et al. | |
| 2014/0372624 A1 | 12/2014 | Wang et al. | |
| 2015/0012584 A1 | 1/2015 | Lo et al. | |

OTHER PUBLICATIONS

Ericsson: "SFN area configuration for E-MBMS", 3rd Generation Partnership Project (3GPP); Technicalspecification Group (TSG) Radio Access Network (RAN); Workinggroup 3 (WG3), XX, XX, vol. R3-061505, No. 7.3.4, Oct. 13, 2006, pp. 1-3, XP002476247.

International Search Report and Written Opinion—PCT/US2013/036211—ISA/EPO—Aug. 1, 2013.

Mobile Broadcast Services; OMA-TS-BCAST Services-V1 1-20100720-D, Open Mobile Alliance (OMA), 4330 La Jolla Village Dr., Suite 110 San Diego, CA 92122; USA No. 1.1, Jul. 20, 2010, pp. 1-327, XP064032584, Retrieved from the Internet: URL:ftp/Public_documents/BCAST/Permanent_documents/ [retrieved on Aug. 10, 2010].

NEC: "DISC on MBMS service activation/deactivation further to counting", 3GPP Draft; R2-106488, 3rd Generation Partnership Project (3GPP), Mobile Competence Centre ; 650, Route Des Lucioles; F-06921 Sophia-Antipolis Cedex; France, vol. RAN WG2, No. Jacksonville, USA, Nov. 8, 2010, XP050466202, [retrieved on Nov. 8, 2010].

* cited by examiner

```
<?xml version="1.0" encoding="UTF-8" ?>
<rss version="2.0">
<channel>
    <title>Sample RSS Feed</title>
    <description>An example of a simple RSS feed with enclosed audio file</description>
    <link>http://www.examplerssdomain.com/rss2.0feed</link>
    < lastBuildDate>Thur , 12 July 2012 01:00:00 GMT <lastBuildDate>
    <pubDate  >Sat 7 July 2012 12:00:00 GMT pubDate>
<item>
    <title>Most recent entry in series</title>
        <description>Some example text description to appear in feed readers. </description>
        <link>http://www.examplerssdomain.com/rss2.0feed/entry.html</link>
        <guid   >http://inessential.com/2012/06/13.php#a1 </guid>
        <pubdate   >Fri 6 July 2012 09:00:00 GMT pubdate>
</item>

<enclosure url   ="http://www.weatherservice.com/media/3d.wmv" length="1202163120" type="video/wmv" />

</channel>
</rss>
```

FIG. 10

BROADCAST CONTENT VIA OVER THE TOP DELIVERY

RELATED APPLICATIONS

This application is a continuation of U.S. patent application Ser. No. 13/802,677 filed Mar. 13, 2013, which claims the benefit of priority to U.S. Provisional Patent Application No. 61/623,398 entitled "Broadcast Content Via Over the Top ("OTT") Delivery" filed Apr. 12, 2012 and U.S. Provisional Patent Application No. 61/677,243 entitled "Broadcast Content Via Over the Top ("OTT") Delivery" filed Jul. 30, 2012. The entire contents of each of these applications are hereby incorporated by reference.

BACKGROUND

In a conventional mobile television ("TV") model the mobile TV bearer is a purpose built physical layer operating within the context of an existing fixed television broadcast system, or a dedicated mobile TV network. This conventional mobile TV model has a number of drawbacks. First, there is capital expense to construct and operate a dedicated network. This may be partially alleviated by sharing infrastructure with a fixed television network. However, the fixed television network has a link budget inappropriate to the mobile application (e.g., 10 m outdoor reception as compared to 1.5 m indoor reception). This large difference in link budget results in the need to add a large number of repeaters or single frequency networks ("SFN") transmitters to enhance penetration and coverage area for mobile reception. A second significant limitation to the conventional mobile TV model is that the mobile TV network is in a separate portion of the frequency spectrum from cellular technologies (e.g., 3G, 4G, LTE, etc), and requires both a dedicated receiver and antenna to enable reception, which is an added cost that a wireless operator has no incentive to include. These various drawbacks have limited adoption of mobile TV.

SUMMARY

The systems, methods, and devices of the various embodiments enable broadcasters with restricted content license areas, such as Designated Market Areas ("DMAs") to distribute content via Over the Top ("OTT") Internet protocol (IP) networks. The various embodiments enable client reporting and authentication as well as broadcast content encryption. In an embodiment, information from the client may be reported back to the broadcasters, such as a view history/use report. In an embodiment, hand off between DMAs may be enabled. In an embodiment, local advertisement insertion in network content may be enabled. The various embodiments may also enable Multicast-Broadcast Single Frequency Network ("MBSFN") operation across DMA boundaries.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 10 illustrates a sample code portion of an RSS 2.0 file.

DETAILED DESCRIPTION

Figure 1:
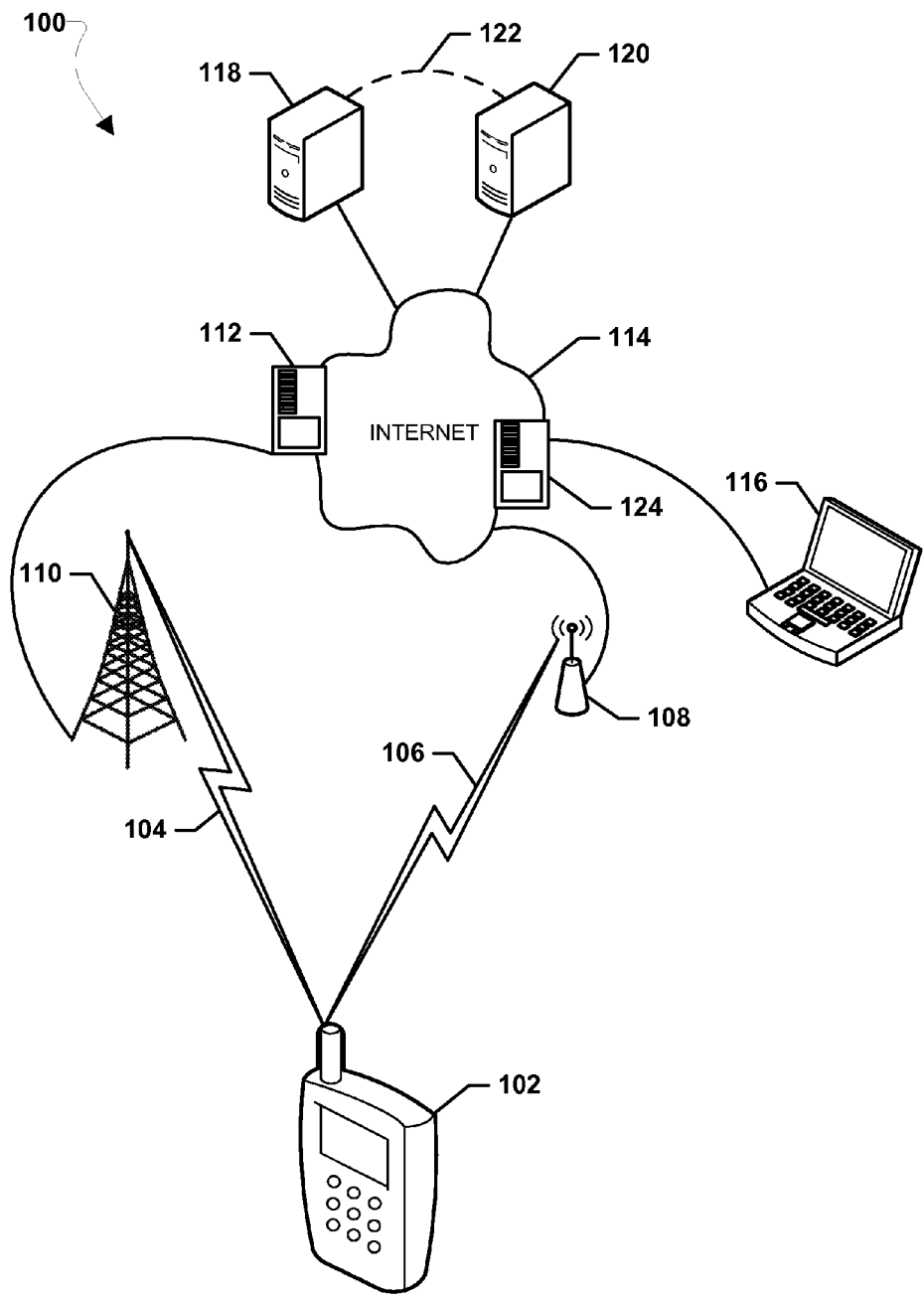
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "receiver device" refers to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic receiver devices which include a programmable processor, memory and circuitry for receiving content via Over the Top ("OTT") Internet Protocol ("IP") networks.

In the conventional mobile television ("TV") model content is delivered via the typical dedicated or derivative physical layer of a TV system. The various embodiments provide systems, methods, and receiver devices to enable OTT delivery of broadcast content as an alternative to the conventional mobile TV model. The various embodiments enable delivery of content via unicast or broadcast mode by a generic IP bearer over IP enabled networks (e.g., 3G, 4G, NG, LTE, eMBMS, Wi-Fi, etc).

The use of a generic IP bearer may overcome the issues associated with the additional costs of a dedicated network and dedicated antenna/receiver system in the receiver device. However, generic IP networks may generally provide access to geographically wide areas, potentially worldwide access, which may raise issues with respect to licensed service areas for broadcast content. As an example, a broadcast station owner/operator in the United States may only have rights to content in a limited number of Designated Market Areas ("DMAs"). A DMA is a geographically restricted license area, and as discussed herein is equivalent to a licensed geographic area for an item of content from a specific provider. Typically, DMAs are of limited size, for example only covering a limited region such as a city or a few counties. A DMA may be further divided into subsections, and the subsections of a DMA may correspond to subsections of the geographically restricted license area (i.e., licensed region). The licensed region in which a broadcast station owner/operator may have rights to broadcast may be comprised of one or more DMAs, subsections or one or more DMAs, and/or combinations of whole DMAs and subsections of DMAs. In some situations, more than one station owner/operator (e.g., affiliate) may have rights to content within a DMA. As an example, in Hawaii a single DMA may be assigned to the entire state, but multiple affiliate stations may have rights to broadcast content within the DMA. In such a situation, DMA's may be broken down into subsections or regions and licenses and revenues may be handled on a per region basis. In other situations, two DMAs may include overlapping coverage areas, and two affiliates may both have rights in an overlapping subsection of their respective DMAs. As an example, in crowded geographic regions, such as the D.C.-Baltimore, Md. region, two affiliates may each be assigned unique DMA's, but because of their close proximity and overlapping coverage areas, there may be well established viewership by individuals in the other DMA.

The rights associated with DMAs may be applied to three categories of content: station produced and owned content, syndicated programming, and network programming. Station produced and owned content are programs and/or shows, such as news or sports programming, that are produced by and wholly owned by the station or station group. Often, no geographic restrictions are associated with station produced and owned content. Syndicated programming includes programs and/or shows that are licensed to the station or station group for the DMAs which are served by the broadcaster and are not affiliated with a specific national television network, such as ABC, NBC, CBS, or Fox. The licenses for syndicated programming are typically restricted to the DMAs for which a station has a Federal Communications Commission ("FCC") broadcast license. Network programming includes programs and/or shows that are licensed based on a license per DMA per national television network, often called the "three letter networks", such as ABC, NBC, CBS, or Fox. Network programming licenses are typically restricted to the DMAs for which a station has an FCC broadcast license.

In order for a broadcast station or station group to deliver the normally radiated programming via the Internet, the broadcast station or station group may be required to honor the restrictions of their various content licenses. Additionally, there may be specific restrictions associated with target receiver device types, such as, but not limited to, resolution, bit rate, and/or frame rates.

In order to nominally honor the broadcast station license, one or more of the following may be required to be maintained: a restriction of reception to the geographic area of the licensed DMA for syndicated and network content; any license restrictions related to class of receiver device (e.g., computer, tablet, phone, etc); and/or any license restriction related to delivery methods (e.g., wired, wireless, wide area, etc).

To make an OTT broadcast enabled receiver device acceptable to mobile receiver device users, one or more of the following functions may be enabled in a mobile receiver device: an ability to handoff from one network affiliate to another upon crossing a DMA boundary; unified method(s) for acquiring and viewing programming schedules; and/or a simplified method for establishing service at the mobile receiver device.

One or more of the following functions may enable mobile television to be a profitable enterprise for a station owner: an ability to track viewing behavior, such as for the purposes of generating ad revenue; and/or reliable delivery of viewing reports to the applicable station and/or station group.

Another embodiment provides a method for managing the issues associated with hand off across a DMA boundary for OTT television content (e.g., three letter network content) suitable when the affiliates synchronize at least some of the content broadcasts across DMA boundaries. Often all or most of the affiliates broadcast the three letter network content at a specific time, and this time is often synchronized across multiple DMAs. For example, live network television content, such as sporting events, competition shows, etc., may often be broadcast at the same time by affiliates in the same region (e.g., same time zone). For example, the three letter network content may be delivered by a national television network server, while station produced and/or syndicated programming may be delivered by a server associated with each broadcaster for a specific DMA service area. In an embodiment, when an affiliate broadcaster for a specific DMA chooses to broadcast network content rather than providing the content from its own server, the affiliate broadcaster's server may redirect content requests to the national television network server. When multiple affiliate broadcasters for multiple different DMAs all redirect content to the same national television network server, functionally the multiple different DMAs may all provide the same content.

In an embodiment in which a network operator uses enhanced Multimedia Broadcast Multicast Services ("eMBMS") to deliver OTT television content to wireless receiver devices in various DMAs, the delivery of the same content to adjacent DMAs may present an opportunity to unify Multicast-Broadcast Single Frequency Networks ("MBSFNs"). Unifying MBSFNs may be advantageous because the transition from one MBSFN to another may be streamlined and/or eliminated, the transition region between adjacent DMAs may see Single Frequency Network ("SFN") gain rather than interference, efficiency of the eMBMS network may be increased, and continuous coverage may be provided across DMA boundaries for traveling wireless receiver devices.

While network content may be synchronous across DMA boundaries, the syndicated content and the station generated content often do not run synchronously across DMA boundaries. After delivering network content for a period of time, when DMAs transition to syndicated and/or station generated content, two DMAs in a MBSFN may be delivering different content. In an embodiment, when two DMAs in the same MBSFN are delivering different content, the MBSFN may be split into two different MBSFNs, one for each DMA. The eMBMS network may identify the delivery of different content based on the redirect that may occur when a receiver device transitions from receiving OTT content from a national network server to a server associated with the broadcaster for a specific DMA service area.

An eMBMS network operator may transition the network MBSFN configuration based on published television programming schedules, such as web based schedules provide by Tribune Media Services. However, published television programming schedules may be inaccurate. For example, while two DMAs may be scheduled to air a national network provided program at the same time, a live sporting event broadcast in one of the DMAs may overrun its allotted time and the local affiliate broadcaster for that DMA may not transition to delivering the network content until the event finishes. Because published television programming schedules may be inaccurate, two broadcasters for two DMAs in a combined MBSFN created based on the published television programming schedules may not actually be broadcasting the same television content. In an embodiment, the eMBMS network operator may recognize the content for the two DMAs is not the same, and may separate the combined the MBSFN into separate MBSFNs. In an embodiment, the receiver device may report its current DMA, and the network operator may identify all DMA's taking service from a given server. In this manner, if two DMA's are taking service from different servers, their MBSFNs may be separated. However, this method of receiver devices reporting their current DMA may not be desirable because it may require a unicast transaction. In an embodiment, a back-off scheme may be employed so only a few receiver devices report their current DMA at a time. In a further embodiment, after identifying the content broadcast in a DMA, the network operator servers and/or broadcast servers may send a message to any receiver devices in a DMA to terminate further reporting.

In an embodiment, a receiver device may be required to report its current DMA in the view history so that the correct affiliate receives viewing credit even though two or more affiliates are sharing a single MBSFN for delivering OTT television content. In an embodiment, as a receiver device crosses a DMA boundary, the receiver device may log and report the DMA change. In an embodiment, view histories for different DMAs may be aggregated together, and reported back to a central server. Such aggregated reporting may be advantageous because only one radio connection in the network may be required, rather than one connection per station, per DMA, and/or per report.

The network programming feed may include local advertisement availabilities or "ad avails." The local ad avails may be commercials in the network programming feed that are optional for the local affiliate broadcaster. The local affiliate broadcaster may have the option to air the existing network provided commercial and receive whatever payment is associated with airing the network provided commercial, or the local affiliate broadcaster may sell an ad avail to a local advertiser and air the local advertiser's commercial. In an embodiment, receiver devices on an eMBMS network may be required to always display the network provided commercial. In another embodiment, local advertiser's commercials may be provided in advance to the receiver device, such as delivery via the eMBMS network, and during the ad avail the receiver device may display the previously provided local advertiser's commercial. The receiver device may report the actual add that was displayed, such as in a view history report. In another embodiment, a local affiliate broadcaster may stream commercials on a per DMA basis in a real time local ad delivery stream. During an ad avail, the receiver device may transition to the local ad delivery stream. Such an embodiment may be particularly suited for use with a DASH player. In a local ad delivery stream embodiment, stream segments may be of integer lengths that are factors of standard advertising 15 second boundaries (i.e., 1, 3, or 5 second segments) and the segments of the local ad delivery stream and network programming stream may be aligned.

FIG. 1 illustrates a network system 100 suitable for use with the various embodiments. The network system 100 may include a wireless receiver device 102, such as a smart phone, a wired receiver device 116, such as a laptop, and server(s) 118, 120 connected to the Internet 114. The wireless receiver device 102 may establish a wireless connection 106 with a wireless access point 108, such as a Wi-Fi access point. The wireless access point 108 may connect with the Internet 114. Additionally, the wireless receiver device 102 and a cellular tower or base station 110 may exchange data via a cellular connection 104, including CDMA, TDMA, GSM, PCS, 3G, 4G, LTE, or any other type connection. The cellular tower or base station 110 may be in communication with a router 112 which may connect to the Internet 114. In this manner, via the connections to the wireless access point 108, cellular tower or base station 110, and/or Internet 114, data may be exchanged between the wireless receiver device 102 and the server(s) 118, 120. The wired receiver device 116 may be in communication with a router 124 which may connect to the Internet 114. In this manner, via the connection to the Internet 114, data may be exchanged between the wired receiver device 116 and the server(s) 118, 120. Servers 118, 120 may be connected to the Internet 114, enabling the servers 118 and 120 two exchange data with each other. The servers 118 and 120 may also be directly connected to each other via a direct or dedicated network 122, such as an Ethernet connection over which the servers may exchange data with each other.

Figure 2:
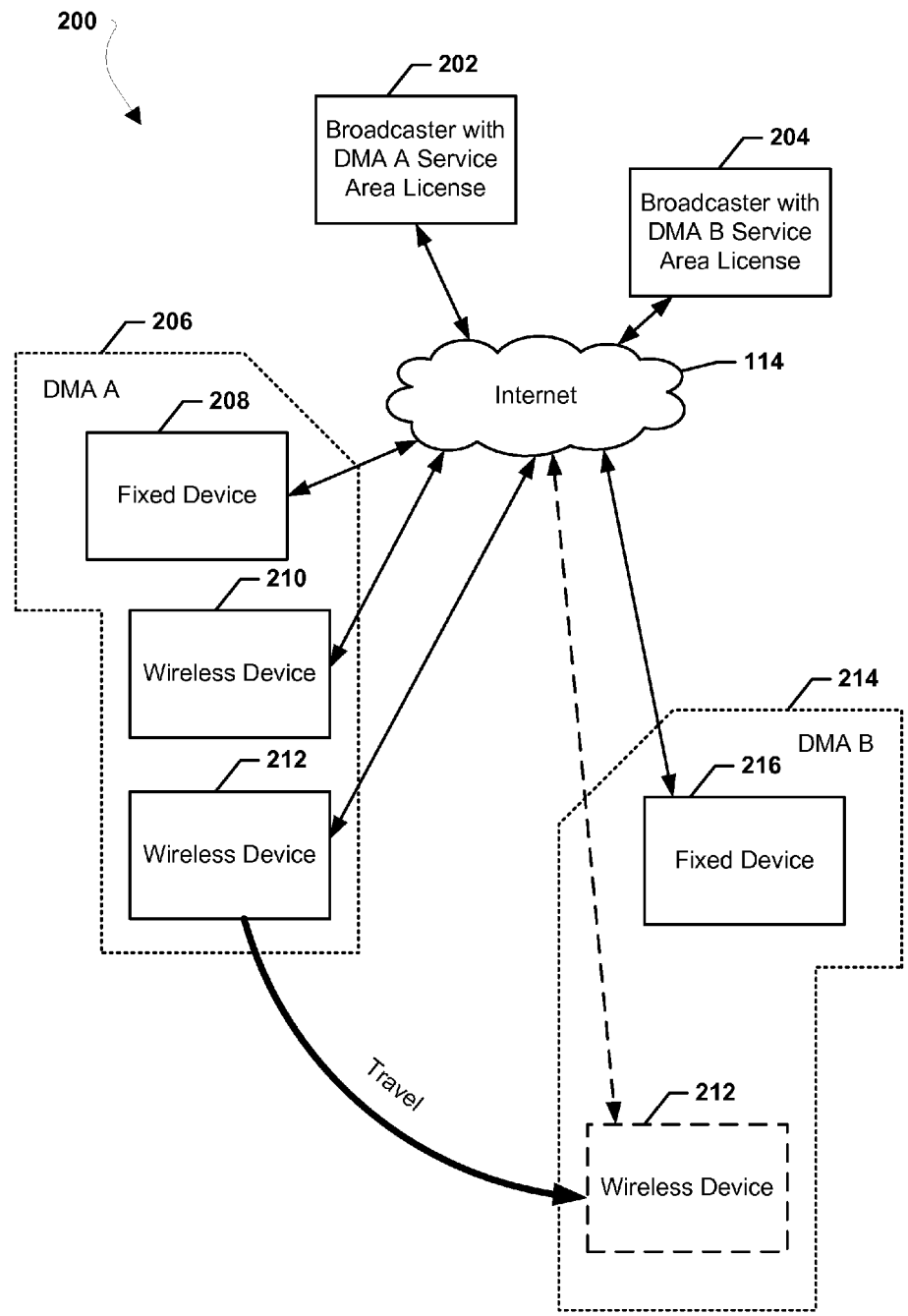
FIG. 2 is a system block diagram of an OTT system according to an embodiment.

FIG. 2 illustrates an embodiment OTT system 200 suitable for use with the various embodiments. FIG. 2 illustrates a potential relationship between content receivers, fixed receiver devices 208, 216, wireless receiver devices 210, 212, and content broadcasters 202, 204. One broadcaster 202 may have a license for a specific service area, such as a service license for DMA A 206, which may specify a fixed geographic area in which the broadcaster 202 may broadcast content. In the example illustrated in FIG. 2, DMA A corresponds to the area covered by the broadcaster's 206 FCC license. Another broadcaster 204 may have a license for a different specific service area, such as a service license for DMA B 214, in which the broadcaster 204 may broadcast content. In an embodiment, the broadcasters 202, 204 may broadcast their content to receiver devices in their respective licensed areas, i.e., DMAs 206, 214, via the Internet 114. Thus, receiver devices located in the broadcaster's DMA may receive content from that broadcaster, so fixed receiver device 208, wireless receiver device 210, and wireless receiver device 212 located in DMA A 206 may receive content from the broadcaster 202, and fixed receiver device 216 located in DMA B 206 may receive content from broadcaster 204. Occasionally, a mobile receiver device, such as wireless receiver device 212, may travel from one broadcaster service area to another, such as from DMA A 206 to DMA B 214, in which case the wireless receiver device 212 may switch from receiving content from broadcaster 202 to receiving content from broadcaster 204. In an embodiment, once the wireless receiver device 212 has traveled from DMA A 206 to DMA B 214, the wireless receiver device 212 may be prevented from effectively displaying content from the first broadcaster 202 since the wireless receiver device is outside of that broadcaster's DMA.

Figure 3:
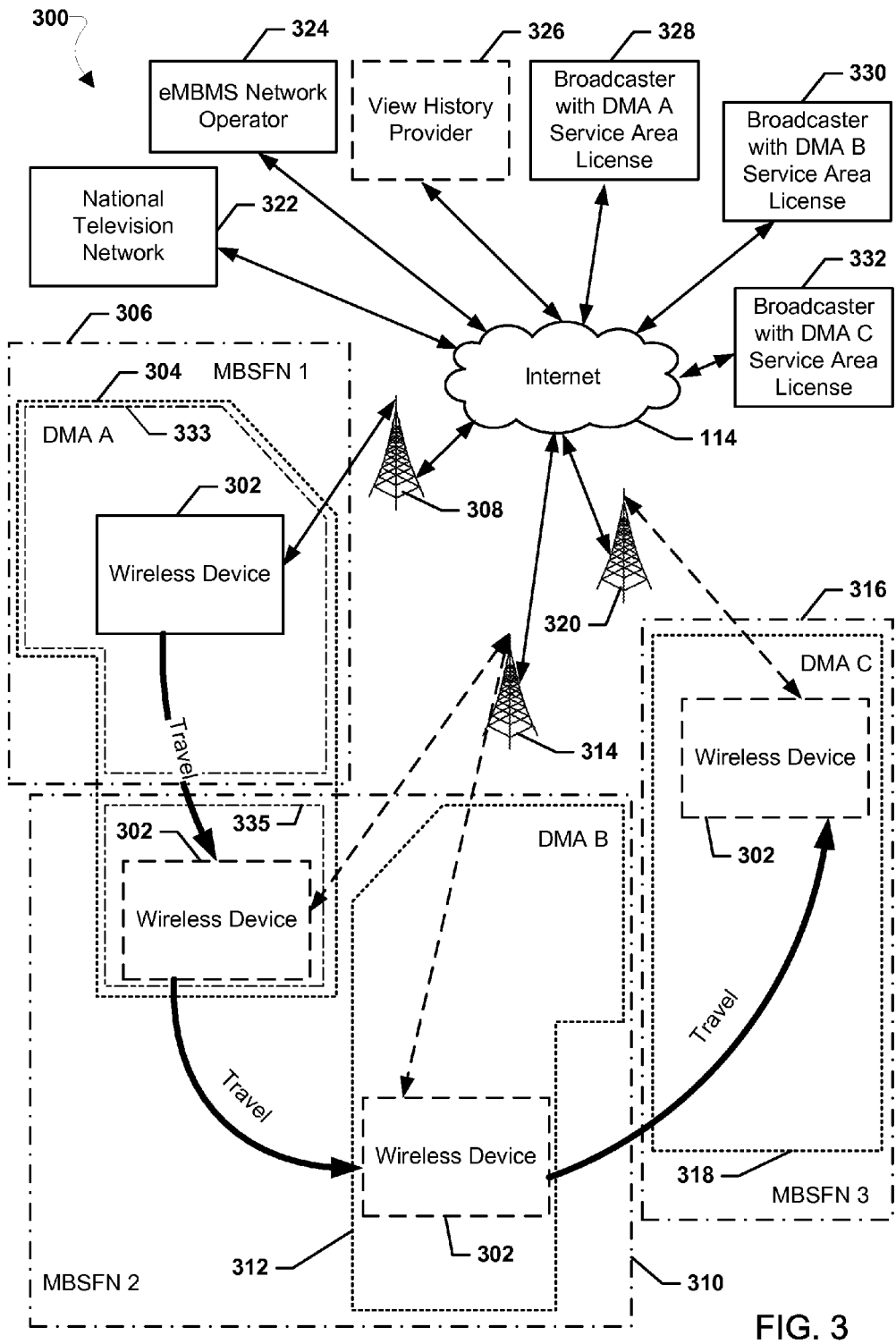
FIG. 3 is a system block diagram of another OTT system according to an embodiment.

FIG. 3 illustrates an embodiment OTT system 300 showing a relationship between a wireless receiver device 302, content providers, broadcasters 328, 330, 332, a national television network 322, a wireless network provider, and an eMBMS network operator 324. One broadcaster 328 may have a license for a specific service area, such as a service license for DMA A 304, which may specify a fixed geographic area in which the broadcaster 328 may broadcast content. In an embodiment, a DMA may be further broken down into subsections or regions. As an example, DMA A 304 may include two subsections, DMA subsection 333 and DMA subsection 335. Another broadcaster 330 may have a license for a different specific service area, such as a service license for DMA B 312, in which the broadcaster 330 may broadcast content. A third broadcaster 332 may have a license for a third specific service area, such as a service license for DMA C 318. In an embodiment, the broadcasters 328, 330, 332 may broadcast their content to receiver devices in their respective licensed areas, i.e., DMAs 304, 312, 318 via the Internet 114. In another embodiment, different broadcasters may have service licenses for different subsections of the same DMA. In another embodiment, a broadcaster may have service licenses for combinations of whole DMAs and subsections of DMAs.

The broadcasters 328, 330, 332 may be local affiliate broadcasters of a national television network 322 (e.g., a three letter network, such as NBC, CBS, ABC, FOX, etc.). The national television network 322 may broadcast network content via the Internet 114. In an embodiment, the broadcasters 328, 330, 332 may broadcast network content by redirecting content requests received via the Internet 114 to the national television network 322. For example, when a broadcaster 328 is broadcasting network content, a content server of the broadcaster 328 may redirect content requests from receiver devices to an address (e.g., a Uniform Resource Locator ("URL")) of a server of the national television network 322. In an optional embodiment, the broadcasters 328, 330, 332 and/or the national television network 322 may receive view history reports from an optional view history provider 326.

In an embodiment, the wireless receiver device 302 may connect to the Internet 114 via an eMBMS network comprised of various nodes 308, 314, 320 controlled by an eMBMS network operator 324. The eMBMS network operator 324 may control the operation of the various nodes 308, 314, 320 and the overall eMBMS network to dynamically create one or more MBSFNs, such as MBSFN 1 306, MBSFN 2 310, MBSFN 3 316, etc. In an embodiment, the MBSFNs 306, 310, 316 need not correspond directly to the DMAs 304, 312, 316 or DMA subsections 333 and 335. As an example, FIG. 3 illustrates MBSFN 1 306 encompassing only a portion of DMA A 304, MBSFN 2 310 encompassing a portion of DMA A 306 and all of DMA B 312, and MBSFN 3 316 encompassing all of DMA C 318. The MBSFNs 306, 310, 316 may be created, merged, split, and/or eliminated at the direction of the eMBMS network operator 324. In an embodiment, the eMBMS network operator 324 may monitor the traffic across the eMBMS network, such as inspecting packets via deep packet inspection, receiver device reporting, etc. In an embodiment, different MBSFNs may encompass different subsections of a given DMA.

When a wireless receiver device 302 travels within a broadcaster service area, such as from a first position in DMA A 304 to a second position in DMA A 304, it may transition from a first MBSFN 1 306 to a second MBSFN 2 310. In an embodiment, the transition from MBSFN 1 306 to MBSFN 2 210, may require the wireless receiver device 302 to establish a new connection in the eMBMS network and make a new request for content from broadcaster 328 for DMA A 304.

In an embodiment in which the same MBSFN 2 310 provides service to wireless receiver devices 302 in two or more DMAs, such as DMA A 304 and DMA B 312, and the content provided by broadcasters 328 and 330 is the same (e.g., network content from the national television network 322), a wireless receiver device 302 traveling from one broadcaster service area to another, such as from DMA A 304 to DMA B 312 may be allowed to continue to display the content from DMA A 304 even though the wireless receiver device 302 changed DMAs. This method eliminates the transition between DMAs.

When a wireless receiver device 302 travels from one broadcaster service area to another, such as from DMA B 312 and MBSFN 2 310 to DMA C 318 and MBSFN 3 316, the transition may require the wireless receiver device 302 to establish a new connection with the eMBMS network and make a new request for content from broadcaster 332 for DMA C 318. In an embodiment, the eMBMS network operator 324 may monitor the connections of the wireless receiver device 302. In an embodiment, in which broadcasters 330 and 332 are redirecting content requests from DMA B 312 and DMA C 318 to the same national television network 322 content, the eMBMS network operator 324 may recognize that wireless receiver device 302 is receiving the same content in DMA C 318 it previously received in DMA B 312. In response to recognizing that the content that will be received in adjoining DMAs is the same, the eMBMS network operator 324 may merge the two MBSFNs, such as MBSFN 2 310 and MBSFN 316, to form a single combined MBSFN.

Figure 4A:
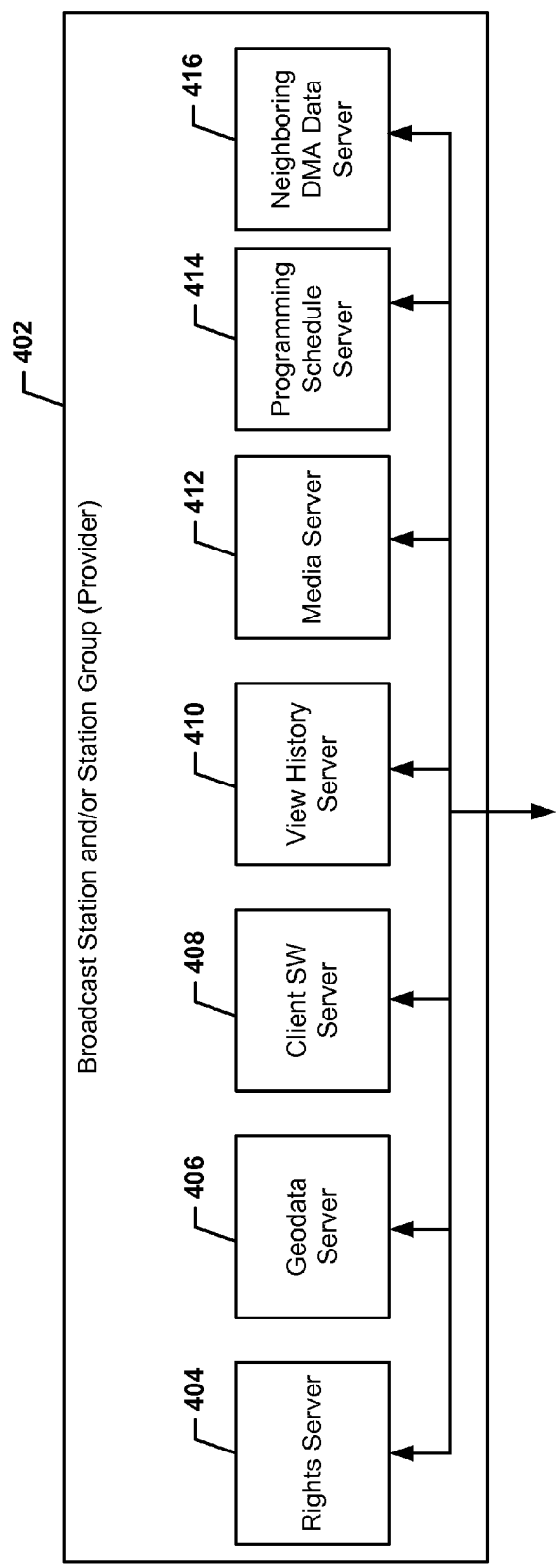
FIG. 4A is a block diagram of an embodiment OTT broadcast station and/or station group provider system.

FIG. 4A illustrates an embodiment broadcast station and/or station group (provider) system 402. In an embodiment, the broadcast station and/or station group provider system 402 may include various servers, or a single server, enabled to execute multiple functions. In an embodiment, the broadcast station and/or station group provider system 402 may be concentrated in a broadcast television station physical plant. The broadcast station and/or station group provider system 402 may include a rights server 404, a geographical data server 406, a client software (SW) server 408, a view history server 410, a media server 412, a programming schedule server 414, and a neighboring DMA data server.

The programming rights and schedule server 414 may be either an internal or remote function generally utilizing the Program and System Information Protocol ("PSIP") Advanced Television Systems Committee ("ATSC") or other standardized format directly or translated to second format such as OMA (Open Mobile Alliance). A key difference of programming and rights distribution may be the geographic aspect of rights. The rights may be defined in a hierarchical basis, for example, globally down to a per DMA level. Smaller rights territories within a DMA or smaller areas may also be defined. The reference to rights area may be abstracted (e.g., the area might be described in X-Y latitude and longitude coordinates while the reference is DMA X). In this manner, the bulk in communicating the coverage of the DMA may be reduced. In an embodiment, the abstraction of the rights may have a common definition. That is, all stations may use the same set of defined territories, which may allow a programming guide to merely list the abstracted names on a per program basis. In an embodiment, DMA naming may match FCC designation (i.e., FCC ID). In another embodiment, DMAs may also be detailed within an XML structure and compressed via existing methods of text compression, such as zip.

The view history server 410 may similarly either be an internal or remote function. The primary function of the view history server 410 may be to collect viewing history from registered clients and/or receiver devices. The actual format of the view history may be either per an existing standard such as OMA, or a custom standard. The primary requirement for the view history server 410 may be that the station, or its designee, exclusively receives the viewing reports for a registered user's client or receiver device. This may be accomplished via systems of reporting URLs and authentication, which may be established when a user registers for service.

The neighboring DMA data server 416 may similarly be an internal or remote function. The primary function of the neighboring DMA data server 416 may be to provide data regarding neighboring DMAs adjacent to the current DMA. The data regarding neighboring DMAs may enable a receiver device to predict the next DMA that it may enter. In an embodiment, neighboring DMA data may be distributed as neighboring DMA lists sent to receiver devices along with other DMA, station and/or station group, and/or service metadata. In an embodiment, the prediction regarding the next DMA that may be entered may be made based on calculations performed at the neighboring DMA data server 416. In an embodiment the prediction regarding the next DMA that may be entered may be made based on distance calculations and/or map data.

Figure 4B:
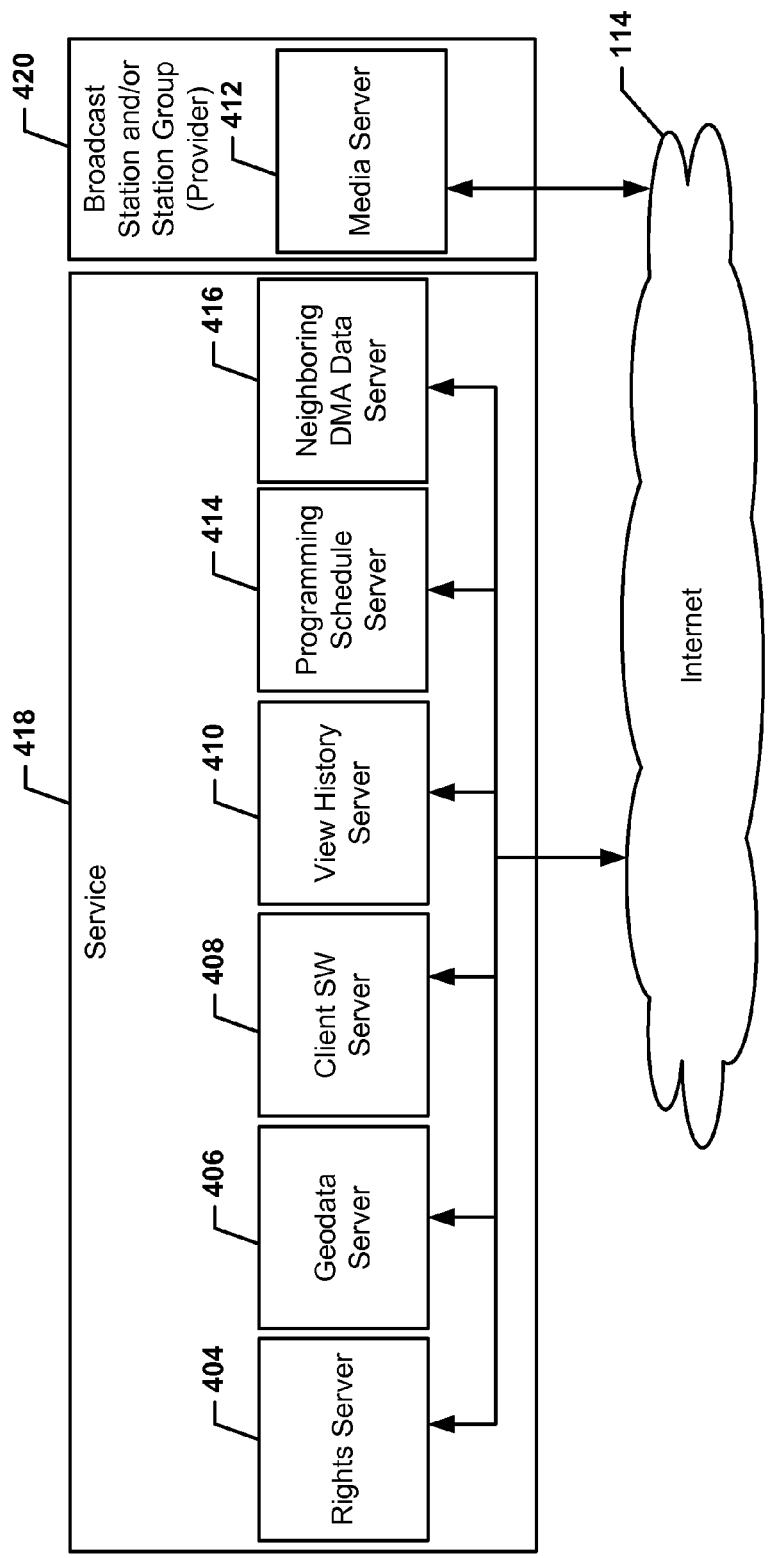
FIG. 4B is a block diagram of another embodiment OTT broadcast station and/or station group provider system.

FIG. 4B illustrates an embodiment in which the broadcast station and/or station group (provider) system 420 may only include the media server 412. A service system 418, such as a subscription service with which broadcasters may register him, may include a rights server 404, a geographical data server 406, a client SW server 408, a view history server 410, a programming schedule server 414, and a neighboring DMA data server 416. In an embodiment, the service system 418 may not be associated with the physical plant of the broadcast station. The media server 412 may be associated with the physical plant of the broadcast station if forward haul of content to the media server 412 may be more efficient than a remote location. In another embodiment, the media server 412 may not be associated with the physical plant of the broadcast station. In an embodiment, the physical location may be arbitrary and functions may be lumped together based on bandwidth requirements. As an example, media server functions and geodata server functions may be lumped together in one physical location or server because such functions may have the two highest bandwidth requirements.

Figure 5:
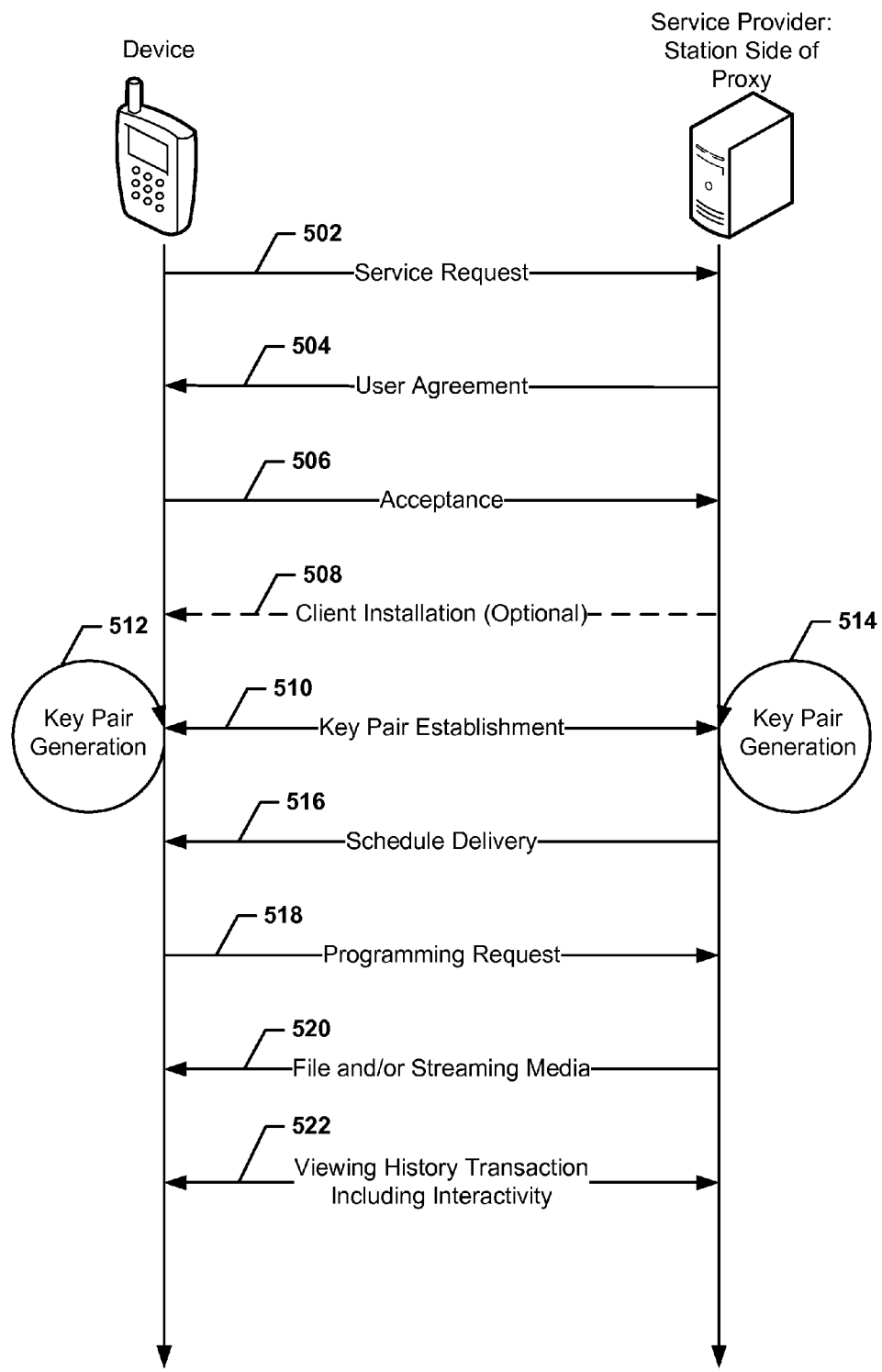
FIG. 5 illustrates an embodiment call flow relationship between a wireless receiver device and a service provider.

FIG. 5 illustrates an embodiment call flow relationship between a wireless receiver device and a service provider, such as a station side server and/or proxy server. A client-server relationship may exist for users receiving service from a given station and/or programming entity. At an initial time, a user may utilize his or her IP enabled wireless receiver device to locate a potential service provider. Upon locating a service provider, the wireless receiver device may send a service request 502 to the service provider. The service provider may send a user agreement 504 to the wireless receiver device. The user may accept the user agreement, and the wireless receiver device may send an acceptance indication 506 to the service provider. In an embodiment in which the wireless receiver device may be running a automatic DMA service establishment application (e.g., a "DMA service genie"), user agreements 504 may be continually received as the wireless receiver device approaches adjacent DMAs, and acceptance indications 506 may be sent automatically from the wireless receiver device to the service provider each time the wireless receiver device crosses a DMA boundary. In a further embodiment, though multiple user agreements 504 may be received, the DMA service genie may only send acceptance indications 506 to service providers required to facilitate a seamless handoff as the wireless receiver device moves from one DMA to another. In an optional embodiment, the service provider may send a client application 508 to the wireless receiver device, and the wireless receiver device may install the client application 508. As an example, the user, upon connection with a station client server, may accept the terms of service and downloaded the client application 508. In an embodiment, the client may be available from many potential content providers, and/or may be delivered entirely by a third party via redirection. In an embodiment, the client application may be designed according to the operating system ("OS") of the wireless receiver device, and the client application's distribution may be per the defined security mechanisms of the operating system. In an alternative embodiment, the client function may be written directly into the service layer of the wireless receiver device, in which case a download of an application may not be required. The service providing server and the wireless receiver device may exchange information to establish key pairs 510 for the receiver device and the station side of the interface. Utilizing the information to establish key pairs 510, the wireless receiver device may generate its key pair 512 and the service may generate its key pair 514. The key pairs 512, 514 may be utilized to authenticate and/or encrypt transactions between the station server or agent and the receiver device side client. In an embodiment in which unicast service is supplied to the wireless receiver device, the wireless receiver device may obtain necessary service keys using the key pair. In an embodiment, this may be an infrequent occurrence as broadcast program keys may be encrypted in periodic unicast keys, e.g., unicast keys that expire monthly or at other periodic intervals.

In an embodiment, the provider may identify the applicable DMAs (i.e. service areas) for a station or station group upon client installation, such as via a schedule delivery 516 to the wireless receiver device. In an embodiment, the wireless receiver device may send a programming request 518 to the service. The service may send the file and/or streaming media 520 to the wireless receiver device. The viewing history transaction 522 may be sent from the wireless receiver device to the service. In an embodiment, the communication of program schedules and rights may be conducted on a per registered server basis. In an embodiment, the actual connection may in fact be redirected to a caching server, and a caching proxy may deliver all programming guide information for all registered stations at the same time. In an embodiment, the programming schedule and rights files may be signed by the posting entity prior to delivery to the receiver devices. In another embodiment, the station may broadcast its own schedules.

The unicast method may enable the system to function for wireless receiver devices that have been out of coverage, without requiring the wireless receiver devices to scan all the registered stations. In an embodiment, the stations may announce their DMA in their programming. In an embodiment, each wireless receiver device may announce its present DMA when contacting a schedule server. In an embodiment, the receiver device side client may authenticate the program schedules and rights. In an embodiment, the wireless receiver device may accept unsigned program and rights records, but the station may only enable a registered wireless receiver device to take service. In an embodiment, the service may require, such as by a service agreement, that the wireless receiver device report its viewing history to the service, including any related object or screen viewing accomplished via interactive links executed on the wireless receiver device. In an embodiment, for unicast delivery, the source server may log a transaction as it occurs.

In an embodiment, a wireless receiver device side client may automatically register with all providers in a DMA. In another embodiment, the wireless receiver device side client may register with service providers and/or accept service from service providers based on user selections of service providers. In an embodiment, a central proxy server may act as a clearinghouse for all or a portion of the service providers in a DMA. In such an embodiment, the wireless receiver device side client may interact with the proxy server to register for and/or access content from the various service providers. In this manner, the wireless receiver device may interact with a single proxy server rather than multiple service providers to register for service and/or access content.

In an embodiment, the wireless receiver device may be pre-provisioned with a service layer or client application at the time of manufacture. The generation of the signing and encryption key pairs may be reserved for the first contact with the service provider, when the signing and encryption keys may be generated. In an embodiment, the wireless receiver device may operate with unsigned keys identified by the subscribing unit ID and the provider ID, respectively. In an embodiment, unit IDs may be created from unit unique information, such as the wireless receiver device's MAC address and/or phone number. In a further embodiment, unit IDs may include unit unique information hashed and/or concatenated with externally inaccessible data, such as time of transaction and/or process remainders (e.g., least significant bits of assorted processes with noise like distributions).

Figure 6:
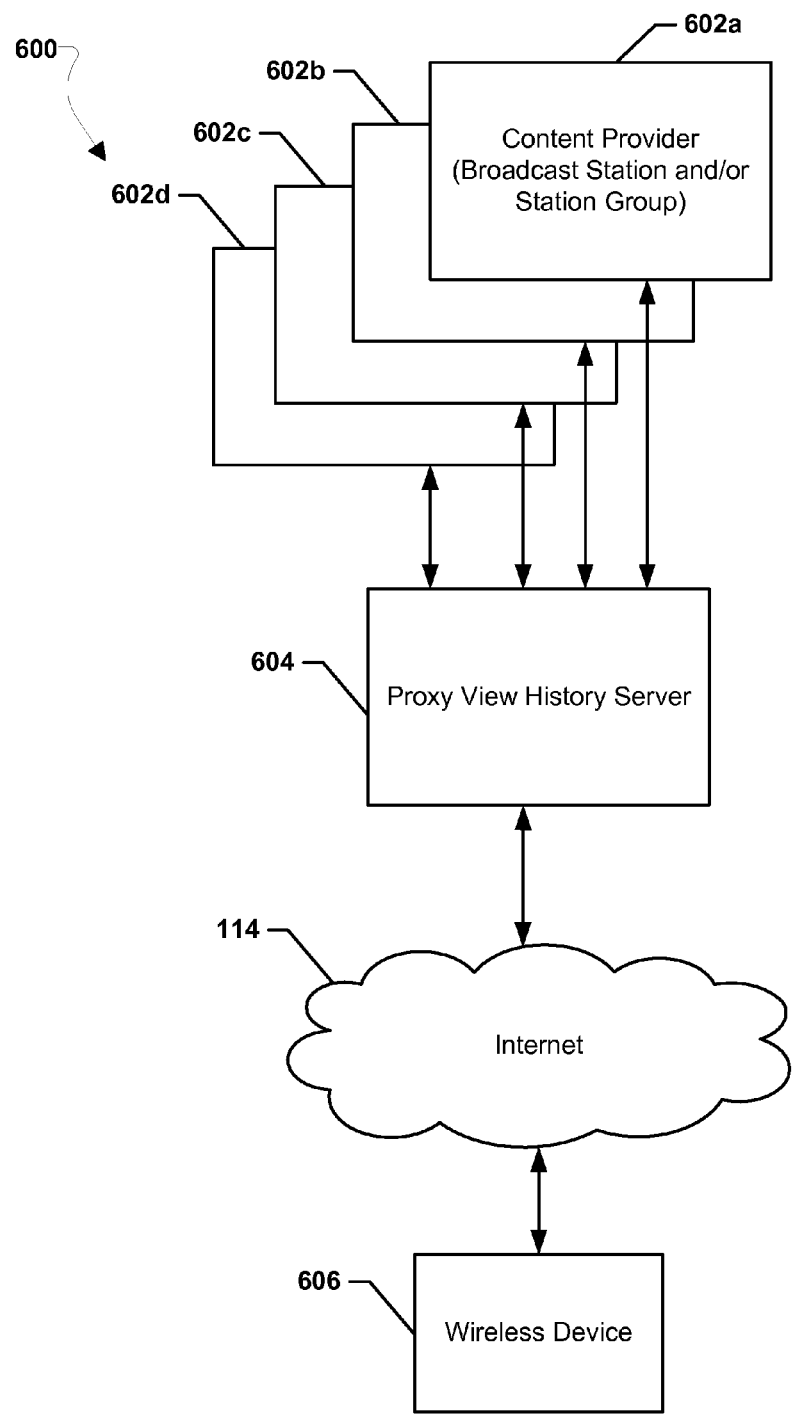
FIG. 6 is a block diagram of an embodiment broadcast system.

FIG. 6 illustrates an embodiment broadcast system 600 in which content providers 602*a*, 602*b*, 602*c*, 602*d*, may be in communication with a central proxy view history server 604. In an embodiment, the view history server 604 may function as a caching or proxy server which may collect the viewing history from the wireless receiver device 606 via the Internet 114 and deliver monthly keying information as an aggregate for a DMA or collection of DMAs or station groups 602*a*, 602*b*, 602*c*, 602*d*. In an embodiment, these records may be consolidated into a single file or delivered on a per-provider, per DMA basis. In an embodiment, these records may be encrypted and signed per provider 602*a*, 602*b*, 602*c*, 602*d*. In an embodiment, the proxy server 604 may have a separate signing and encryption key pair. In an alternative embodiment, if per provider encryption and signing are used, separate signing and encryption key pairs may not be necessary. Encryption and signing may occur on a per DMA basis because a wireless receiver device 606 may generate data in a few DMAs per month.

Figure 7:
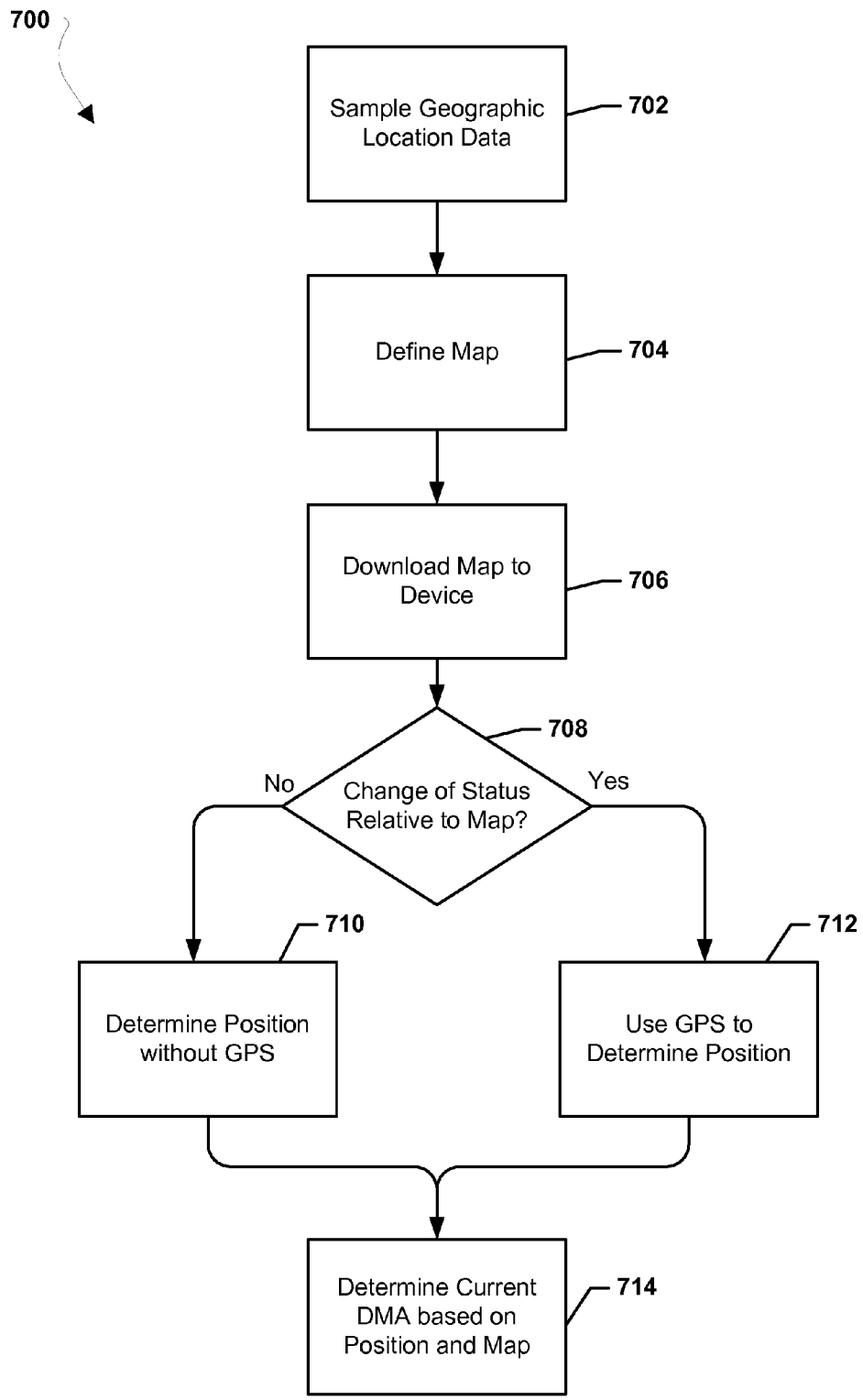
FIG. 7 is a process flow diagram illustrating an embodiment method for determining the current DMA in which a receiver device may be located.

FIG. 7 illustrates an embodiment method 700 for determining the current DMA in which a receiver device may be located. In block 702 geographic location data may be sampled. Various methods for sampling geographic location data may be used, such as a Global Positioning System (GPS) receiver, IP address mapping, Wi-Fi SSID, and eNB mapping. In block 704 the sampled geographic location data may be used to define a DMA map. In an embodiment, sampled GPS data may be used to construct IP and eNB IP map(s) for individual DMA(s). In another embodiment, sampled geographic data may be used to construct various maps, such as cell ID, Wi-Fi SSID, and latitude/longitude maps. In block 706 the DMA(s) map(s) may be downloaded to the wireless receiver device. In an embodiment, GPS may only be used intermittently to determine the position of the wireless receiver device. In this manner, power consumption may be minimized. In determination block 708 the wireless receiver device may determine whether there has been a change of status relative to the downloaded map. In an embodiment, an indication of a change of status relative to the downloaded map may be an indication that the wireless receiver device has traveled beyond the area covered by the downloaded map. As an example, the wireless receiver device may determine if it is moving. In an embodiment, motion may be determined by recognizing a change in eNB ID, and/or by accelerometers on the wireless receiver device. As an example, motion may indicate that the wireless receiver device may be in a vehicle and a change of status may be likely, while no motion may indicate that no change of status has occurred.

If no change of status is detected (i.e., determination block 708="No"), in block 710 the wireless receiver device may determine its position without GPS. In an embodiment, the wireless receiver device may use IP and/or eNB to determine the position of the wireless receiver device. In this manner, receiver devices that do not move or otherwise change their status may be restricted to or only need to implement non-GPS determinations, such as IP and or eNB determinations, since such determinations will be sufficient to confirm that the wireless receiver device has not moved out of the DMA. As an example, eNB addresses may be discrete, while IP addresses are likely address ranges.

If a change of status is detected (i.e., determination block 708="Yes"), in block 712 the wireless receiver device may use GPS to determine its position. In block 714 the wireless receiver device may determine the current DMA based on its determined position and the downloaded map. In alternative embodiments, a variety of other methods may be used, individually or collectively, to determine the location of a wireless receiver device.

Figure 8:
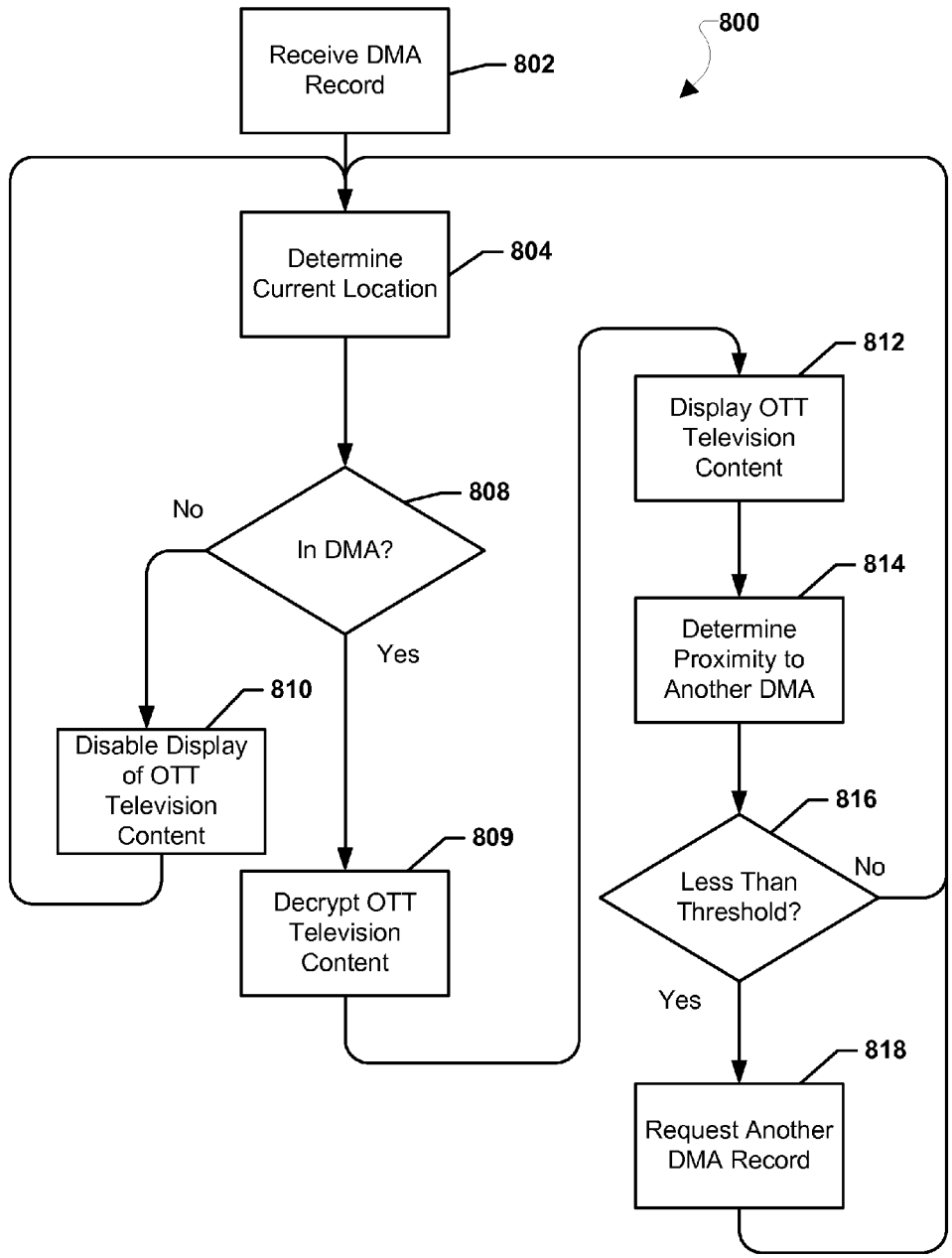
FIG. 8 is a process flow diagram illustrating an embodiment method for delivering OTT television content to a receiver device.

FIG. 8 illustrates an embodiment method 800 for delivering OTT television content to a receiver device. In an embodiment, the method 800 may be performed by the processor of a receiver device, such as a wireless receiver device 102 described above. In block 802 the receiver device may receive a DMA record. In an embodiment, the DMA record may be received in response to a DMA record request initiated by the receiver device. As an example, a DMA record request may be initiated automatically upon start up of an OTT client on the receiver device. In another embodiment, the DMA record may be stored in a memory of the receiver device and may be received via a URL linking to the location of the DMA record. In an embodiment, the DMA record may be a map of a DMA, a portion of a DMA, and/or multiple DMAs, including information about the boundaries between DMAs. In an embodiment, a DMA record may be a record associated with a subsection of a DMA. In another embodiment, a DMA record may be associated with combinations of whole DMAs and subsections of DMAs. In block 804 the receiver device may determine its current location. As an example, the receiver device may use a GPS receiver to determine its current latitude and longitude. In determination block 808 the receiver device may determine whether the receiver device is within the DMA. In an embodiment, the receiver device may determine whether the receiver device is located within the DMA based on the current location of the receiver device and the DMA record. As an example, to determine whether the receiver device is within the DMA the receiver device may compare its current location to a map of the DMA in the DMA record. If the current location of the wireless receiver device is not within the DMA (i.e., determination block 808="No"), in block 810 the receiver device may disable the display of OTT television content and the receiver device processor may return to block 804. In this manner, if the receiver device is not within the DMA, content may not be displayed, and the broadcaster may be able to comply with geographic licensing requirements associated with the DMA.

If the current location of the wireless receiver device is within the DMA (i.e., determination block 808="Yes"), the receiver device may decrypt the OTT television content in block 809. In an embodiment, the decryption may be linked to the current DMA. In block 812 the receiver device may display the OTT television content. In this manner, only receiver devices actually located within the DMA may display the OTT television content and the decryption of the OTT television content may be performed repeatedly (e.g., more frequent than a once per program basis) in conjunction with determining the receiver device is in the DMA. In block 814 the receiver device may determine its proximity to another DMA. In an embodiment, the receiver device may compare its current location to a boundary of the DMA within the DMA record to determine a distance between the current location and the DMA boundary. In determination block 816, the receiver device may compare its proximity to another DMA to a threshold value. In an embodiment, the threshold value may be a value stored in a memory of the receiver device corresponding to a distance to the next DMA at which handoff preparations between DMAs should commence. If the proximity to another DMA is greater than or equal to the threshold (i.e., determination block 816="No"), the receiver device processor may return to block 804 to determine the current location of the receiver device. If the proximity to another DMA is less than the threshold (i.e., determination block 816="Yes"), the receiver device may request another DMA record, or another subsection of a DMA record in block 818. In this manner, as a receiver device approaches another DMA, or DMA subsection, the receiver device may prepare for the transition to enable a seamless handoff between DMAs, or DMA subsections, to occur by requesting a needed DMA record before entering the next DMA or DMA subsection.

Enabling seamless handoff in terms of temporal continuity of a running program from one network affiliate to another when a receiver device travels across a DMA boundary may be a highly desirable feature and/or possible operational requirement. Providing a seamless handoff requires ensuring the absence of duplication and/or skipping during playout in the course of the switch between an origin media server and a target media server which may provide the content in the newly entered DMA area. In an embodiment, seamless same program handoffs may be accomplished through the corresponding television stations cooperatively delivering a program during the same time interval, such as the same wall-clock (e.g., absolute time) interval. In an embodiment, seamless handoff may be enabled by requiring network time protocol ("NTP") synchronous timeline for each affiliate within a given time zone.

In an embodiment, programming may be delivered as MPEG ("Moving Picture Experts Group") DASH ("Dynamic Adaptive Streaming over HTTP") Media Segments, and different media servers, likely implemented as HTTP servers by different Content Delivery Networks ("CDNs"), may be employed to provide adaptive HTTP streaming delivery of DASH-formatted content from different affiliates/broadcasters. In such an embodiment, the source program, in the form of DASH Media Segments output by the DASH encoder, may arrive at these different media servers at different times. A potential problem may arise when a receiver device moves across a DMA boundary while continuing to display the same program should those DASH Media Segments be retrievable by the DASH Client in a given receiver device for playout as soon as they become available on the chosen media server. Seamless handoff may occur if media data contained in the next DASH Media Segment to be requested by the DASH Client is either already available at the target media server, or will be so at the same time it would have been available at the origin server if handoff was not necessary. However, if that next DASH Media Segment is not yet available on the target media server when requested by the DASH Client, there may be a freeze or stall in the playout until that DASH media Segment can be retrieved for subsequent video decoding and rendering. The source of this problem may be that although the arrival times of the same DASH Media Segments at the various media servers are different, the DASH Client may be able to retrieve Segments from the chosen server for decoding and playout as soon as those Segments are locally available on that server.

An embodiment method for addressing this problem and ensuring seamless program continuity across DMA boundaries may involve using a common value for expressing the effective availability time of any given DASH Media Segment of the program across all servers for retrieval by receiver devices (e.g., the DASH Client resident on the receiver device). In an embodiment, the effective availability time may be the same despite a potential difference in actual availability time of those DASH Media Segments in terms of different arrival times at the multiple media servers of interest. In an embodiment, different broadcast stations may work cooperatively such that their respective media servers, which may be supplied by one or more CDNs, indicate the same DASH Media Segment availability times. In this manner, any different in actual DASH Media Segment availability times may be hidden from requesting receiver devices.

In an embodiment, all receiver devices located in the service region for which program continuity is to be provided may be provided a common Media Presentation Description ("MPD"). An MPD is a manifest as defined in MPEG DASH (ISO/IEC 23009-1) that formally describes the composition of and the process for accessing a DASH-formatted content item (i.e., Media Presentation) by a DASH Client. In an embodiment, using an MPD the availability time of DASH Media Segments may be derived from the availabilityStartTime attribute defined in ISO/IEC 23009-1.

Another embodiment method for enabling seamless program continuity across DMA boundaries may not require the use of a common MPD by all receiver devices located in the service area for which program continuity may be enabled. In this alternative embodiment, all receiver devices in the service area may be signaled a playout time for any given DASH Media Segment in the program that may be no earlier than the latest availability time for that DASH Media Segment announced among all the MPDs which may be in use within that service area. This may require shared knowledge among the broadcasters collectively serving the program continuity service area of each individual MPD's availabilityStartTime values. In this manner, regardless of possible differences in DASH Media Segment availability times as declared in the MPDs, the permitted playout time among all receiver devices may be delayed to accommodate a worst case variation. Since that playout time may be at least as late as the latest value of the DASH Media Segment availability times among all media servers in the region, independent of the media server for which handoff occurs, the next DASH Media Segment to be fetched for seamless continuity in program playout is sure to be available at that target server.

Figure 9A:
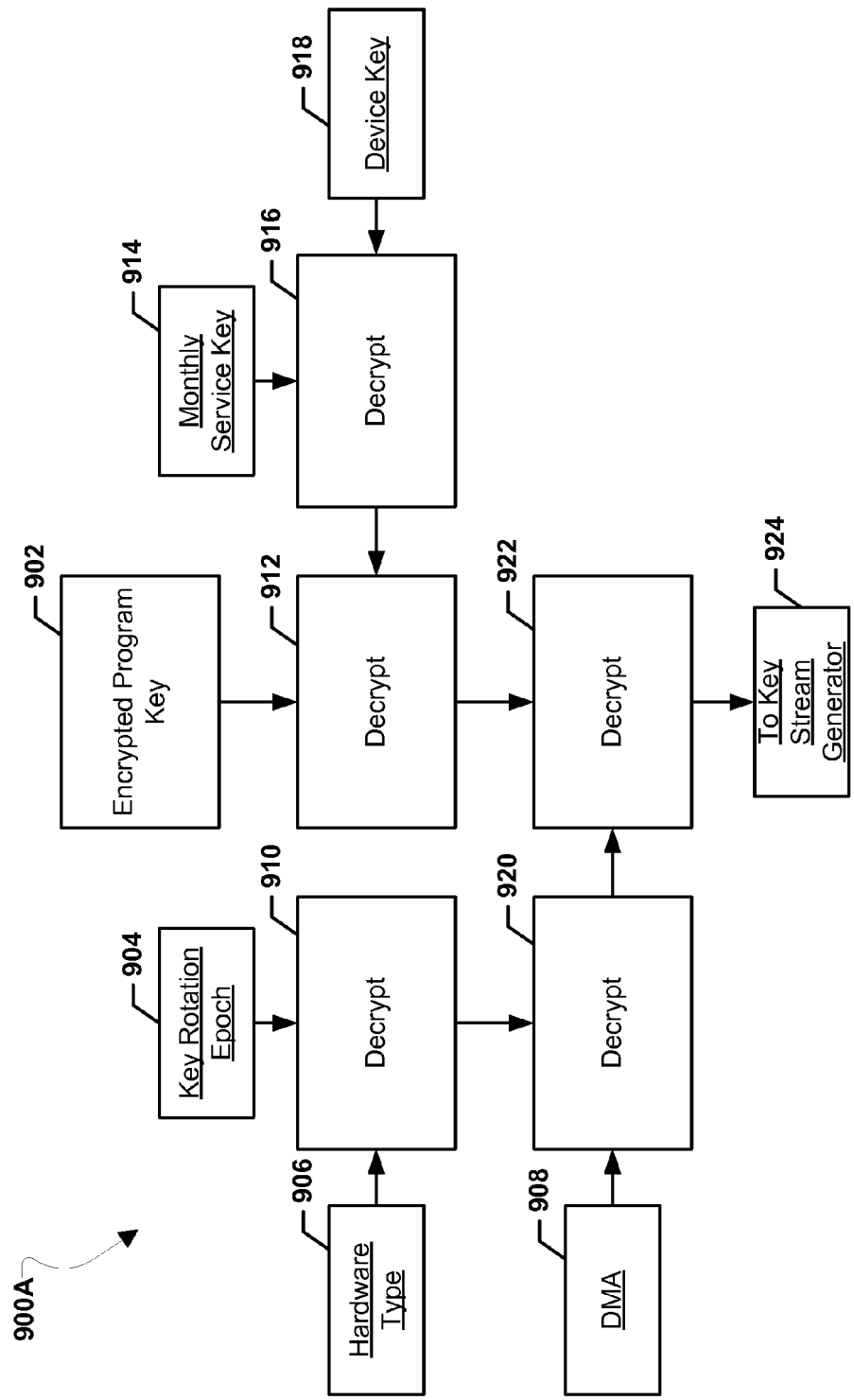
FIG. 9A is a block diagram of an embodiment key hierarchy.

FIG. 9A illustrates an embodiment decryption key hierarchy 900A. In an embodiment, the key hierarchy 900A may require a secure computing environment. In an embodiment, the DMA 908 from the content provider may be part of the content key decryption hierarchy 900A. This decryption may be forced regularly by a key rotation epoch 904. In operation the receiver device key 918 and monthly service key 914 may be decrypted in block 916 and passed to block 912. The encrypted program key 902 may be decrypted in block 912 with the decrypted receiver device key 918 and monthly service key 914. The key rotation epoch 904 and hardware type 906 may be decrypted in block 910 and passed to block 920. The DMA 908 may be decrypted with the decrypted key rotation epoch 904 and hardware type 906 in block 920. In block 922 the inputs from blocks 912 and 920 may be decrypted and passed to the key stream generator in block 924. In an embodiment, only the DMA and key rotation vectors may be in the frequently updated path. In an embodiment, receiver device capabilities may be in the program key path because receiver device capabilities may not vary often over time. In another embodiment, the receiver device capabilities may be included as a part of a cascaded or concatenated encryption process. In an alternative embodiment, the receiver device capabilities may be included as part of an executed tier mask.

Figure 9B:
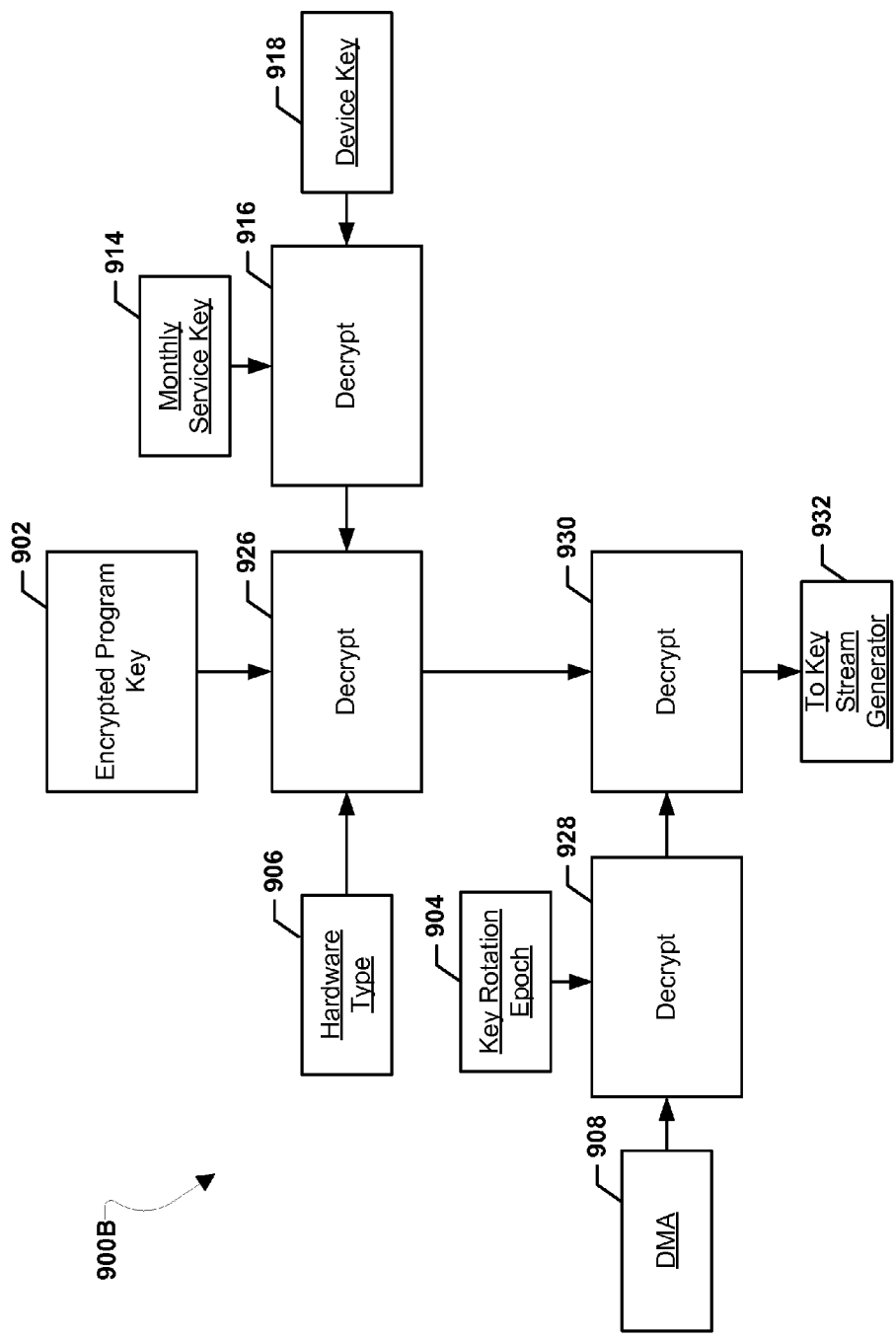
FIG. 9B is a block diagram of another embodiment key hierarchy.

FIG. 9B illustrates an embodiment decryption key hierarchy 900B similar to key hierarchy 900A illustrated in FIG. 9A, except that the hardware type 906 may be included in the program key flow. In an embodiment, the hardware type 906 may be included in the program in the program key flow because the hardware type 906 may not vary over time. In an embodiment, the hardware type 906 and the encrypted program key 902 may be decrypted in block 926 with the decrypted receiver device key 918 and monthly service key 914. The DMA may be decrypted with the key rotation epoch 904 in block 928. In block 930 the inputs from blocks 926 and 928 may be decrypted and passed to the key stream generator in block 932.

As discussed above, in an embodiment, the current DMA may be calculated from position of the receiver device, which may be determined by a variety of methods, including GPS Latitude/Longitude, Wi-Fi SSID, IP Address, and Cell ID. These parameters maybe associated to a DMA at a receiver device, or the DMA may be determined via connection to a geo-location server. In an embodiment, the geo location server may send a signed DMA determination to the receiver device to enable playing of broadcast content.

A downside of this approach is that the receiver device could spoof the geo location server by providing it with false location data. Such a spoofing attack may take the form of a replay attack in which the receiver device software may have logged a set of data in a given DMA and then plays this logged data back, rather than providing accurate current location information. There are a number of methods to address this sort of attack, mostly based on authenticating software versions for the receiver device. For example, each version of software involved in reporting or calculation on the receiver device may be authenticated to the trust zone via a signed run time hash calculation. In an embodiment, the data sent to the geo-location server may be signed by the receiver device. However, this may not assure that the data reported to the trust zone is accurate. In an embodiment, without bringing certain aspects of location data acquisition under direct control of trust zone, a solution may be to have all of the software utilized in the capture of location data authenticated and to have receiver devices request new data for each DMA based key recalculation. In another embodiment, to further reduce the potential for a man-in-the-middle attack in software, no data paths in the hardware of the receiver device may be modifiable by software.

Frequent recalculation of DMA keys may make connection to a geo server for each calculation less desirable. In another embodiment, a solution may be to have the geo server download signed per DMA location data profiles (DMA Record) on a first DMA determination, which may then be updated on subsequent connections. In an embodiment, a DMA location data profile (DMA Record) may correspond to an entire DMA. In a further embodiment, a DMA location data profile (DMA Record) may correspond to one or more subsections (e.g., regions) of a DMA. In an embodiment, a DMA location data profile (DMA Record) may correspond to a combination of whole DMAs and subsections of DMAs. In an embodiment, the receiver device may keep N DMA location data profiles (DMA Records) and age off oldest, or first-in-first-out, to limit total memory space consumption. In an embodiment, a determination about which DMA records to keep in a memory cache may be made based on a cell-ID history log. In an embodiment in which a DMA record includes mapping between the DMA and the set of cellular sites (e.g., identified by cell-IDs) with the DMA, DMA records whose cell-IDs correspond to the most matches to recurring entries in the cell-ID history log may be retained in the memory cache. In this manner, the retained DMA records may represent the most likely location(s) of the user over a time period. Past user locations may represent an accurate predictor of future user locations, and the use of cell-ID history may enable the filtering of DMA records in memory based on a user's predicted location(s). In an embodiment, failure of location info on the receiver device side to identify the DMA may result in a connection to the geo-location server (i.e., current location is not in a known DMA). In an embodiment, when a DMA profile is out of date or inaccurate the receiver device may connect to the geo-location server. In an embodiment, the contacted media server may know the current DMA source file version, such that the receiver device need not ping the location server unless the receiver device's DMA data is out of date. In an embodiment, an indication may be made as to whether a new DMA file may be mandatory. In this manner, requests upon approaching "DMA Record" epoch boundaries may be minimized. The location file "DMA Record" may allow for the notification of pending adjacency (i.e., a receiver device is close to a boundary, so the receiver device may acquire information relative to service acquisition in the adjacent DMA). This may be viewed as a geographic equivalent of current and next key in key delivery and may enable a receiver device to acquire DMA Records and per DMA keying in advance of a required handoff due to receiver device travel.

The services described herein potentially cover a wide range of computing platforms from smart phones, tablets computers, laptops, desk tops. The license of the broadcaster may apply to only a subset of these receiver devices. In an embodiment, receiver device limited licensing may be addressed by a receiver device capability code embedded within the receiver device trust zone. The encryption key for a specific provider may be used to generate a decryption key by encrypting the capability code of the receiver device. In an embodiment, this capability key may be added to the program key decryption process. In an embodiment, the receiver device side attributes maybe combined into a single key or concatenated by a series of decryptions. In an alternative embodiment, various component keys may be decrypted ahead of a final decryption.

In an embodiment, a receiver device may include software authentication and trusted boot operations, such that the service may know the reception method (e.g., receiver device is taking reception via network adaptor, Wi-Fi, or wide area network). This may be a soft method, as it may be beyond receiver device capability to comprehend anything other than the last IP link that was traversed. This fundamental issue may make the broad topic of restricted delivery methods dubious, as a product such as Slingbox could make limits on media re-distribution outside the licensed DMA entirely intractable. However, the present disclosure may assure that at least each broadcaster is not violating its license. The behavior of third parties or secondary links may not be controlled.

In an embodiment, rather than, or in addition to, streaming delivery of program content, a TV station may distribute content (e.g., station-produced/owned, syndicated, and/or network programming) via download delivery. In an embodiment, the content may be downloaded at a receiver device and stored for offline viewing. In an embodiment, the downloadable content may be made available as video or audio podcasts delivered by the TV station/broadcaster's media servers via a web feed to which users may subscribe. OTT delivery, download, and storage of video or audio podcasts may be advantageous for varied reasons. As used herein, a "podcast" may be a scheduled file delivery, such as a file delivery made in an episodic manner. OTT delivery, download, and storage of video or audio podcasts may enable time-shifted consumption, which may be desirable to consumers. Offering popular programs as podcasts for download delivery and offline consumption, instead of and/or in addition to offering popular programs via OTT simulcast (i.e., OTT streaming simultaneous with program nominal airing over cable, satellite, and/or terrestrial broadcast systems) may avoid or diminish the impact on program carriage/retransmission fees paid by cable and satellite pay-TV providers to broadcast networks. Similarly, OTT simulcast offering by broadcast networks may adversely impact the business relationship with affiliate stations that pay the networks for the rights to air those programs, without some form of financial reciprocation. OTT simulcast of popular TV programs would enable reception on various devices, which may include traditional TV sets, PCs, tablets and smart phones, free of charge and independent of the pay-TV provider. Given such alternative and complimentary content access, some existing cable or satellite subscribers, especially those subscribing to basic packages, may have less interest or motivation to continue their paid subscriptions. Such occurrence would likely place downward pressure on the carriage/retransmission revenue stream enjoyed by broadcasters. In contrast, podcast delivery, by its very nature of time-delayed program transmission and consumption, may be much less disruptive to the interests of pay-TV providers. In current systems, some broadcasters already make TV episodes available for streaming access via the Internet, which by definition are not podcasts because retrieval requires explicit end-user action and the streamed programs are not available for device storage for later viewing. Typically, these streamed programs are offered for streaming a day or later after their original airing.

Simultaneous live streaming delivery of video or audio content to a large number of users over a cellular network may impose a heavy load burden on a unicast network, potentially resulting in intermittent periods of low available bandwidth, which may result in low video quality or even stalls in play due to required buffering. Download delivery of OTT content, for user storage for time-shifted rendering, such as via podcast based program downloads, may avoid and/or relieve such network congestion conditions and may ensure higher quality content delivery. Additionally, OTT delivery, download, and storage of video or audio podcasts may enable consumers to use or networks to offer lower usage charge (e.g., charges based on per unit volume of data delivered) periods (e.g., off-peak hours of cellular networks) to deliver such content.

In an embodiment, in addition to unicast download delivery of podcasts, broadcast transport, such as using eMBMS, may be spectrally-efficient. Broadcast transport may be especially suitable for delivery of popular TV episodes due to anticipated broad interest to receive such content. Separate unicast transmission of the broad interest content may consume whatever spare and/or off-peak capacity that may exist in a cellular network. Therefore, in an embodiment, highly-popular content (e.g., highly-popular TV shows) may be delivered via broadcast (e.g., eMBMS) download delivery, while less popular (e.g., more "long-tail") content may be transmitted over unicast cellular channels. The delivery of highly-popular content via broadcast download delivery may require cooperation among broadcasters and cellular operators.

Specific mechanisms may be necessary to enable eMBMS download delivery of podcasts. In nominal podcast publication and subscription, the corresponding content is described by a document, such as a "Web feed." Web feeds allow client device software programs (e.g., a feed reader or aggregator implemented as part of the "podcatcher" or podcast client application program) to check for updates published on the distribution site. The Web feed is in turn implemented as an Extensible Markup Language ("XML") document in the form of a Resource Description Framework ("RDF") Site Summary ("RSS"), more popularly known as Really Simple Syndication (RSS) file, or alternatively, an Atom feed or file as described by Internet Engineering Task Force ("IETF") Request for Comments ("RFC") 4287. RSS feeds and Atom feeds correspond to alternative Web feed formats in current use, with RSS, especially RSS 2.0 being the more popular of the two.

FIG. 10 illustrates an example RSS 2.0 file suitable for use in the various embodiments describing a video podcast. As illustrated in FIG. 10, an RSS 2.0 file may include content summary information, including various channel information and item information, as well as an enclosure. The enclosure may be a URL reference of a media file. In nominal audio or video podcast publication, the associated audio or video file may be referenced by the enclosure element in the RSS file to enable the "podcatcher" or podcast client application program to be separately retrieved via download. In eMBMS delivery of podcasts, it may not be appropriate or logical for the central media file component of the podcast to be retrieved over the unicast cellular network. In an embodiment, the central media file may be acquired from the original podcast distribution site by the broadcast content server, or the Broadcast-Multicast-Service Center ("BM-SC"). Instead of the "podcatcher" or podcast client application program on the receiver device retrieving the media file from the RSS information, in eMBMS operations, the BM-SC may broadcast that media file as a content item of a Non-Real-Time ("NRT") download delivery service. The delivery schedule of that content may be announced by the MBMS User Service Discovery/Announcement information, i.e., User Service Description ("USD"), in the Schedule metadata fragment. Alternatively, the delivery schedule of that content may be announced using an external electronic service guide ("ESG"), such as the ESG defined by OMA BCAST.

Figure 11:
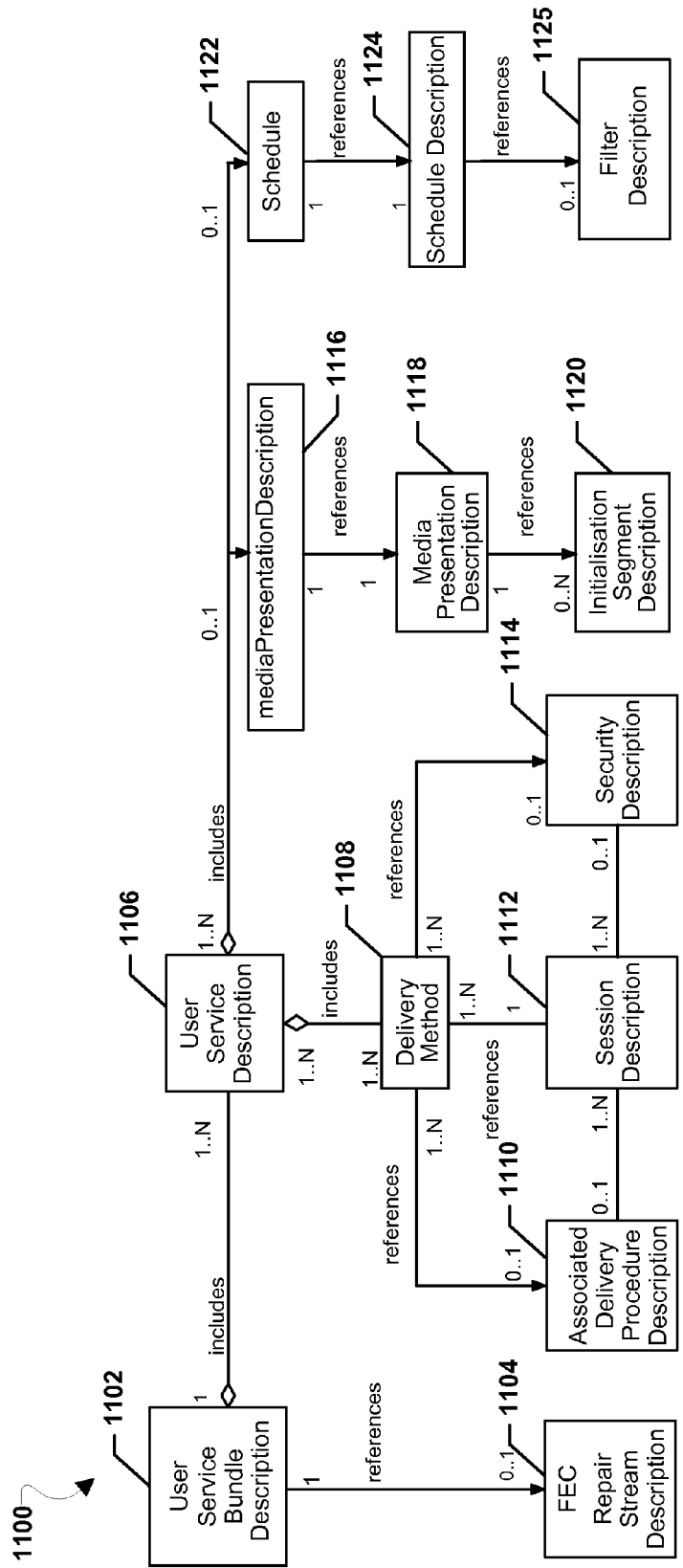
FIG. 11 is a data model of the MBMS User Service Discovery/Announcement as depicted in the 3rd Generation Partnership Project (3GPP) technical specification (TS) 26.346.

FIG. 11 illustrates a data model of MBMS User Service Discovery/Announcement information (i.e., a USD) 1100 suitable for use with the various embodiments. As illustrated in FIG. 11, one MBMS User Service Bundle Description 1102 may include at least one User Service Description instance 1106 and may contain several User Service Description instances 1106. The User Service Bundle Description 1102 may refer to a forward error correction ("FEC") Repair Stream Description 1104. In an embodiment, in which a MBMS User Service carries DASH-formatted contents, the MBMS User Service Description 1106 may include a media presentation description element 1116. The media Presentation Description element 1116 may include a reference to the Media Presentation Description ("MPD") 1118, such as a metadata fragment. Further, the MPD 1118 may refer to one or more Initialisation Segments 1120, such as Initialisation Segment Description ("ISD") metadata fragments. Also, one MBMS User Service Description 1106 may include at least one delivery method description 1108. The delivery method description 1108 may refer to a session description 1112, and may include references to a security description 1114 and an associated delivery procedure description 1110. Several delivery methods 1108 may reference the same service protection description 1114. When the associated delivery procedure description 1110 is present in the user service description 1106, the associated delivery procedure description 1110 may be referenced by one or more delivery methods 1108. Additionally, an MBMS User Service Description 1106 may include a schedule 1122. If included, the schedule 1122 may refer to a schedule description 1124. If included, the schedule description 1124 may refer to a filter description 1125.

As discussed above, in the various embodiments, cooperation and coordination may be required between the eMBMS service provider (e.g., a cellular network operator) and the broadcaster network whose content is to be delivered via eMBMS. In an embodiment, it may be necessary to enable the broadcaster and/or the eMBMS service provider to receive information indicating whether a particular podcast is subscribed and by how many end users. The information about whether a particular podcast is subscribed and by how many end users may be input to an algorithm to determine whether content should be delivered over a broadcast or unicast network. In current RSS Web feeds, user subscription to desired podcasts is a client-side only process. Assuming the end user elects to subscribe to a particular feed for future podcast delivery, in current systems upon acquisition of the RSS file for that particular feed no explicit information is provided by the client software (i.e., the "podcatcher"), to the server distribution site. In other words, the subscription event is only indicated at the client device and no indication of the subscription is provided to the network side server.

To enable eMBMS delivery of podcasts, a subscription event needs to be generated and indicated to the network. In an embodiment, upon detection of user selection of a Web feed to receive future podcast delivery, the receiver device (e.g., a smart phone) may send a subscription notification message to the network. As an example, the receiver device may generate and send (e.g., via interaction between the "podcatcher" software and receiver device middleware) a subscription notification message to the network including a user identification, feed/content information, and/or market scale location information (e.g., DMA identification and/or location information such as GPS determined latitude and longitude coordinates).

Figure 12:
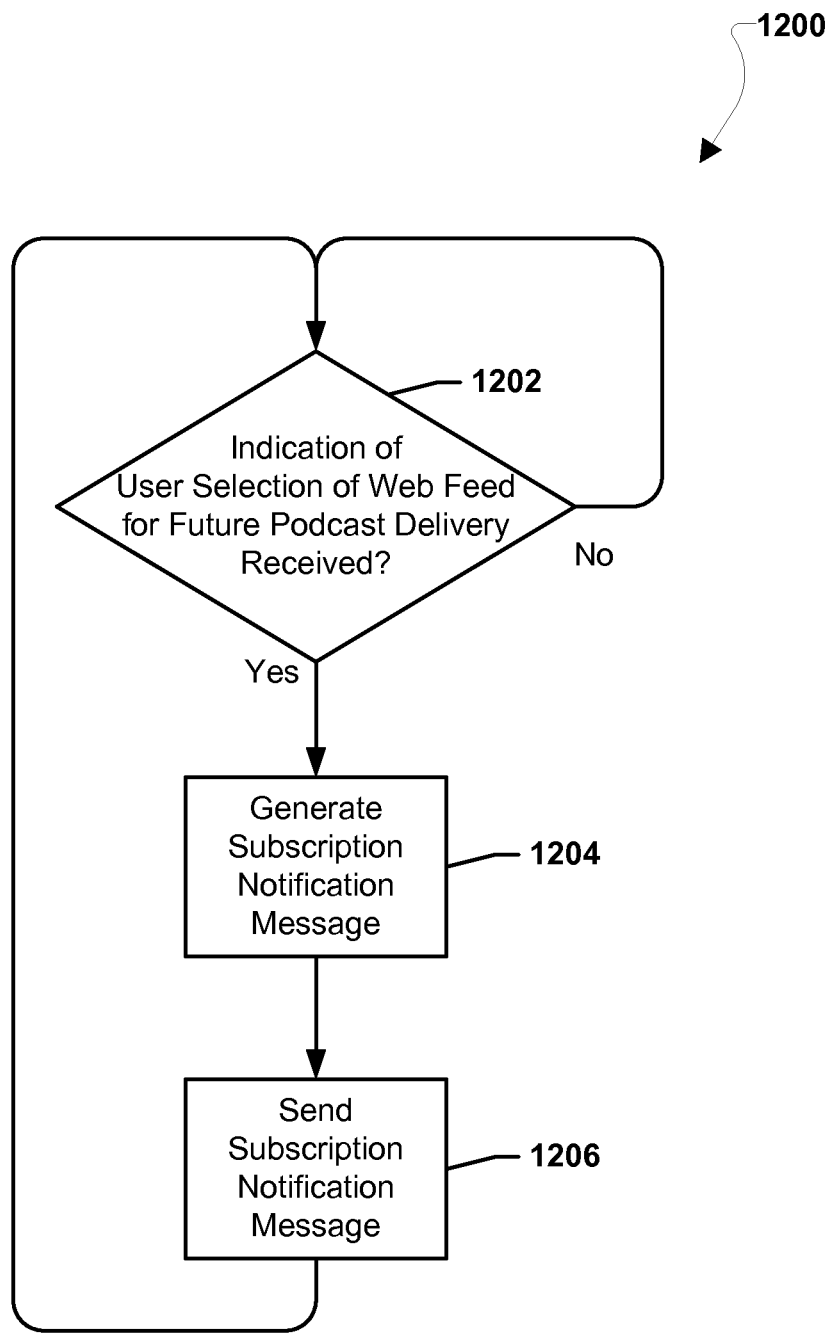
FIG. 12 is a process flow diagram illustrating an embodiment method for generating and sending a subscription notification message.

FIG. 12 illustrates an embodiment method 1200 that may be performed by the processor of a receiver device for generating and sending a subscription notification message. At determination block 1202 the receiver device processor may determine whether an indication of a user selection of a Web feed for a future podcast delivery is received in the receiver device. As an example, an indication of a user selection of a Web feed for future podcast delivery may be a mouse click corresponding to an RSS subscription. If an indication of a user selection of a Web feed for future podcast delivery is not received (i.e., determination block 1202="No"), the receiver device processor may return to block 1202 and continue to monitor for an indication of a user selection of a Web feed for a future podcast delivery. If an indication of a user selection of a Web feed for future podcast delivery is received (i.e., determination block 1202="Yes"), at block 1204 the receiver device processor may generate a subscription notification message. In an embodiment, the subscription notification message may include a user identification, feed/content information, and/or market scale location information (e.g., DMA identification and/or location information such as GPS determined latitude and longitude coordinates, Wi-Fi access point, serving cell ID, etc.). At block 1206 the receiver device processor may send the subscription notification message. In an embodiment, the receiver device may send the subscription notification message to a server, such as a content broadcaster's podcast server and/or an eMBMS service provider's network server.

Figure 13:
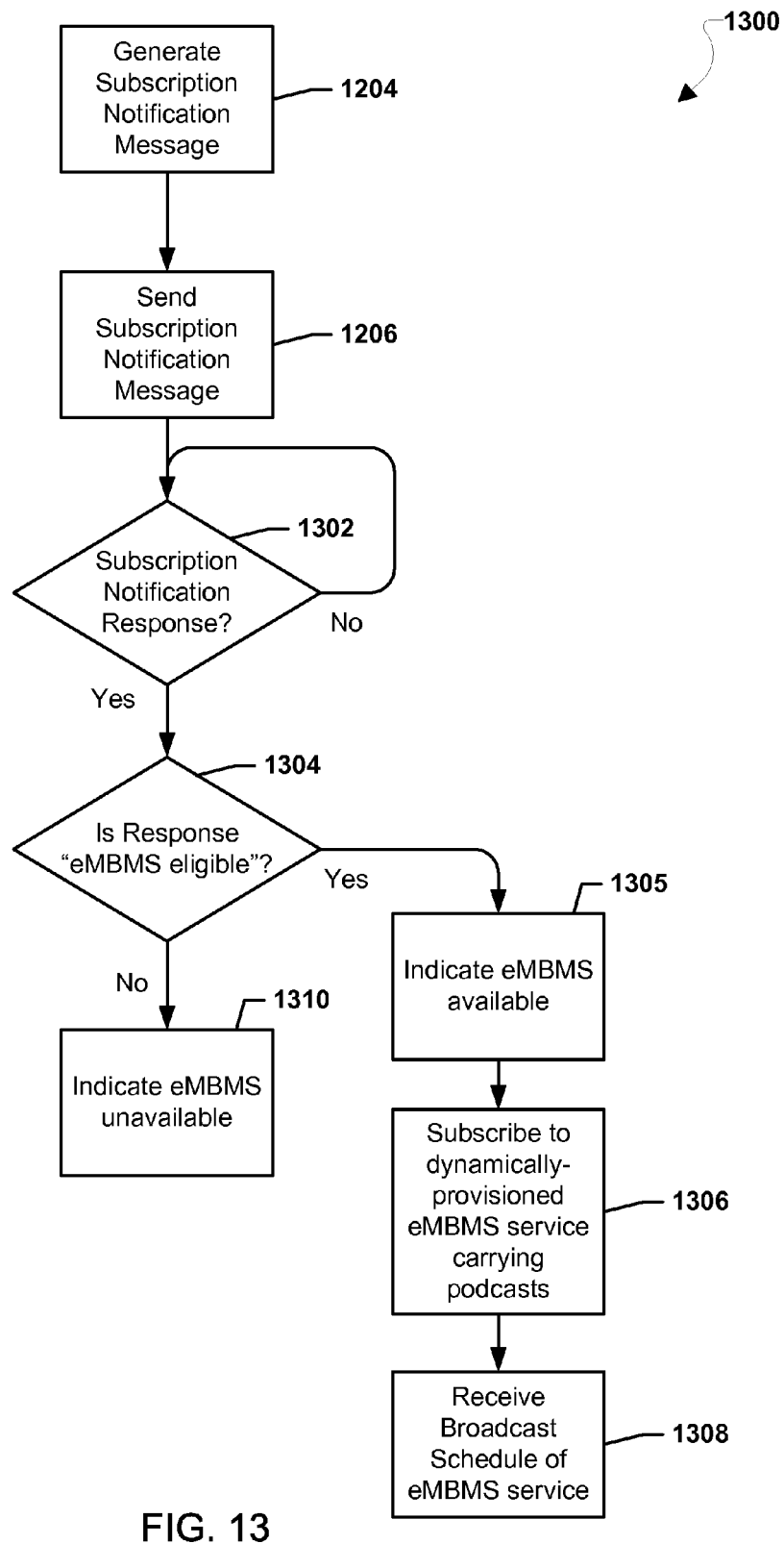
FIG. 13 is a process flow diagram illustrating another embodiment method for generating and sending a subscription notification message.

FIG. 13 illustrates an embodiment method 1300 similar to method 1200 described above with reference to FIG. 12, except that method 1300 includes additional operations that may be performed by the processor of a receiver device in conjunction with the operations of method 1200 to indicate the availability of an eMBMS service. As discussed above, at block 1204 the receiver device processor may generate a subscription notification message, and at block 1206 may send the subscription notification message. At determination block 1302 the receiver device processor may determine whether a subscription notification response is received by the receiver device. In an embodiment, a subscription notification response may be a message received from a network server indicating the ability to receive the related podcast delivery via eMBMS. If a subscription notification response is not received (i.e., determination block 1302="No"), the processor may return to determination block 1302. In this manner, the receiver device processor may continually determine whether a subscription notification response is received, effectively waiting until a response is received. If a subscription notification response is received (i.e., determination block 1302="Yes"), at determination block 1304 the receiver device processor may determine whether the subscription notification response indicates that the podcast delivery is eMBMS eligible. As an example, a subscription notification response may indicate that the podcast delivery is available via eMBMS, thus the subscription notification response is eMBMS eligible. If the subscription notification response is that the podcast delivery is not eMBMS eligible (i.e., determination block 1304="No"), at block 1310 the receiver device processor may indicate that eMBMS delivery is unavailable. As an example, the receiver device processor may indicate that eMBMS delivery is unavailable via a pop-up indication on a display of the receiver device. If the subscription notification response is that the podcast delivery is eMBMS eligible (i.e., determination block 1304="Yes"), at block 1305 the receiver device processor may indicate that eMBMS delivery is available, for example by generating a pop-up indication on a display of the receiver device. At block 1306 the receiver device processor may subscribe to the dynamically-provisioned eMBMS service that will carry the podcast. At block 1308 the receiver device processor may receive the schedule information indicating when the podcast will be broadcast via eMBMS.

In an embodiment, the entity receiving the subscription notification message may be a broadcaster server, such as a broadcasters' podcast server, which may store a copy of the subscription notification message and/or use the information within the subscription notification message to track content usage. In an embodiment, the broadcaster server may forward the subscription notification message to an eMBMS service provider's network server. The eMBMS service provider's network server may determine whether the user associated with the subscription notification message is an eMBMS subscriber, and may notify the broadcaster server that the user associated with the subscription notification message is or is not an eMBMS subscriber. In an embodiment, one or both of the content broadcaster server and the eMBMS service provider server may determine whether the associated podcast should be enabled for eMBMS delivery, and if so, the content broadcaster server and/or the eMBMS service provider server may determine an eMBMS broadcast schedule. The schedule eMBMS broadcast of podcasts may be announced in a USD Schedule fragment that may be broadcast, e.g., delivered via a dedicated FLUTE session, available for unicast retrieval, or retrievable via both unicast and broadcast distribution.

Figure 14:
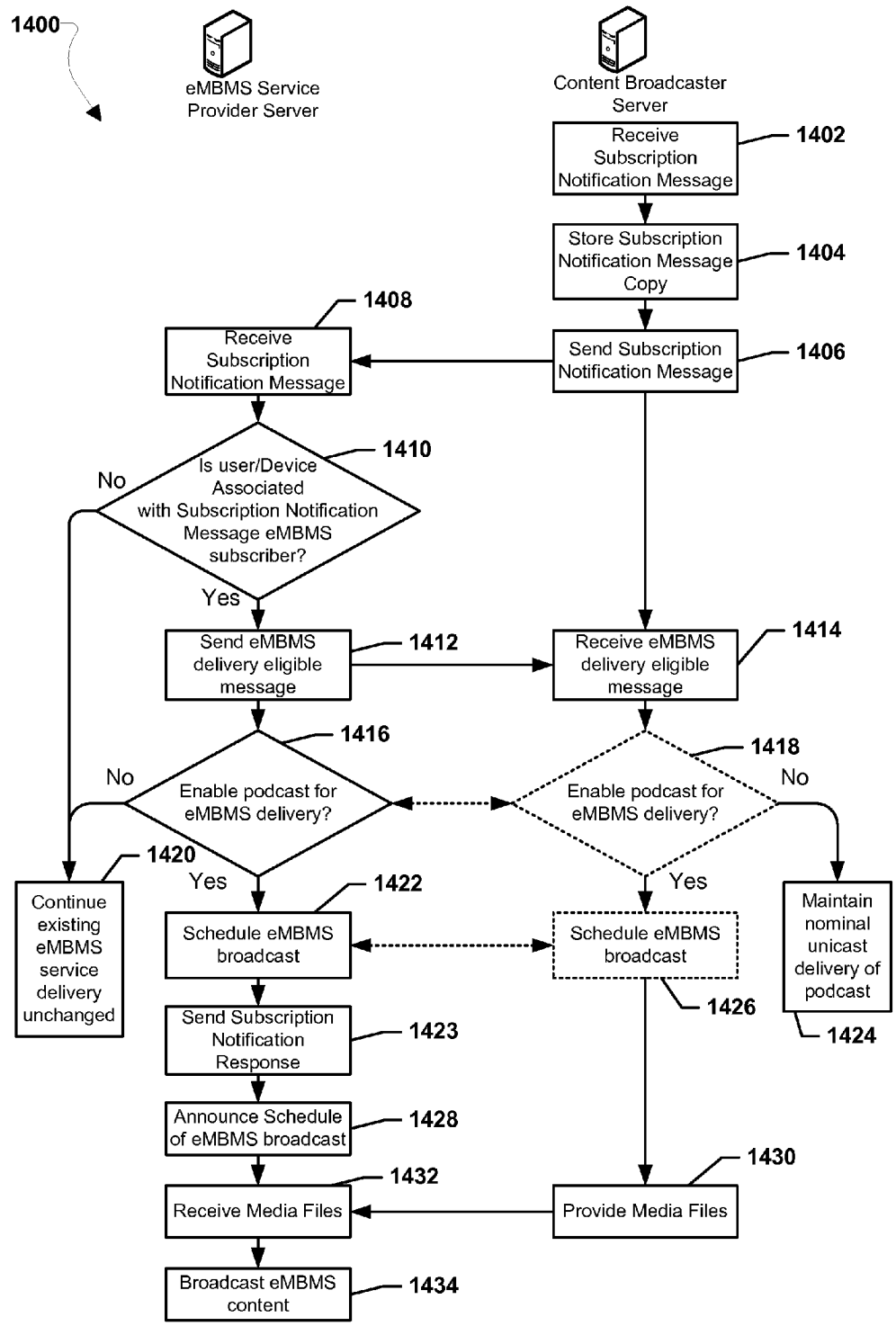
FIG. 14 is a process flow diagram illustrating an embodiment method to enable podcasts for eMBMS delivery.

FIG. 14 illustrates an embodiment method 1400 that may be performed by an eMBMS service provider server and a content broadcaster server to enable podcasts for eMBMS delivery. At block 1402 the content broadcaster server may receive a subscription notification message. In an embodiment in which the subscription notification message includes location information, upon receiving the subscription notification message the content broadcaster server may assign view credit for the content associated with the subscription notification message. At block 1404 the content broadcaster server may store a copy of the subscription notification message. At block 1406 the content broadcaster server may send the subscription notification message to the eMBMS service provider server, and at block 1408 the eMBMS service provider server may receive the subscription notification message. At determination block 1410 the eMBMS service provider server may determine whether the user associated with the subscription notification message is an existing eMBMS subscriber. As an example, the eMBMS service provider server may determine whether the user and/or receiver device associated with the subscription notification message is an existing eMBMS subscriber by comparing user information, such as a user ID, device ID, etc., in the subscription notification message to a user information database correlating network users with their registered devices, device capabilities, and network service plans. If the user and/or receiver device is not an existing eMBMS subscriber (i.e., determination block 1410="No"), at block 1420 the eMBMS service provider server may continue the existing eMBMS service delivery unchanged. If the user and/or receiver device is an existing eMBMS subscriber (i.e., determination block 1410="Yes"), at block 1412 the eMBMS service provider server may send an eMBMS delivery eligible message to the content broadcaster server, and at block 1414 the content broadcaster server may receive the eMBMS delivery eligible message. In an embodiment, the eMBMS delivery eligible message may be a message including an indication that the user/receiver device associated with the subscription notification message is an eMBMS subscriber.

At determination block 1416 the eMBMS service provider server may determine whether to enable the podcast for eMBMS delivery. In an embodiment, the eMBMS service provider may have a pre-established agreement with the content broadcaster that may allow the eMBMS delivery decision to be made solely by the eMBMS service provider. In an optional embodiment, at optional determination block 1418 the content broadcaster server may determine whether to enable the podcast for eMBMS delivery independent of the eMBMS service provider server and/or in conjunction with eMBMS service provider server. In an optional embodiment, the eMBMS service provider server and content broadcaster server may exchange information with each other in order to negotiate whether to enable the podcast for eMBMS delivery. In an embodiment, the determination of whether to enable the podcast for eMBMS delivery may be made based on one or more considerations, such as network capacity, content usage rates, user locations, content type, distribution rights, etc. As an example, an algorithm may define a podcast's future popularity based on the content type and content usage rates, and podcast's with a popularity above a predetermined threshold may be enabled for eMBMS broadcast. If the original request for podcast delivery is deemed to be ineligible for eMBMS delivery and thus not enabled for eMBMS delivery (i.e., determination block 1416 and/or 1418="No"), at blocks 1420 the eMBMS service provider server may continue the existing eMBMS service delivery unchanged, and at block 1424 the content broadcaster server may maintain nominal unicast delivery of the podcast (i.e., non-eMBMS delivery). If the podcast is enabled for eMBMS delivery (i.e., determination block 1416 and/or 1418="Yes"), at block 1422 the eMBMS service provider server may schedule the eMBMS broadcast of the podcast.

In an optional embodiment, at optional block 1426 the content broadcaster server may exchange messages with the eMBMS service provider server to schedule the eMBMS broadcast. At block 1423 the eMBMS service provider server may send a subscription notification response to the receiver device that sent the subscription notification message. In an embodiment, the subscription notification response may be a message including a notification for the receiver device of impending eMBMS delivery of the requested Web feed contents, including metadata for that newly-provisioned eMBMS service that may enable the receiver device to automatically subscribe to that eMBMS service. This auto-subscription procedure based on metadata in the subscription notification response may enable the user of the receiver device to receive the associated eMBMS services automatically, without having to manually enter explicit subscription information and/or manually perform explicit subscription establishment operations. At block 1428 the eMBMS service provider server may announce the schedule of the eMBMS broadcast. By way of example, the schedule eMBMS broadcast of podcasts may be announced in a USD Schedule fragment which may be broadcast, e.g., delivered via a dedicated FLUTE session, available for unicast retrieval, or retrievable via both unicast and broadcast distribution. As another example, the schedule information may also be carried in a standards based ESG, such as that defined by OMA BCAST. At block 1430 the content broadcaster server may provide the media files for the podcast to the eMBMS service provider server, and at block 1432 the eMBMS service provider server may receive the media files for the podcast. At block 1434 the eMBMS service provider server may broadcast the eMBMS content. In an embodiment, the content broadcaster server and/or the eMBMS service provider may monitor content usage reports to determine the usage of podcast broadcasts, such as syndicated podcast broadcasts. Low usage rates may indicate low user interest in the podcast content, and in an embodiment, podcasts with usage rates below a minimum usage level may be discontinued (i.e., terminated) from broadcast delivery. As an example, the associated syndicated feed channels of a syndicated podcast may be discontinued from broadcast delivery when determined usage levels fall below a minimum usage threshold.

In an embodiment, the broadcast content server and/or eMBMS service provider server may determine the geographic location of the receiver device that sent the subscription notification message based on IP address mapping. In an embodiment, based on the IP address from which the subscription notification message originated (e.g., IP address of the router, cellular base station, modem, etc.), a probable location may be determined from comparison of the originating IP address to a database correlating IP addresses with geographic locations, such as latitude and longitudes. In this manner, the probable location of the receiver device may be determined. In an embodiment, the probable location may be compared to a DMA map to determine the current DMA that the receiver device may be in and whether the receiver device is entitled to receive and/or display the content based on broadcaster rights for the content in the determined DMA.

In an another embodiment, the broadcast content server and/or eMBMS service provider server may determine the geographic location of the receiver device that sent a subscription notification message based on the serving cell site ID included in the subscription notification message. In this embodiment, the receiver device's location based on the cell ID may be compared to a DMA map or database correlating cell IDs to DMAs to determine the current DMA that the receiver device is in, and whether the receiver device is entitled to receive and/or display the content based on broadcaster rights for the content in the determined DMA. In an another embodiment, the broadcast content server and/or eMBMS service provider server may determine the geographic location of the receiver device that sent a subscription notification message based on the receiver device's latitude and longitude or GPS coordinates included in the subscription message. In this embodiment, the receiver device's location based on GPS coordinates may be compared to a DMA map to determine the current DMA that the receiver device is in, and whether the receiver device is entitled to receive and/or display the content based on broadcaster rights for the content in the determined DMA. In another embodiment, the broadcast content server and/or eMBMS service provider server may determine the geographic location of the receiver device that sent a subscription notification message based on a serving Wi-Fi Access Point's SSID included in the subscription message. In this embodiment, the receiver device's location based on the SSID may be compared to a DMA map or database correlating cell IDs Wi-Fi Access Point SSIDs to DMAs to determine the current DMA that the receiver device is in, and whether the receiver device is entitled to receive and/or display the content based on broadcaster rights for the content in the determined DMA.

Figure 15:
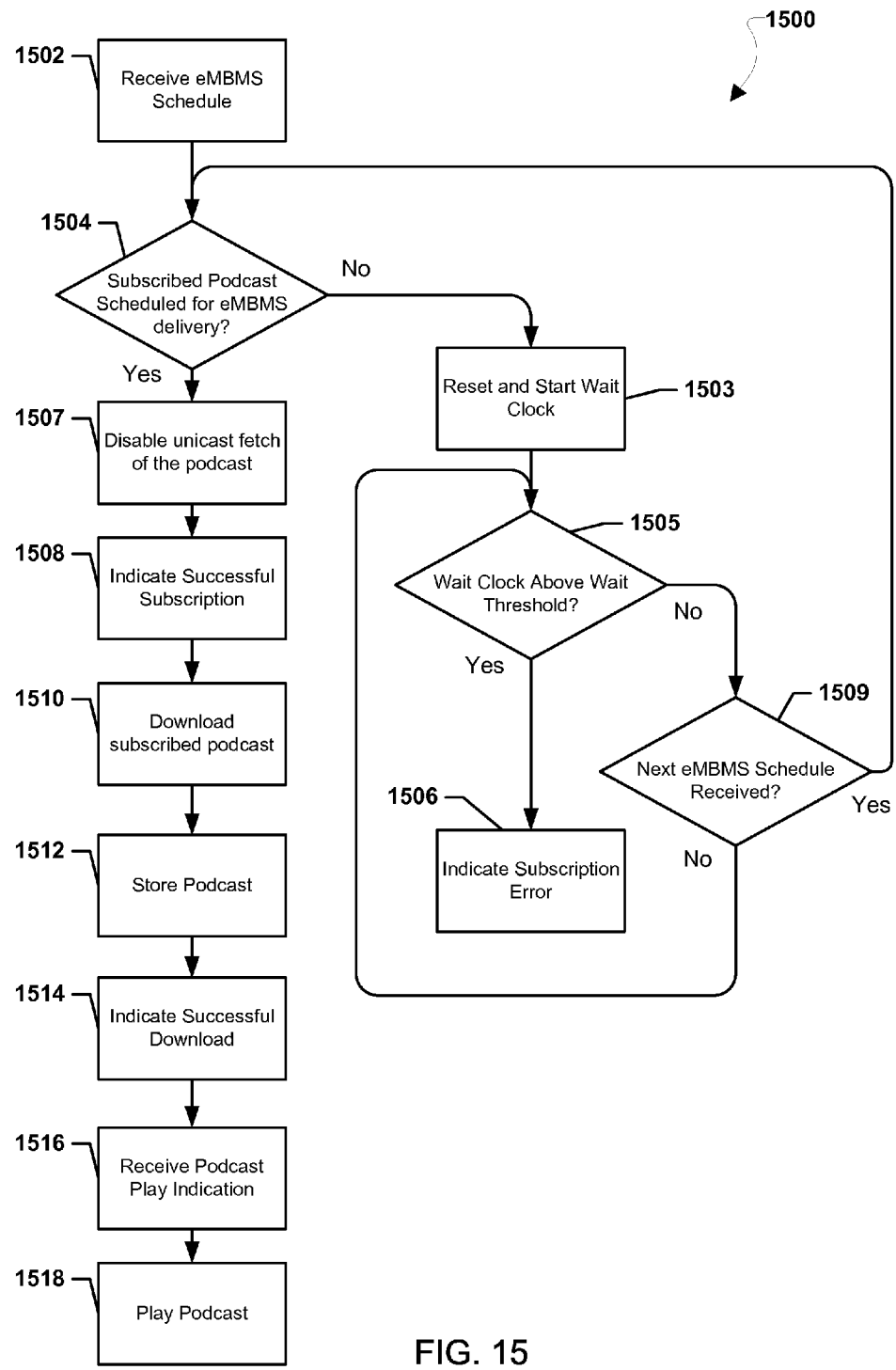
FIG. 15 is a process flow diagram illustrating an embodiment method for downloading and playing a podcast.

FIG. 15 illustrates an embodiment method 1500 that may be performed by the processor of a receiver device for downloading and playing a podcast. At block 1502 the receiver device processor may receive the eMBMS schedule. In an embodiment, the receiver device processor may receive the eMBMS schedule from an eMBMS service provider server, such as by unicast and/or broadcast transmission. At determination block 1504 the receiver device processor may determine whether a subscribed podcast is scheduled for eMBMS delivery. As an example, the receiver device processor may compare a content/feed information associated with a previously sent subscription notification message to content/feed information in the received eMBMS schedule to identify matches that may indicate a subscribed podcast is schedule for eMBMS delivery.

If the processor determines that a subscribed podcast is not scheduled for eMBMS delivery (i.e., determination block 1504="No"), at block 1503 the receiver device processor may reset and start a wait clock. As an example, this may involve the receiver device processor resetting a count up timer to zero and starting the timer. In determination block 1505 the receiver device processor may determine whether the wait clock is above the wait threshold. In an embodiment, a wait count threshold may be a predetermined period of time selected to enable the receiver device processor to wait for the arrival of a next schedule before declaring an error. If the wait clock is less than or equal to the wait threshold (i.e., determination block 1505="No"), the receiver device processor may determine whether a next eMBMS schedule is received in determination block 1509. If a next eMBMS schedule is not received (i.e., determination block 1509="No"), as discussed above, the receiver device processor may determine whether the wait clock is above the wait threshold in determination block 1505. In this manner, the receiver device processor may continue to await a next eMBMS schedule. If a next eMBMS schedule is received (i.e., determination block 1509="Yes"), as discussed above, the receiver device processor may determine whether a subscribed podcast is scheduled for eMBMS delivery in determination block 1504. If the wait clock is above the wait threshold (i.e., determination block 1505="Yes"), in block 1506 the receiver device processor may indicate a subscription error, such as by displaying a subscription error message on a display of the receiver device. As another example, the indication of a subscription error may be an indication internal to the receiver device processor, such as an indication to a "podcatcher" application, and the internal indication may cause the "podcatcher" application to initiate a unicast fetch of the desired podcast. If the processor determines that a subscribed podcast is scheduled for eMBMS delivery (i.e., determination block 1504="Yes"), at block 1507 the receiver device processor may disable any unicast fetch of the podcast, such as by disabling unicast fetch for the podcast in the "podcatcher" application. At block 1508 the receiver device processor may indicate a successful subscription. As an example, upon detecting that the Web feed is made available for eMBMS distribution (e.g., upon receiving the eMBMS broadcast schedule), the receiver device may output an indication on a display of the receiver device that subscription/registration for a podcast was successful. As a further example, upon receiving the eMBMS broadcast schedule receiver device middleware may indicate to the "podcatcher" application the presence of the podcast in the eMBMS broadcast schedule event, which may trigger the "podcatcher" application to provide a notification of the successful subscription/registration. In an embodiment, the receiver device processor may provide subscription services to a Web feed as a standalone user service, or as an individual content item of an aggregated user service comprising multiple Web feeds.

At block 1510 the receiver device processor may download the subscribed podcast at the schedule eMBMS broadcast time via eMBMS delivery. In an embodiment, upon successful subscription, the user/receiver device may be automatically subscribed such that no further end-user subscription action is required to trigger the receiver device to download the corresponding content according to the delivery schedule associated with the subscribed content.

After successfully downloading the podcast, at block 1512 the receiver device processor may store the podcast. As an example, the receiver device processor may store the downloaded podcast in a receiver device memory cache. At block 1514 the receiver device processor may indicate a successful download. As an example, the receiver device processor may display a pop-up window via the "podcatcher" application as an indication to the user of new content availability. As another example, the eMBMS client/stack may send a notification to the device middleware of successful download and on-board caching and in turn, the middleware may send an indication to the "podcatcher" of content availability. At block 1516 the receiver device processor may receive a podcast play indication. As an example, a podcast play indication may be touch screen event indication corresponding to a user selection of a podcast to be played. At block 1518 the receiver device processor may play the podcast. As an example, when the user selects to play out a previously downloaded podcast, because the "podcatcher" had received the successful subscription indication at block 1508, the "podcatcher" may obtain the media file from a receiver device memory as opposed to attempting unicast retrieval. In one embodiment, the "podcatcher" software may connect directly to a receiver device memory based on a URL given to the "podcatcher" by the middleware when the middleware informed the "podcatcher" of local content availability. In another example, the unicast fetch attempt by the "podcatcher" may be intercepted by the receiver device middleware, which rather than unicast fetching the media, may fetch the stored media file from the receiver device memory and provide it to the "podcatcher. In an embodiment, upon playing the podcast the receiver device may determine its location and may generate a view history report including its location. The receiver device may send this view history report to a server, such as an eMBMS service provider server, content broadcaster server, and/or third party view history reporting service server. The server receiving the view history report may use the location information to assign view credit for the content associated with the played podcast to the appropriate content provider, such as the content provider associate with the DMA the receiver device is located in when the podcast is played.

In an embodiment, a station may determine the content to offer via streaming versus download based on user satisfaction. In an embodiment, user satisfaction may be determined based on collected usage reports. As an example, usage reports may detail the programs that had the lowest user satisfaction based on low video quality in resolution and/or stalls/buffering occurrences. Such low video quality in resolution and/or stalls/buffering occurrences may correspond to those programs with the greatest user demand because user demand for those programs may impose the most traffic loading problems on the cellular unicast network supporting the video streaming. As an example, the station may create downloadable podcasts for the highest user demand programs and stream the lower user demand programs. In an embodiment, a station may determine the content to offer via streaming versus download based on user interest levels. In an embodiment, user interest may be determined based on collected usage reports. As an example, usage reports may detail the programs that had the highest overall viewership as measured by the frequency of content viewing on the associated syndicated feed channel. As an example, the station may create downloadable podcasts for the content with the highest user interest levels and/or for content above a user interest level threshold. In a further embodiment, a station may monitor usage reports to determine whether content should no longer be provided via streaming. As an example, high interest content may be identified and the station may terminate the feed channel for the high interest content, thus only providing the content via download. An another example, low interest content and/or low user satisfaction content may be identified and the station may terminate the feed channel for the low interest content and/or low user satisfaction content. In the various embodiments, content identified for termination of its feed channel may or may not be provided via download.

In some instances, content license requirements may not govern the user receiver device's location during content reception. Rather, the DMA restrictions may only apply to the receiver device's location at the time of viewing of the content. Thus, reception and subsequent storage of video or audio podcast content may be unconstrained by the receiver device's location during the transmission of the content. In such an embodiment, a secure DMA determination may occur at the time a client application is activated to retrieve and/or play the stored content. In an embodiment, the DMA determination may be based on locally stored DMA records (i.e., stored in the receiver device) without interactive communication between the receiver device and a geolocation server.

A difference between streaming (e.g., webcasting) and download delivery ("podcasting") service models may be the presence in the latter of stored content on the receiver device which may not be immediately played after becoming available. As examples, stored content may result from a user not selecting some downloaded content for viewing or from the receiver device being outside the permitted DMA at the time user wanted to view the content. A cache management strategy may be necessary for downloaded programs due to their relative size. In an embodiment, the downloaded program cache may be managed by gaining and/or first-in-first-out processes. In an embodiment, the downloaded program cache may be managed based on predictions regarding a user's future locations and where a downloaded program is likely to be watched. Receiver devices may be configured to make such predictions based upon the user's recent travel history, calendar application data and other information that may be locally available to an application running on the receiver device. In an embodiment, those programs whose associated/ permitted DMAs as mapped to cell sites (identified by cell-ID) best match the recurring entries in the receiver device's cell-ID history log may be prioritized for retention. In another embodiment, those programs whose associated/permitted DMAs defined by geographic coordinates (e.g., latitude and longitude) that best match a location log of receiver device locations retained in memory may be prioritized for retention.

The systems, methods, and receiver devices of the various embodiments may enable OTT services for broadcast stations. The various embodiments may enable registration of user receiver devices via unicast communications, may identify service region (DMAs and/or subsections of DMAs) in a registration process, and may enable receiver device/server key pairs. The various embodiments may allow for the provisioning of a receiver device at the time of manufacture, including the creation of unit ID. The various embodiments provide methods to authenticate and encrypt records from receiver devices and/or networks, such as by using asymmetric encryption methods, such as RSA encryption. The various embodiments may provide methods to determine the current operational DMA. In an embodiment, the current operational DMA and/or DMA subsection may be determined by sampled use of receiver device GPS receivers at a low duty cycle and comparison to defined DMA boundaries obtained from geo data server. In an embodiment, DMA boundaries may be described as latitude and longitude coordinates. In an embodiment, the current operational DMA may be determined by comparing the eNB address to a listing for the current DMA obtained from a geo data server, such as when an eNB may be unfamiliar to the receiver device. In an embodiment, a receiver device may be delivered a "DMA Record" that describes attributes of a given DMA and/or subsection of a DMA. The DMA Record may be based on one or more location methods, including IP address, enode IDs, GPS, and/or Wi-Fi SSID.

In an embodiment, the receiver device may recognize its approximate location within a defined boundary or that the location may be within a defined description. Identification of approximate location may enable the indication of proximity to another area (e.g., another DMA or another DMA subsection). In an embodiment, proximity indication, in conjunction with direction of motion, may be used to facilitate providing data prior to handoff (e.g., next DMA, pre-fetch of next DMA service keys, and/or next DMA Record). In an embodiment the IP address range may be compared to data for the current DMA obtained from the geo data server.

In an embodiment, a receiver device may be required to connect to a geo data server in response to detecting that the receiver device is associated with an unfamiliar IP address. In an embodiment, receiver device report back may be used to populate a geo database with IP and eNB information. In an embodiment, valid report back may be required as a condition of service. In an embodiment, signing and/or encryption may be applied to report back records. In an embodiment, if an eNB or IP address seems dubious, a receiver device may resort to GPS, if available. In an embodiment, motion detection may be used to determine the need and/or availability to use GPS (i.e., if receiver device is moving, it may be in a vehicle, and GPS may be likely to work). In an embodiment, service to long term physically static clients (i.e., fixed receiver devices) may be restricted to IP address methods. In an embodiment, a receiver device may be flagged at a server as immobile. In an embodiment, motion may be detected via change of eNB address or metrics collected from a physical layer of the receiver device.

In an embodiment, viewing records may be acquired from remote receiver devices. In an optional embodiment, viewing records may be authenticated via a signing key pair. In an optional embodiment, viewing records may be encrypted via an encryption key pair. In an embodiment, viewing records may be acquired by a proxy server. In an embodiment, viewing records may include both optionally signed and optionally encrypted records. In an embodiment, optional proxy signing and encryption key pairs may be enabled. In an embodiment, viewing records may be aggregated into a single transaction/connection. In an embodiment, each participating providers' records may be collected at the same time as separate per provider files. In an embodiment, individual service provider signing and encryption may occur on a per record basis. In an embodiment, individual service provider signing and encryption may occur for multiple files on a per provider basis. In an embodiment, individual service provider signing and encryption may occur on a per user basis. In an embodiment, all viewing records may be in a single file. In an embodiment, a separate encryption and signing key pair may be provided for a proxy server. In an embodiment, a network/provider may request viewing records. In an embodiment, a network/provider may request viewing records, via broadcast message. In an embodiment, a network/provider may request viewing records using program guide data structures. In an embodiment, a network/provider may request viewing records via a dedicated message. In an embodiment, a network/provider may request viewing records for all receiver devices in a DMA or DMA subsection (such as by specific proxy server request), specific receiver devices by provider, and/or a provider. In an embodiment, a receiver device may authenticate a view history request. In an embodiment, a receiver device may authenticate a view history request using a provider signing key (including station group signing key and/or station signing key) and/or a proxy server signing key.

In an embodiment, a unique unit ID may be generated upon provisioning of the client in the receiver device. The unique unit ID may be generated using deterministic and random (receiver device) data and/or using only deterministic (receiver device) data. In an embodiment, managed or self-generated unique service provider IDs may be generated. Managed or self generated unique service provider IDs may be generated using deterministic and random data and/or using only deterministic data.

In an embodiment, affiliate IDs for adjacent DMAs may be delivered via broadcast or unicast. Affiliate IDS may delivered using call letters, using abstracted IDs, and/or using URLs. URLs may be constructed by systematic methods and/or available from a known server.

In an embodiment, the current DMA and/or DMA subsection may be determined from the current location. Current DMA may be determined by geo-server server look up query using IP, eNB, Wi-Fi SSID, and/or Latitude/Longitude, via internal query of known IP ranges and/or eNB addresses, and/or a combination of geo-server and internal query. In an embodiment, the current DMA and/or DMA subsection may be determined locally by a processor of the receiver device using IP address, enode B ID, Wi-Fi SSID, and/or Latitude/Longitude (e.g., GPS coordinate). In another embodiment, the receiver device may provide one or more of an IP address, enode B ID, Wi-Fi SSID, and/or Latitude/Longitude (e.g., GPS coordinate) to a server and the server may determine the current DMA and/or DMA subsection. In further embodiment, a combination of determinations at both the receiver device and server using IP address, enode B ID, Wi-Fi SSID, and/or Latitude/Longitude (e.g., GPS coordinate) may be made to identify the current DMA and/or DMA subsection.

In an embodiment, a list of providers may be generated per DMA and/or station group. In an embodiment, the list of providers may be accessed via a server with DMA based URLs or abstracted DMA based URLs. In an embodiment, the list or providers may be received via broadcast or unicast from any provider in the DMA or station group. In an embodiment, a receiver device may be enabled to accept all service offerings/agreements on a per DMA basis. In an embodiment, a receiver device may be enabled to selectively accept service offerings/agreements on a per DMA basis. In an embodiment, a receiver device may be enabled to accept station group service offering/agreement on a nationwide basis for a given provider. In an embodiment, service access control may be receiver device side rule based, such as based on successful view history reporting. In an embodiment, successful view history reporting may be determined by signed acknowledgement by network. In an embodiment, service access control may be network/station side controlled, such as based on key denial for lack of successful view history reporting. In an embodiment, successful view history reporting may be determined by a valid signed hash of receiver device view history, such as via secure hash algorithms (e.g., SHA1). In an embodiment, view history log spoofing may be determined via biometric sensing or user interaction requirements. In an embodiment, the receiver device may be configured to display a periodic request for a user acknowledgement, determine whether a user acknowledgement is received within a set time period following the display of the periodic request and terminate the display of the OTT television content for the current licensed region in response to determining that a user acknowledgement is not received within the set time period. In an embodiment, the receiver device may terminate service at the end of the program unless the user indicates acknowledgment to continue.

In an embodiment, the receiver device may use a camera to perform gaze detection and shut down the display and/or reception if the user is not watching the display. Thus, in this embodiment method, the receiver device may determine whether a user's eye is focused on a display of the receiver device based on gaze detection using a camera of the receiver device, and terminate the display of the OTT television content for the current licensed region in response to determining that a user's eye is not focused on the display. In an embodiment, a response banner may be offered prior to display shut off. In an embodiment, a receiver device may report the response time and/or success/failure of a response request.

In an embodiment, handoff candidates may be provided to receiver devices via broadcast or unicast. In an embodiment, handoff candidate may be provided per DMA (may include multiple providers) and/or per provider (may include multiple DMAs). In an embodiment, handoff candidate may be provided per program (e.g., for syndicated programs). In an embodiment, handoff candidates may be preloaded for a specific DMA from a nearby DMA record. In an embodiment, handoff candidates may include DMA subsections.

In an embodiment, provider information may be provided via unicast by DMA or station group. In an embodiment, provider information may be provided using URLs with a systematic structure. In this manner, the receiver device may acquire provider information quickly in an unfamiliar DMA. In an embodiment, provider information may include abstracted DMA naming in URL naming. In an embodiment, DMAs may be looked up via abstracted or literal name on receiver device and/or via abstracted or literal name via a web service. In an embodiment, direct interaction report back may be enabled, such as by using embedded URL triggers to direct report back of impression, including sampling parameters.

In an embodiment, a key hierarchy may include DMA data either clear text or key and/or receiver device classification clear text or key. In an embodiment, a key delivery scheme may accommodate keying systems for multiple areas and/or multiple receiver device types. In an embodiment, monthly keys that support specific categories of equipment, DMAs, and/or DMA subsections may be generated. In an embodiment, the trust zone may be provisioned with receiver device capability either clear text of key, and receiver device capability may be concatenation of features accomplished via encryption and/or hashing capability codes. In an embodiment, trusted boot may be used to make derivation of current region a trusted parameter on the receiver device. In an embodiment, software may be tied to region or DMA or DMA subsection, and computation may be authenticated by the receiver device trust zone.

In an embodiment, cache management of DMA Records may be performed by an application on the receiver device by using a location history log available to the receiver device to prioritize for retention those DMA Records whose cell-IDs may correspond to the most matches to recurring entries in the location history log. In an embodiment, download delivery of programs for offline viewing may be provided by offering contents as a video (or audio) podcast services. In this manner, aggravation to a unicast network loading due to excessive OTT streaming delivery may be reduced and higher video quality and user experience may be realized. In an embodiment, a station and/or station group may determine which contents to be offered for podcast/download delivery by monitoring the collective usage reports, and choosing for download those programs with the lowest user satisfaction, as measured by low video quality in resolution, or stalls/buffering occurrences. Such indices are likely to map to contents of greatest user demand, which in turn may impose the most traffic loading problems to cellular unicast networks in support of video streaming. In an embodiment, the downloads per object and/or downloads per page metrics may be reported to the station and/or station group and the reported downloads per object and/or download per page metrics may be used to determine whether broadcasting the object and/or page would be worthwhile. In an embodiment, a cache which holds yet-unwatched downloaded contents may be managed locally (i.e., on the receiver device) by using the available receiver device location history information to prioritize for retention those contents whose associated/permitted DMA's as mapped to cell sites (identified by cell-ID) that the best match to recurring entries in the receiver device's cell-ID history log. Similar mechanisms may be used for basing retention priorities based on geographic coordinates (e.g., obtained from a GPS receiver) and/or roaming history, if the receiver device maintains such logs in memory.

In an embodiment in which the content may be encapsulated in the DASH format, seamlessness handoff in playout of a streaming program when the receiver device crosses DMA boundaries may be enabled by ensuring a common value for expressing the effective availability time of any given DASH Media Segment of the program across all servers (including those belong to different TV stations) supporting content delivery in the program continuity service region. In an another embodiment in which the content may be encapsulated in the DASH format, seamlessness handoff in playout of a streaming program when the receiver device crosses DMA boundaries may be enabled by signaling to all receiver devices located within the program continuity service area a playout time for any given DASH Media Segment in the program that is no earlier than the latest availability time for that DASH Media Segment announced among all the MPDs in use within that service area.

In an embodiment, the Mobile Network Operator ("MNO") may need to turn on specific Multicast-Broadcast Single Frequency Networks ("MBSFNs") if a given program reaches a popularity threshold and the carrier decides to transition to an evolved Multimedia Broadcast Multicast Service (eMBMS). In an embodiment, the receiver devices taking services may be distributed within the licensed DMA, and the MNO may know which MBSFNs should be enabled. In another embodiment, the MNO may have a macro including identities of MBSFNs that serve the DMA. In an embodiment, a feed that starts as OTT may migrate to eMBMS due to popularity.

In an embodiment, the network side and trust zone of the receiver device may include mechanisms to establish trust. In an embodiment, on the receiver device side, these mechanisms may be provisioned at the time of manufacture of the receiver device. In an embodiment, a broadcaster may report its unique FCC ID (or similar ID) in signed program metadata along with the source DMA. In this manner, traceability of the source of broadcast content may be determined.

In an embodiment, popular podcasts (i.e., recurring file deliveries) may be converted to eMBMS. In an embodiment, the network side of the wireless provider may watch for recurring file requests that are popular (e.g., daily news morning news clip or similar content). In an embodiment, podcast popularity may be tracked. In an embodiment, when popular podcasts are determined they may be stored on a proxy server for eMBMS delivery when the podcast is posted so that such content may be immediately downloaded and distributed before all receiver devices start trying to take the content. In an embodiment, the MNO may establish a business relationship with the content holder such that the MNO may receive the podcast ahead of the content's distribution time, and the content may be pre-delivered to receiver devices obviating the need for the user or the receiver device to request it every time it is viewed. In an embodiment, recurring file downloads may be detected, and the periodicity between the recurring file downloads (e.g., daily and/or weekly) may be used to determine the presence of a required podcast that may be delivered via eMBMS services.

Figure 16:
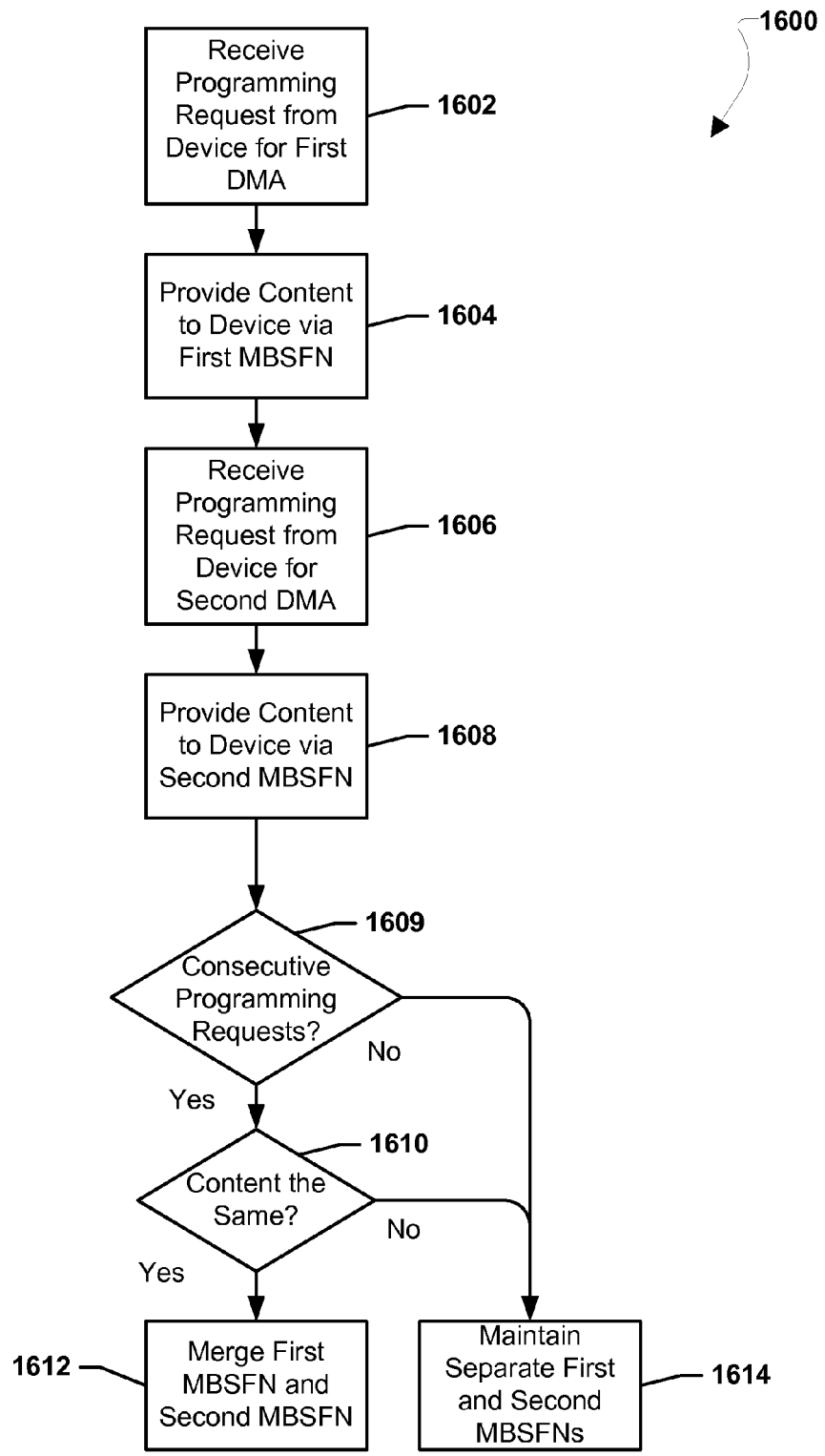
FIG. 16 is a process flow diagram illustrating an embodiment method for structuring MBSFNs based on OTT television content.

FIG. 16 illustrates an embodiment method 1600 for structuring MBSFNs based on OTT television content. The method 1600 may be performed by a server of an eMBMS network operator. In an embodiment, at an initial time the eMBMS network may be configured such that a first MBSFN encompasses a first DMA and a second, separate, MBSFN encompasses a second DMA. A wireless receiver device in the first DMA may pass a programming request through the eMBMS network operator, and in block 1602 the eMBMS network server may receive the programming request from the wireless receiver device for programming provided in the first DMA. As an example, the programming request may be a request for OTT television content provided by a first local affiliate broadcaster licensed in the first DMA, and the programming request may specify a URL of a server of the first local affiliate broadcaster from which OTT television content may be provided. In an embodiment in which the local affiliate broadcasters provide network television content (e.g., national televised sporting events, national network television programs, etc.) by redirecting programming requests to a URL of a national television network server, in block 1604 the eMBMS network server may provide content to the wireless receiver device via the first MBSFN from the national television network server. When the wireless receiver device travels from the first DMA to the second DMA, the connection to the first MBSFN may be dropped (e.g., to respect DMA boundaries and/or due to MBSFN differences) and the wireless receiver device may be required to establish a new connection to the second MBSFN. In block 1606 the eMBMS network server may receive a new programming request from the wireless receiver device for programming provided in the second DMA. As an example, the programming request may be a request for OTT television content provided by a second local affiliate broadcaster licensed in the second DMA, and the programming request may specify a URL of a server of the second local affiliate broadcaster from which OTT television content may be provided. In an embodiment in which the local affiliate broadcasters provide network television content (e.g., national televised sporting events, national network television programs, etc.) by redirecting programming requests to a URL of a national television network server, in block 1608 the eMBMS network server may provide content to the wireless receiver device via the second MBSFN from the national television network server.

In determination block 1609 the eMBMS network server may determine whether consecutive programming requests were received from the wireless receiver device. As an example, the eMBMS network server may determine that program requests were received by inspecting packets via deep packet inspection of transmissions from the wireless receiver device across the eMBMS network. Based on the known identity of all wireless receiver devices in the eMBMS network, the eMBMS network server may identify that the specific wireless receiver device made consecutive programming requests in two adjacent DMAs. If consecutive programming requests were not made (i.e., determination block 1609="No"), in block 1614 the eMBMS network server may maintain separate first and second MBSFNs.

If consecutive programming requests were made (i.e., determination block 1609="Yes"), in determination block 1610 the eMBMS network server may determine whether the content associated with the consecutive programming requests is the same. In an embodiment, the eMBMS network server may perform deep packet inspection on the content provided to the wireless receiver device to determine whether the source URL for the content was the same. As an example, during a national televised sporting event, the local affiliate broadcaster for the first DMA and the local affiliate broadcaster for the second DMA may be both redirecting programming requests to the same national television network server URL and the source URL for the national televised sporting event may be the same. Thus, though the two DMAs are different and the MBSFNs may be different, the OTT television content being broadcast in the two DMAs and two MBSFNs may, in effect, be the same content.

If the OTT television content is determined to be the same (i.e., determination block 1610="Yes"), in block 1612 the eMBMS network server may merge the first MBSFN with the second MBSFN to create a combined MBSFN. If the OTT television content is not the same (i.e., determination block 1610="No"), in block 1614 the eMBMS network server may maintain separate first and second MBSFNs.

The embodiment method 1600 illustrated in FIG. 16 enables the structure of the MBSFNs in the eMBMS network to be managed based on the similarity of OTT television content in two DMAs. Such management may improve the transition between DMAs for wireless receiver devices displaying national television network provided OTT television content. Additionally, the management of the eMBMS network based on OTT television content may enable structuring adaptive networks independent of published television programming schedules.

Figure 17:
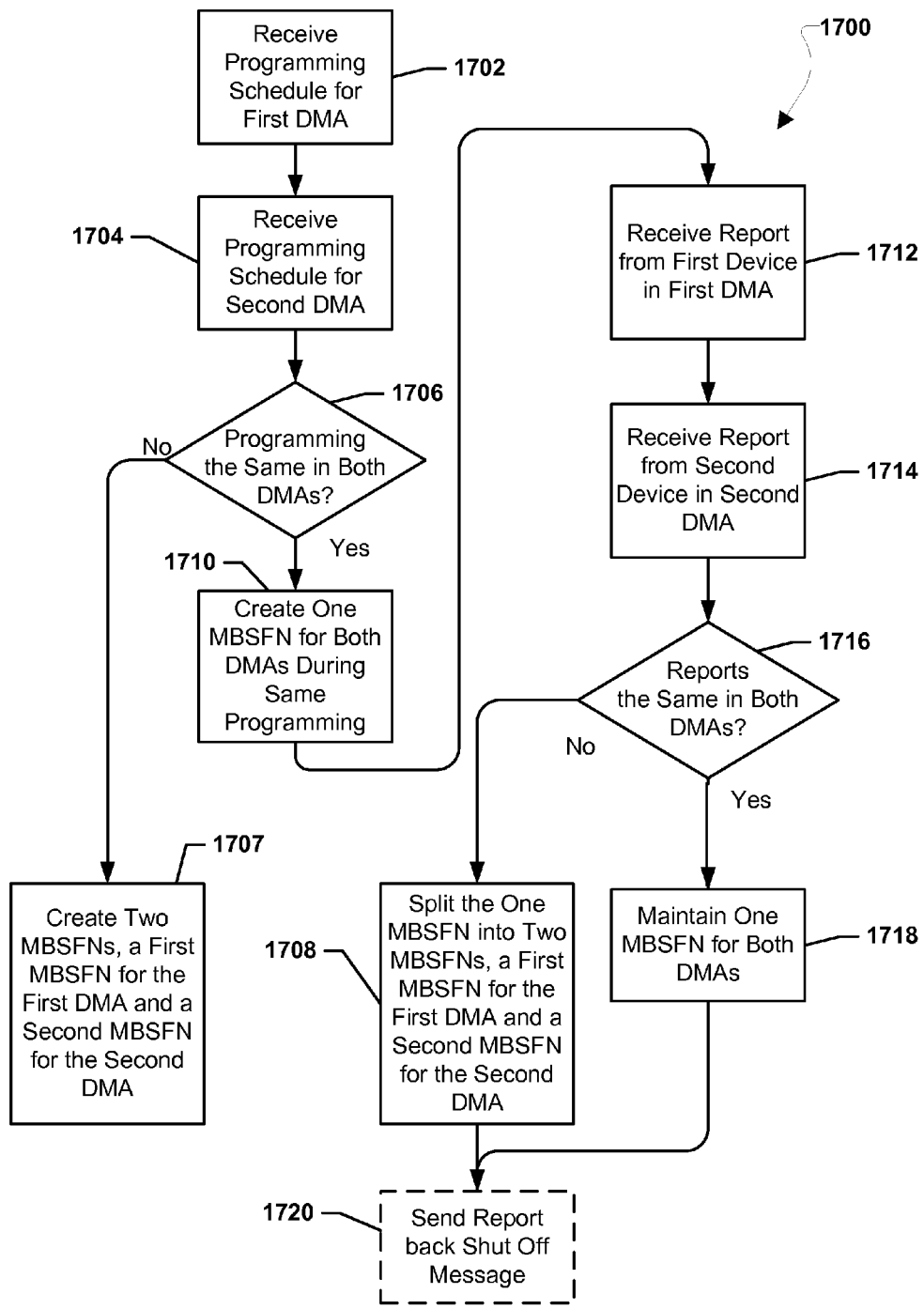
FIG. 17 is a process flow diagram illustrating an embodiment method for structuring MBSFNs based on television programming schedules.

FIG. 17 illustrates an embodiment method 1700 that may be performed by a server of an eMBMS network operator for structuring MBSFNs based on television programming schedules. In block 1702 the eMBMS network server may receive a television programming schedule for a first DMA. In an embodiment, the television programming schedule may be a web based schedule published by a local affiliate broadcaster licensed for the first DMA and/or a national published television programming schedule, such as a web based schedule provided by Tribune Media Services. In a similar manner, in block 1704 the eMBMS network server may receive a television programming schedule for a second DMA. In determination block 1706 the eMBMS network server may determine whether any scheduled television programming broadcast for the first DMA and the second DMA will be the same for both DMAs at the same time. As an example, to determine whether programming will be the same, the eMBMS network server may compare programming increments (e.g., 15 minute increments, 30 minute increments, 60 minute increments, etc.) on scheduled dates to identify matching programming information (e.g., titles, episode numbers, etc.) during corresponding programming increments. During programming increments in which programming is not the same in both DMAs (i.e., determination block 1706="No"), in block 1707 the eMBMS network server may create two MBSFNs, a first MBSFN for the first DMA and a second MBSFN for the second DMA. In this manner, the different OTT television content may be broadcast to each DMA on its own independent MBSFN. During programming increments in which programming is the same in both DMAs (i.e., determination block 1706="Yes"), in block 1710 the eMBMS network server may create one MBSFN for both the first DMA and the second DMA.

While the creation of one MBSFN may be advantageous to the eMBMS network, published television schedules are sometimes wrong and/or local affiliate broadcaster programming may change. As an example, if a national televised sporting event runs past its allotted time, some local affiliate broadcasters may continue to air the national televised sporting event while others may air their originally scheduled programming To ensure that the eMBMS network structure is responsive to schedule changes, the eMBMS network operator may institute a report back scheme for the eMBMS network. In this approach, some or all of the wireless receiver devices in a DMA may be required to report back to the eMBMS network their actual displayed OTT television content at a given time. As an example, wireless receiver devices in the eMBMS network may be configured to report back their actual displayed OTT television content at a set periodicity. In an embodiment, the eMBMS network may employ a back-off scheme to limit the report rate of the wireless receiver devices.

In an embodiment in which wireless receiver devices are configured to report back their actual displayed OTT television content, in block 1712 the eMBMS network server may receive a report from a first receiver device in the first DMA. In an embodiment, the report may identify the actual displayed OTT television content by source address, such as a URL. In a similar manner, in block 1714 the eMBMS network server may receive a report from a second receiver device in the second DMA. In determination block 1716 the eMBMS network server may determine whether the reports indicate that the same content is being displayed in both DMAs. As an example, to determine whether the same content is being displayed, the eMBMS server may compare the source URLs included in the reports, and matching source URLs may indicate that the content is the same in both DMAs. If the same content is being broadcast in both DMAs (i.e., determination block 1716="Yes"), in block 1718 the eMBMS network server may maintain one MBSFN for both DMAs. In optional block 1720, the eMBMS network server may send a report back shut off message to one or more wireless receiver devices in the eMBMS network. The report back shut off message may be a forward link reporting message indicating to the receiving wireless receiver devices that no further reports of actual displayed OTT television content is required for a period of time. In this manner, the eMBMS network may conserve network resources after verifying the actual programming broadcast in each DMA.

If the OTT television content being broadcast in the two DMAs is different (i.e., determination block 1716="No"), in block 1708 the eMBMS network server may split the one MBSFN into two MBSFNs, namely a first MBSFN for the first DMA and a second MBSFN for the second DMA. In this manner, although the published television schedule was not accurate, the eMBMS network structure may be adapted to reflect the actual programming broadcast in each DMA. As discussed above, in an optional embodiment, in optional block 1720 the eMBMS network server may send a report back shut off message to one or more wireless receiver devices in the eMBMS network.

Figure 18:
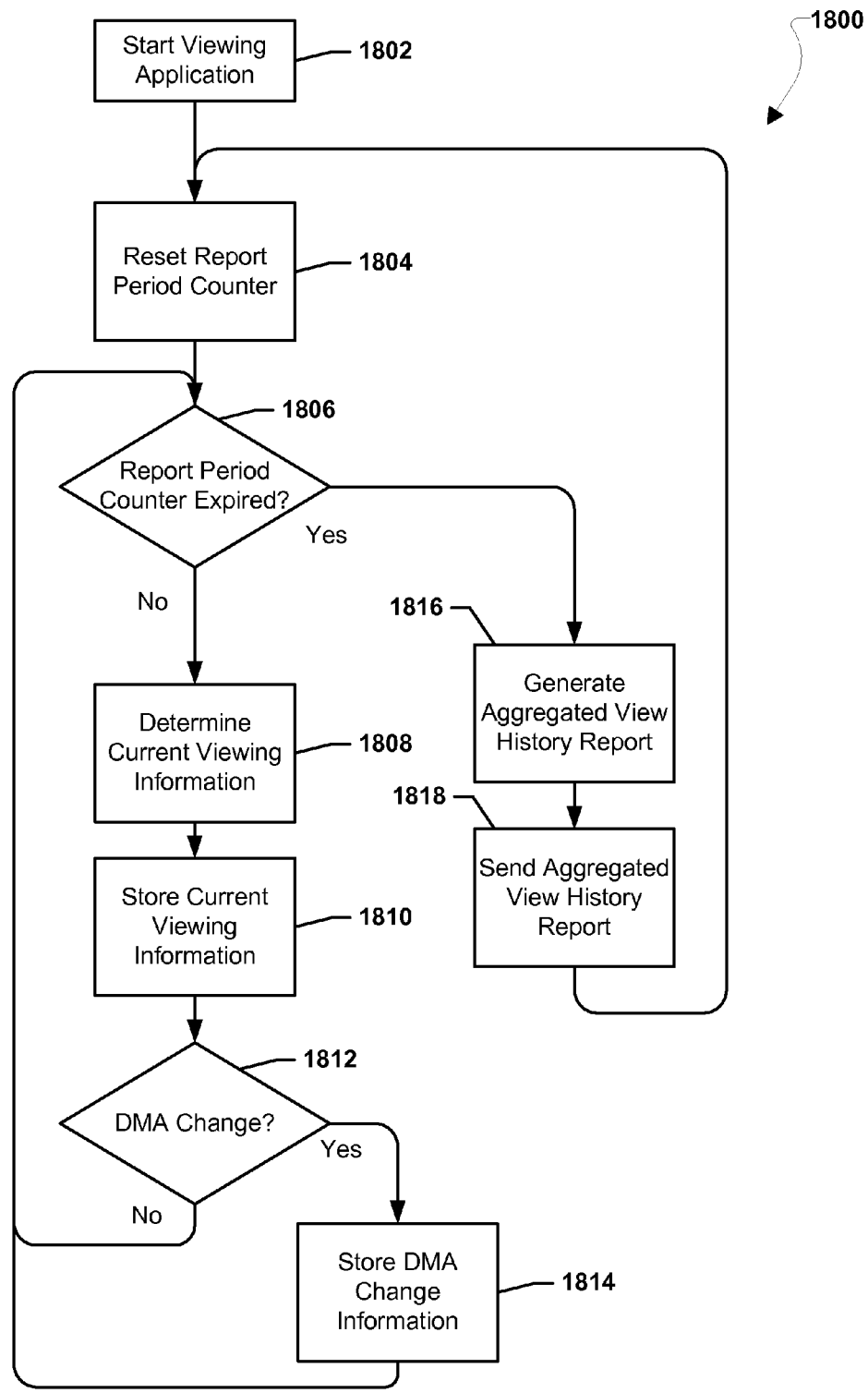
FIG. 18 is a process flow diagram illustrating an embodiment method for generating an aggregated view history report.

FIG. 18 illustrates an embodiment method 1800 that may be performed by a processor of a receiver device displaying OTT television content for generating an aggregated view history report. In block 1802 the receiver device processor may start an OTT television viewing application. In block 1804 the receiver device processor may reset a report period counter. In an embodiment, a report period counter may be a countdown timer set equal to a predetermined reporting period. In determination block 1806 the receiver device processor may determine whether the report period counter has expired. As an example, the receiver device processor may determine whether the value of the report period counter is equal to zero. If the report period counter has not expired (i.e., determination block 1806="No"), in block 1808 the receiver device processor may determine current viewing information for the receiver device. Current viewing information may include, the current DMA and/or DMA subsection the receiver device is located in, the current mobile and/or fixed telecom network providing OTT broadcast content services, the current source destination for broadcast content, current advertisements being displayed, the content ID for current content being displayed, a television program name, etc. In block 1810 the receiver device may store the current viewing information in a memory of the receiver device.

In determination block 1812 the receiver device may determine whether the DMA or DMA subsection has changed. As an example, to determine whether a DMA has changed the receiver device may compare a current GPS coordinate or cell tower ID to a stored DMA map to determine whether the current DMA matches a last determined DMA. If the processor determines that the DMA has changed (i.e., determination block 1812="Yes"), in block 1814 the receiver device may store the DMA change information. The DMA change information may include the time of the DMA change, the location at which a DMA boundary was crossed, the last DMA and/or DMA subsection, the current DMA and/or DMA subsection, etc. If the processor determines that the DMA has not changed (i.e., determination block 1812="No"), or following the storage of DMA change information in block 1814, in determination block 1806 the receiver device may determine whether the report period counter has expired.

If the report period counter has expired (i.e., determination block 1806="Yes"), in block 1816 the receiver device processor may generate an aggregated view history report. In an embodiment, an aggregated view history report may be a single report including all stored viewing information for the reporting period. As an example, the aggregated view history report may be a listing of all stored viewing information for the reporting period regardless of DMA. In block 1818 the receiver device processor may send the aggregated view history report to a server, such as a central view history service server. Sending a single aggregated view history report to a central server may reduce the telecom network resources used in reporting view history because only one connection between the receiver device and the telecom network may be required for the transmission. In block 1804 the processor may reset the report period counter. In this manner, the receiver device may continually store viewing information and generate view history reports.

Figure 19:
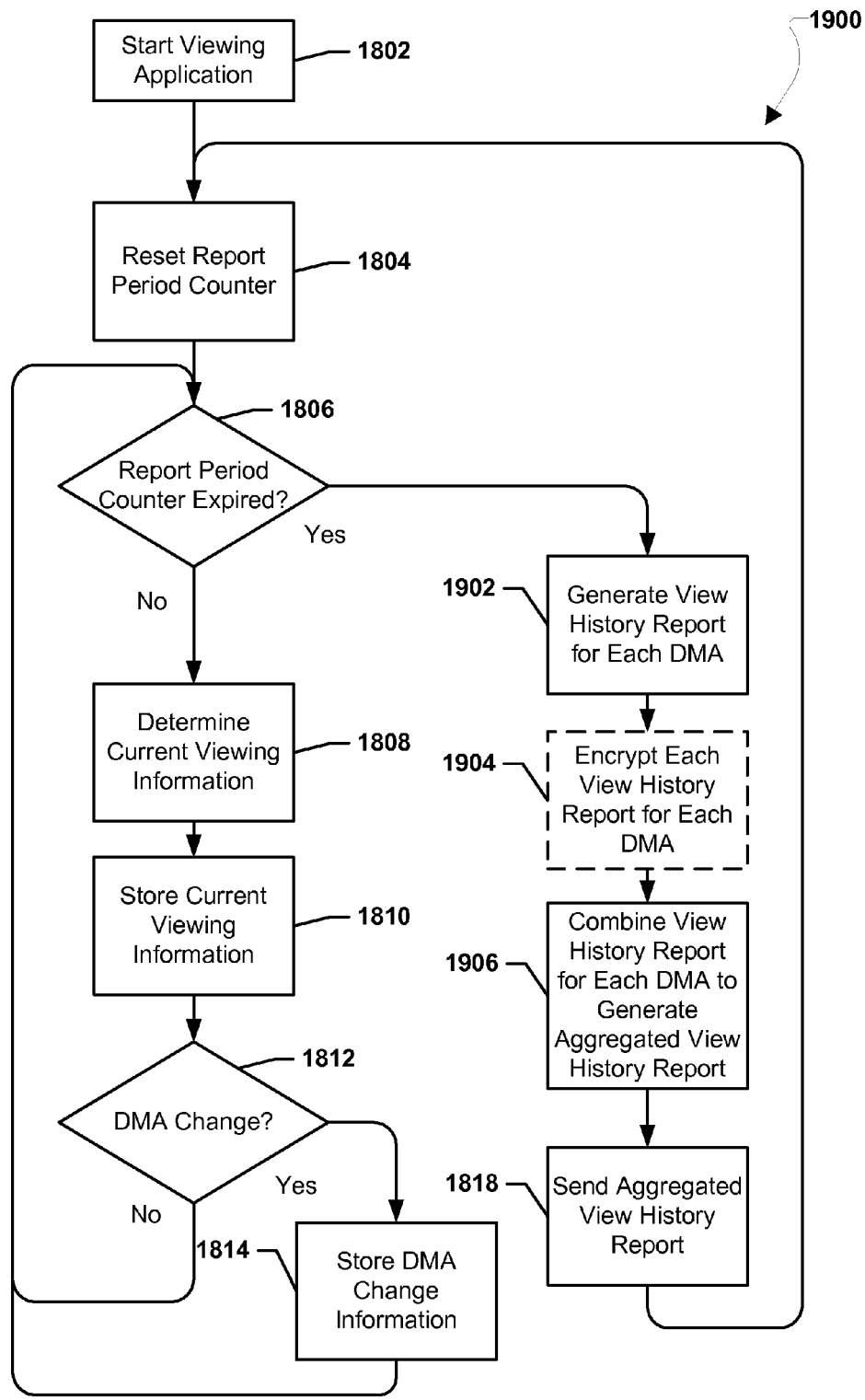
FIG. 19 is a process flow diagram illustrating another embodiment method for generating an aggregated view history report.

FIG. 19 illustrates an embodiment method 1900 similar to method 1800 described above with reference to FIG. 18, except that in method 1900 the receiver device processor may generate a view history report for each DMA and/or DMA subsection included in the stored viewing information. In blocks 1802, 1804, 1806, 1808, 1810, 1812, and 1814 the receiver device processor may perform operations similar to those of like numbered blocks of method 1800 described above. If the processor determines that the report period counter has expired (i.e., determination block 1806="Yes"), in block 1902 the receiver device processor may generate a view history report for each DMA and/or DMA subsection identified in the stored viewing information. As an example, if three DMAs were visited during the reporting period, three view history reports may be generated. In optional block 1904, the receiver device processor may encrypt each view history report for each DMA. As an example, each DMA may be associated with its own security key, and the receiver device may encrypt each DMA with that DMA's respective security key. In block 1906 the receiver device processor may combine the view history reports for each DMA to generate an aggregated view history report. In this manner, although each DMA may have its own view history report, a single combined file (the aggregated view history report) may be generated combining all the individual DMA view history reports. As discussed above, in block 1818 the aggregated view history report may be sent to a server, and in block 1804 the processor may reset the report period counter.

Figure 20:
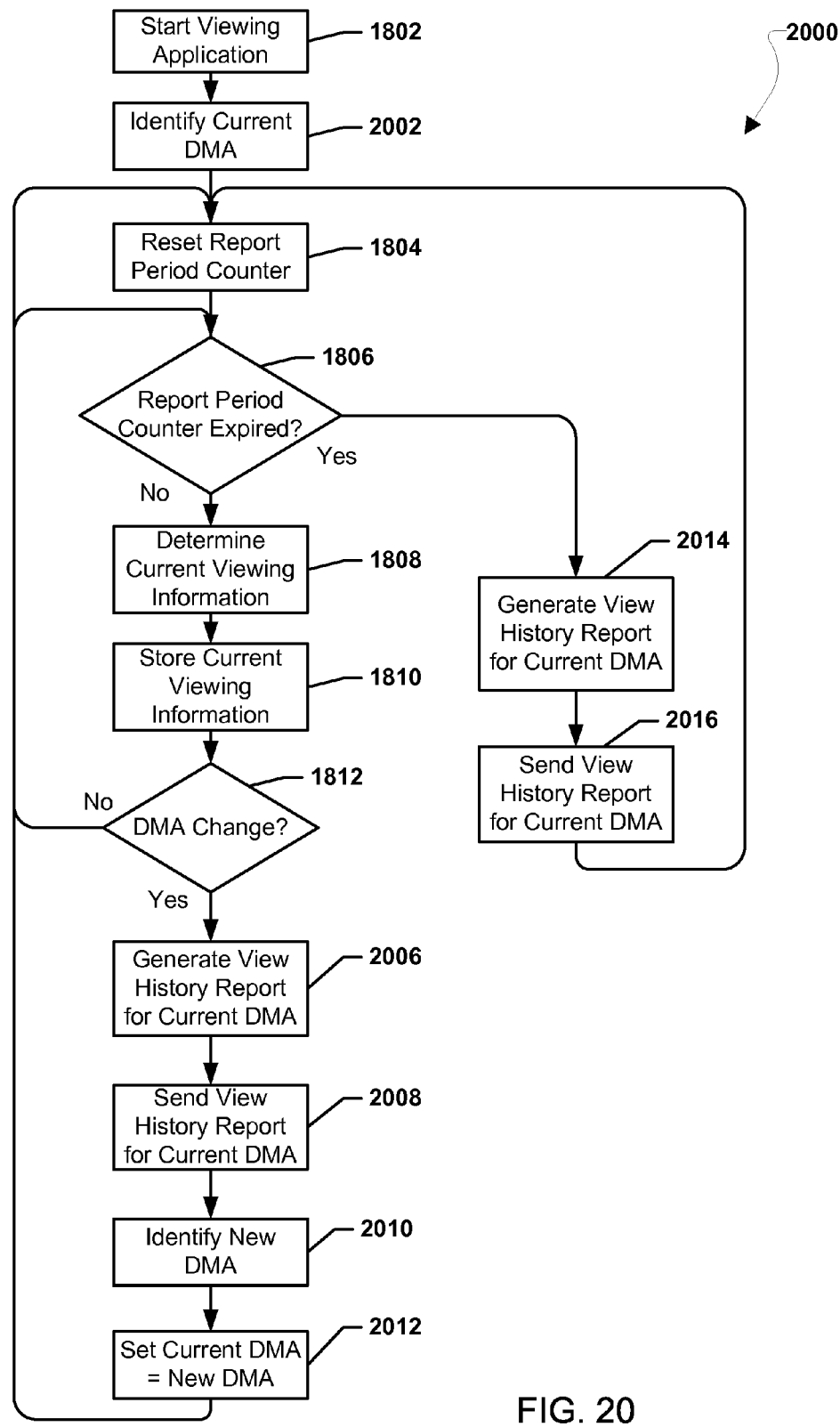
FIG. 20 is a process flow diagram illustrating an embodiment method for generating view history reports on a per DMA basis.

FIG. 20 illustrates an embodiment method 2000 similar to method 1800 described above with reference to FIG. 18, except that in method 2000 the receiver device may generate and send view history reports on a per DMA and/or DMA subsection basis. As discussed above, in block 1802 the receiver device processor may start a viewing application. In block 2002 the receiver device processor may identify the current DMA and/or DMA subsection in which the receiver device is located. As an example, the receiver device may compare its current latitude and longitude/GPS coordinates or a cell tower ID to a stored DMA map to identify the current DMA and/or DMA subsection. In block 1804, 1806, 1808, 1810, and 1812 the receiver device may perform operations similar to those of like numbered blocks of method 1800 described above.

If the processor determines that the DMA has changed (i.e., determination block 1812="Yes"), in block 2006 the receiver device processor may generate a view history report for the current DMA and/or DMA subsection including the stored current viewing information. In block 2008 the receiver device processor may send the view history report for the current DMA to a server. In an embodiment, the receiver device processor may send the view history report for the current DMA to a server of the broadcaster licensed for the current DMA. In another embodiment, the receiver device processor may send the view history report to a server of a central view history reporting service.

In block 2010 the receiver device processor may determine whether it has entered the new DMA and/or DMA subsection. As an example, the receiver device may compare its current latitude and longitude/GPS coordinates or a cell tower ID to a stored DMA map to identify the new DMA and/or DMA subsection. In block 2012 the receiver device processor may set an indication of the current DMA in a memory of the receiver device equal to the new DMA. As discussed above, in block 1804 the receiver device may reset the report period counter.

As discussed above, in determination block 1806 the receiver device processor may determine whether the report period counter has expired. If the report period counter has expired (i.e., determination block 1806="Yes"), in a manner similar to that discussed above with reference to block 2006, in block 2014 the receiver device processor may generate a view history report for the current DMA and/or DMA subsection. In a manner similar to that discussed above with reference to block 2008, in block 2016 the receiver device processor may send the view history report for the current DMA and/or DMA subsection to a server. In this manner, the receiver device may generate individual view history reports on a per DMA and/or DMA subsection basis. In block 1804 the processor may reset the report period counter.

Figure 21:
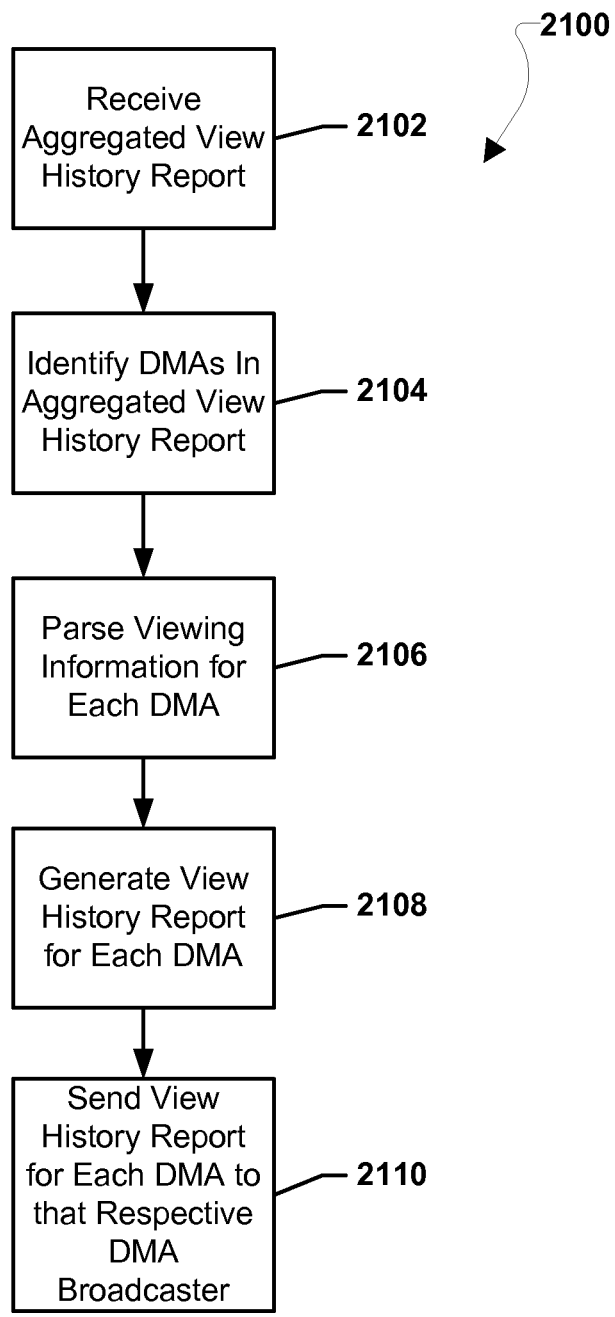
FIG. 21 is a process flow diagram illustrating an embodiment method for separating aggregated view history reports into individual DMA history reports.

FIG. 21 illustrates an embodiment method 2100 that may be performed by a server of a central view history reporting service for separating aggregated view history reports into individual DMA history reports to provide view history reports to broadcasters associated with individual DMAs and/or DMA subsections. In block 2002 the view history server may receive an aggregated view history report from a receiver device performing the operations of method 1800 described above with reference to FIG. 18. In block 2004 the view history server may identify the DMAs and/or DMA subsections in the aggregated view history report. As an example, each DMA and/or DMA subsection may have a unique identifier (i.e., a DMA identifier), and the view history server may recognize the unique identifiers in the aggregated view history report and associate them with their respective DMAs and/or DMA subsections. In block 2106 the view history server may parse the viewing information for each DMA and/or DMA subsection. As an example, the view history server may separate the information by DMA and/or DMA subsection and group information for the same DMA and/or DMA subsection together. In block 2108 the view history server may generate a view history report for each DMA and/or DMA subsection. In block 2110 the view history server may send the view history report for each DMA and/or DMA subsection to the respective DMA's and/or DMA section's licensed broadcaster.

Figure 22:
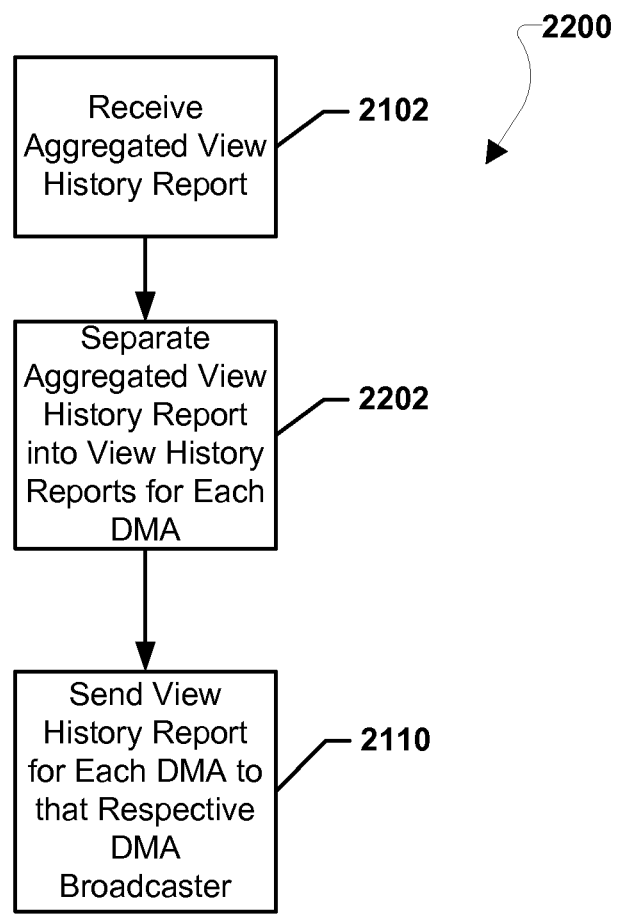
FIG. 22 is a process flow diagram illustrating another embodiment method for separating aggregated view history reports into individual DMA history reports.

FIG. 22 illustrates an embodiment method 2200 similar to method 2100 described above with reference to FIG. 21, except that in method 2200 the view history report server may not parse the actual information in the aggregated view history report. In block 2102 the view history report server may receive an aggregated view history report from a receiver device that may be a compilation of multiple individual DMA and/or DMA section view history reports generated by performing the operations of method 1900 described above with reference to FIG. 19. In an embodiment, each individual view history report in the aggregated view history report may include an indication, such as a header, that identifies the DMA and/or DMA subsection corresponding to the individual view history report. In block 2202 the view history server may separate the aggregated view history report into individual view history reports for each DMA and/or DMA subsection. In block 2110 the view history server may send the view history report for each DMA and/or DMA subsection to the respective DMA's and/or DMA subsection's licensed broadcaster. In this manner, manipulation of the data in each individual view history report, such as decryption, may not be required, and the view history server may simply act as a clearing house for view history reports to broadcasters.

Figure 23:
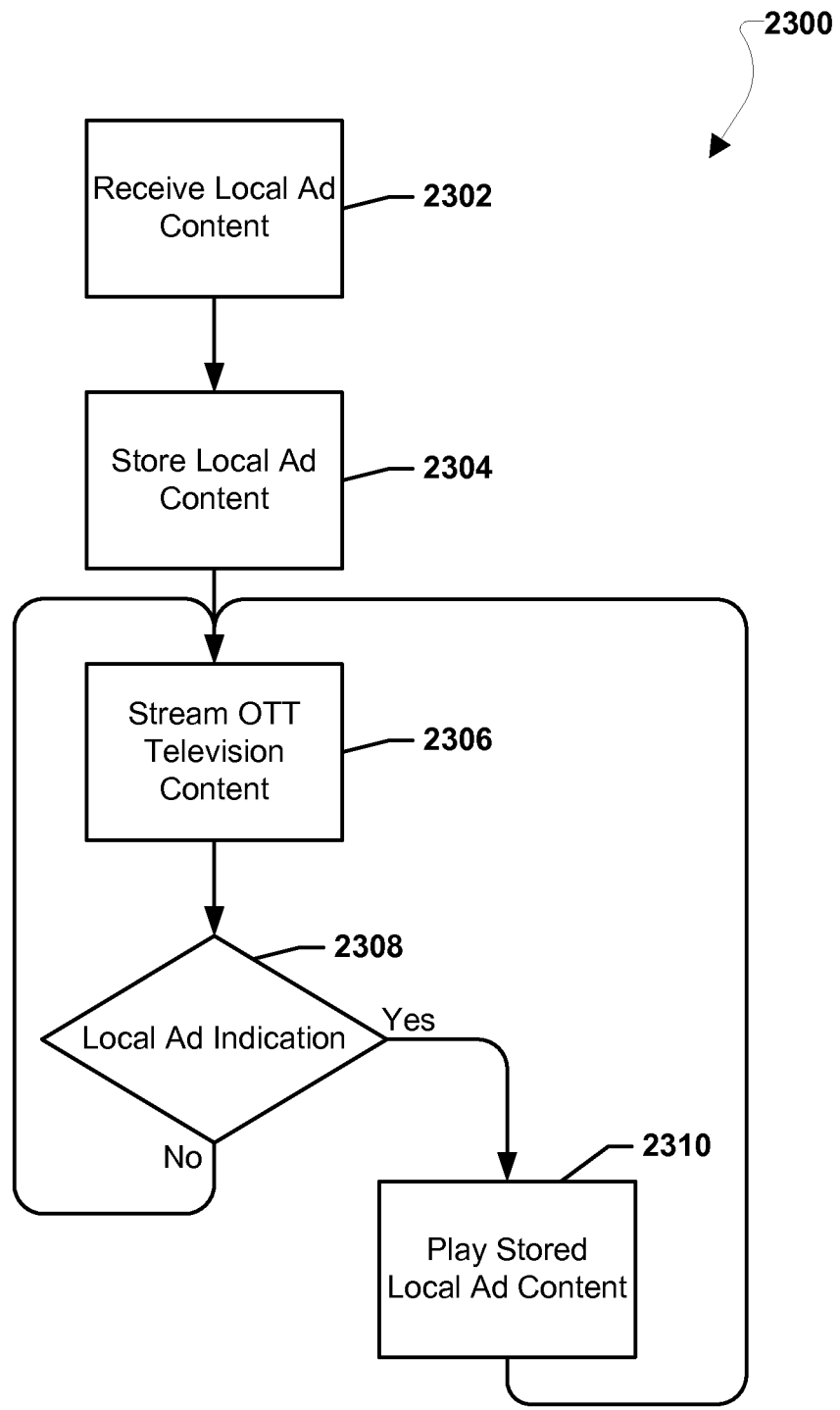
FIG. 23 is a process flow diagram illustrating an embodiment method for displaying local advertisements within streamed OTT television content.

FIG. 23 illustrates an embodiment method 2300 that may be performed by the processor of a receiver device for displaying local advertisements within streamed OTT television content. In block 2302 the receiver device may receive local advertisement ("ad") content. Local ad content may be media files containing local broadcaster commercials for a specific DMA sent to the receiver device, such as via unicast and/or broadcast transmissions. In block 2304 the receiver device processor may store the local ad content in a memory of the receiver device.

In block 2306 the receiver device may receive and display streamed OTT television content. As an example, the receiver device processor may utilize an OTT television stream application configured to operate as a DASH player to stream OTT television content. In an embodiment, the OTT television content may be provided by an entity other than the local affiliate broadcaster for the DMA (e.g., a national television network), and advertisement availabilities ("ad avails") within the OTT television content stream may provide the local affiliate broadcaster for the DMA the opportunity to provide local ads. Ad avail opportunities may be identified by local ad indications in the OTT television stream. In determination block 2308 the receiver device processor may determine whether a local ad indication is present in the OTT television content stream. As an example, a segment of the stream may include an indication, such as a header, that a local ad may be played in place of the segment. If the processor determines that a local ad indication is not present (i.e., determination block 2308="No"), in block 2306 the receiver device processor may continue to display the streamed OTT television content. If the processor determines that a local ad indication is present (i.e., determination block 2308="Yes"), in block 2310 the receiver device processor may stop displaying the streaming OTT television content and may play a portion of the stored local ad content. After playing the stored local ad content, in block 2306 the receiver device processor may return to displaying the streaming OTT television content.

Figure 24:
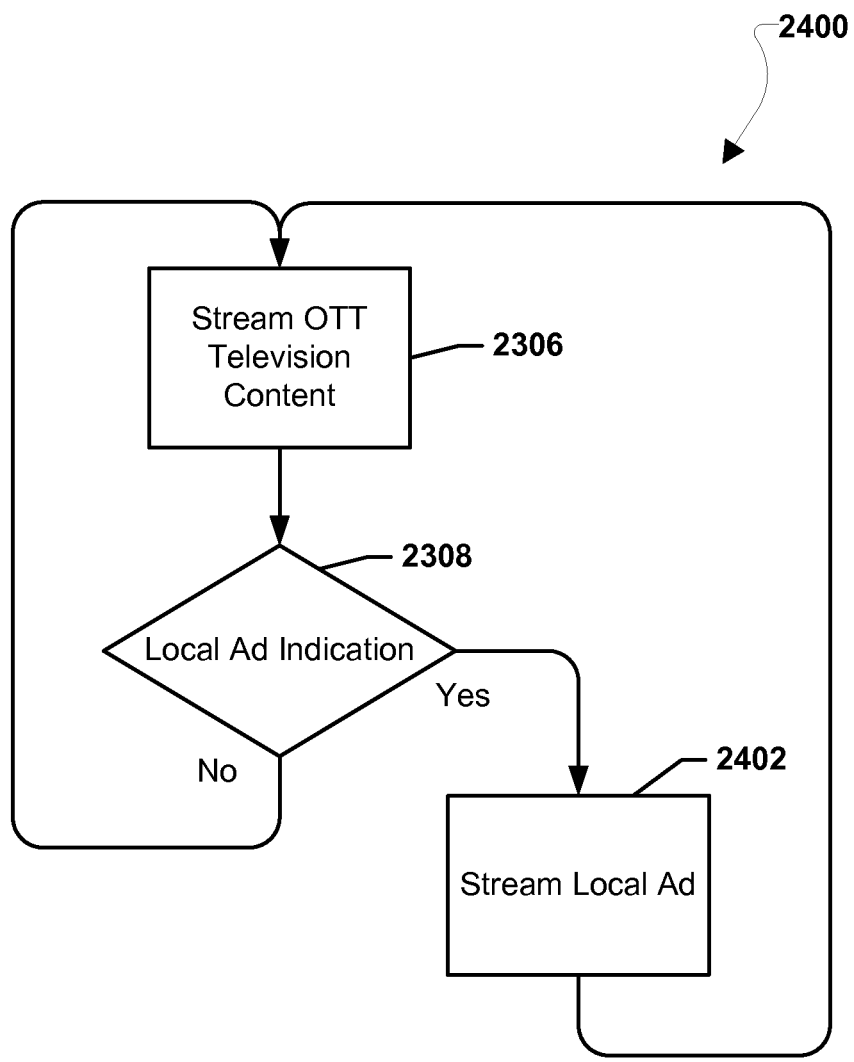
FIG. 24 is a process flow diagram illustrating another embodiment method for displaying local advertisements within streamed OTT television content.

FIG. 24 illustrates an embodiment method 2400 similar to method 2300 described above with reference to FIG. 23, except that in method 2400 local advertisements are provided in a separate stream of OTT content. As described above, in block 2306 the receiver device may play streamed OTT television content, and in determination block 2308 the processor may determine whether a local ad indication is included in the OTT television content stream. If the processor determines that a local ad indication is present (i.e., determination block 2308="Yes"), in block 2402 the receiver device processor may switch from the OTT television content stream to a local ad stream for a period of time. In an embodiment, the length of the segments of the OTT television content stream and the segments of the local ad stream may be factors (e.g., 1 sec, 3 sec, 5 sec, etc.) of the standard 15 second advertising segment and the segments of the OTT television content stream and the segments of the local ad stream may be aligned. In block 2306 the receiver device processor may return to playing the streaming OTT television content.

In an embodiment, the display of OTT television content may not be geographically restricted. Rather, no matter the DMA and/or DMA subsection the receiver device may be located in, OTT television content may be received and displayed if available. In such an embodiment, the receiver device may continually determine its location and the OTT television content being displayed. The receiver device may report its location and the OTT television content being displayed to a central view history reporting service. In an embodiment, the receiver device may report the DMA and/or DMA subsection ID corresponding to the receiver device location rather than the actual geographic location coordinates because the reporting of DMA and/or DMA subsection ID may require less network resources than reporting actual geographic location (e.g., latitude and longitude) coordinates. In an embodiment in which the display of OTT television content may not be geographically restricted, the central reporting service may provide view history reports to affiliate broadcasters. In an embodiment, the affiliate broadcasters may contract with each other to divide revenue based on view credits for OTT television content. As an example, in an embodiment in which two affiliate broadcasters are licensed in the same DMA, the affiliate broadcasters may split the proceeds of revenue from displayed OTT content based on their defined DMA subsections, viewing numbers for a specific content item (e.g., television show), and/or relative populations in their defined license territories. Additionally, in an embodiment OTT television content may be distributed via a third party and view history reporting may enable affiliate broadcasters for DMAs and/or DMA subsections to receive their respective viewing credit.

Figure 25:
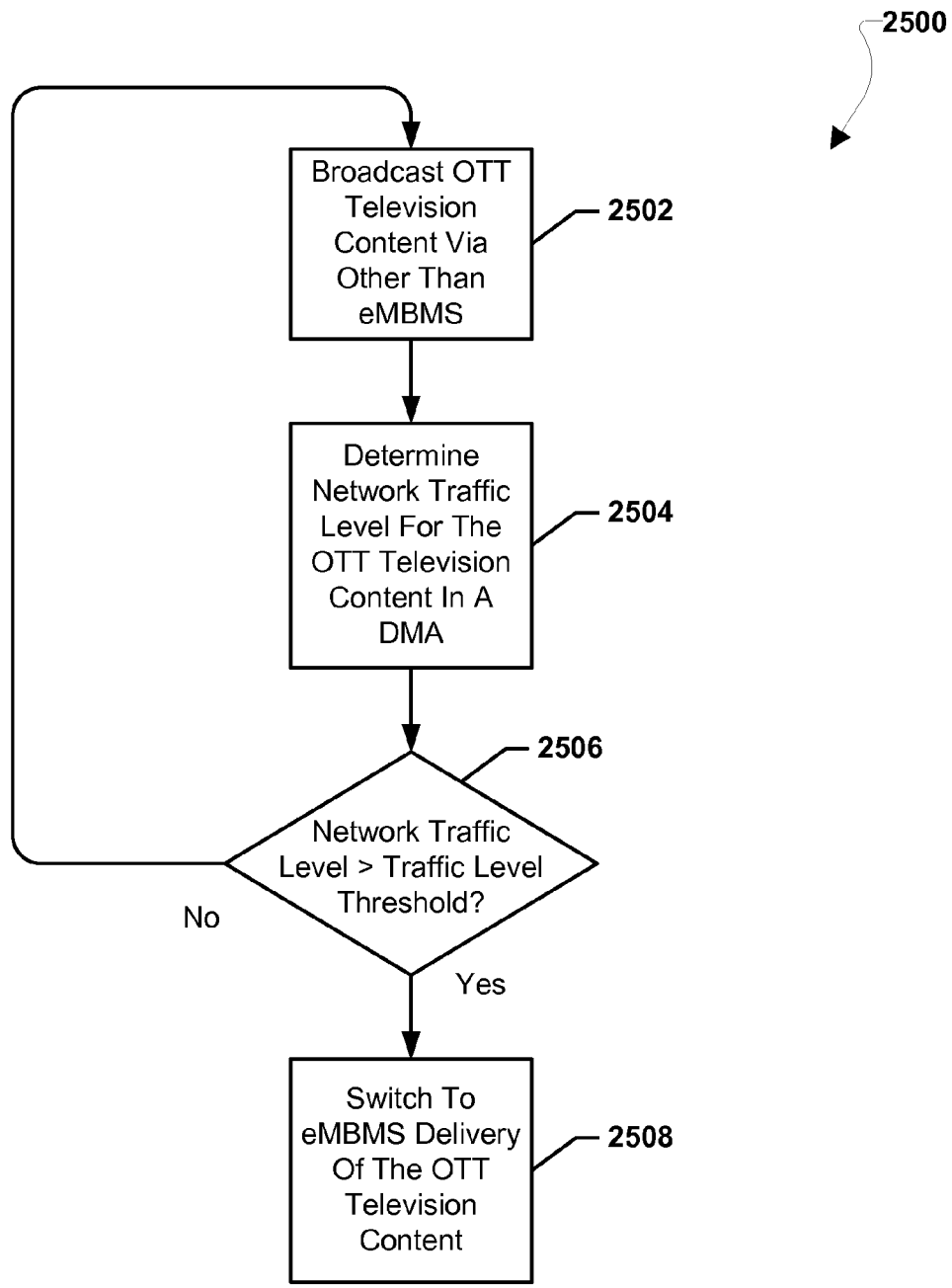
FIG. 25 is a process flow diagram illustrating an embodiment method delivering OTT television content to one or more receiver devices.

FIG. 25 illustrates an embodiment method 2500 for delivering OTT television content to one or more receiver devices. In an embodiment, the operations of method 2500 may be performed by a network server, such as an eMBMS service provider server that may direct the operations of a communication network to deliver OTT content via eMBMS and non-eMBMS to receiver devices operating in the communication network. In block 2502 the network server may direct the communications network to broadcast the OTT television content via a delivery mechanism other than eMBMS. In an embodiment, a unique ID associated with the broadcaster of the OTT television content (e.g., the broadcaster's Federal Communications Commission ("FCC") ID) may be broadcast with the OTT television content. In block 2504 the network server may determine the network traffic level for the OTT television content in a DMA. As an example, the network server may monitor traffic over the network, such as via deep packet inspection, receiver device reporting, etc., to determine a network traffic level. In determination block 2506 the network server may determine whether the network traffic level exceeds a traffic level threshold. In an embodiment, a traffic level threshold may be a value stored in a memory available to the network server representing a predetermined traffic level above which switching to eMBMs delivery of the OTT television content may be advantageous for network operations. If the network traffic level does not exceed the traffic level threshold (i.e., determination block 2506="No"), in block 2502 the network server may continue to direct the communications network to broadcast the OTT television content via a delivery mechanism other then eMBMS. If the network traffic level does exceed the traffic level threshold (i.e., determination block 2506="Yes"), the network server may direct communications network to switch to eMBMS for the delivery of the OTT television content in block 2508. In an embodiment, the network server may also determine the Multicast/Broadcast Single Frequency Network ("MBSFNs") to turn on based at least in part on a distribution of receiver devices within the DMA. In another embodiment, the network server may also determine the MBSFNs to turn on based at least in part on a list of MBSFNs associated with the DMA.

Figure 26:
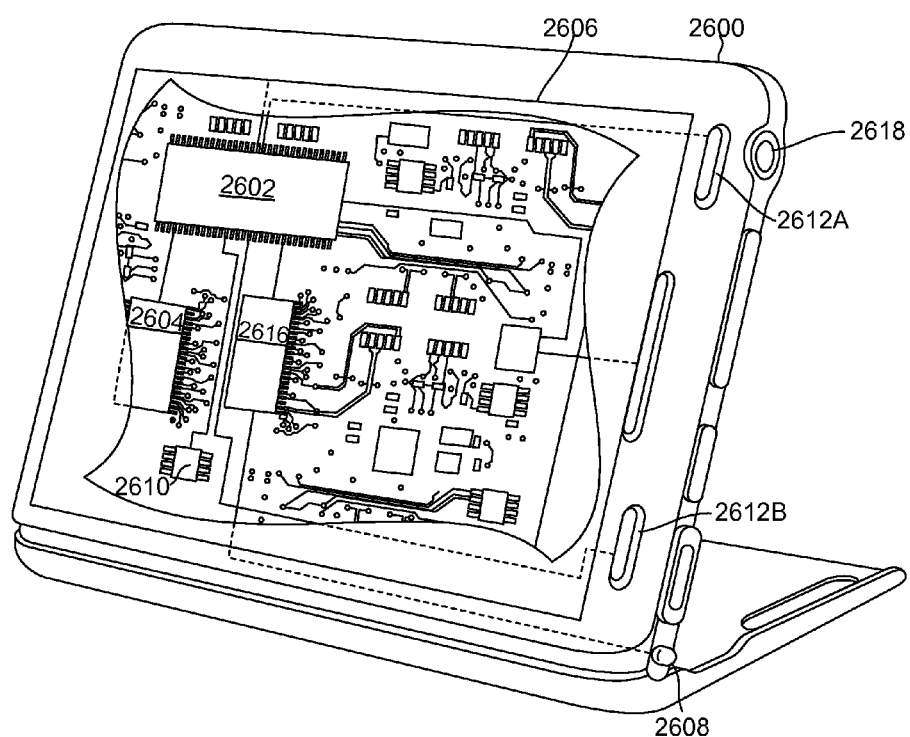
FIG. 26 is a component diagram of an example mobile receiver device suitable for use with the various embodiments.

The various embodiments may be implemented in any of a variety of mobile receiver devices, an example of which is illustrated in FIG. 26. For example, the mobile receiver device 2600 may include a processor 2602 coupled to internal memories 2604 and 2610. Internal memories 2604 and 2610 may be volatile or non-volatile memories, and may also be secure and/or encrypted memories, or unsecure and/or unencrypted memories, or any combination thereof. The processor 2602 may also be coupled to a touch screen display 2606, such as a resistive-sensing touch screen, capacitive-sensing touch screen infrared sensing touch screen, or the like. Additionally, the display of the mobile receiver device 2600 need not have touch screen capability. Additionally, the mobile receiver device 2600 may have one or more antenna 2608 for sending and receiving electromagnetic radiation that may be connected to network interface (e.g., a wireless data link and/or cellular telephone transceiver) 2616 coupled to the processor 2602 for connecting to a network (e.g., a communications network). The mobile receiver device 2600 may also include physical buttons 2612*a* and 2612*b* for receiving user inputs. The mobile receiver device 2600 may also include a power button 2618 for turning the mobile receiver device 2600 on and off.

Figure 27:
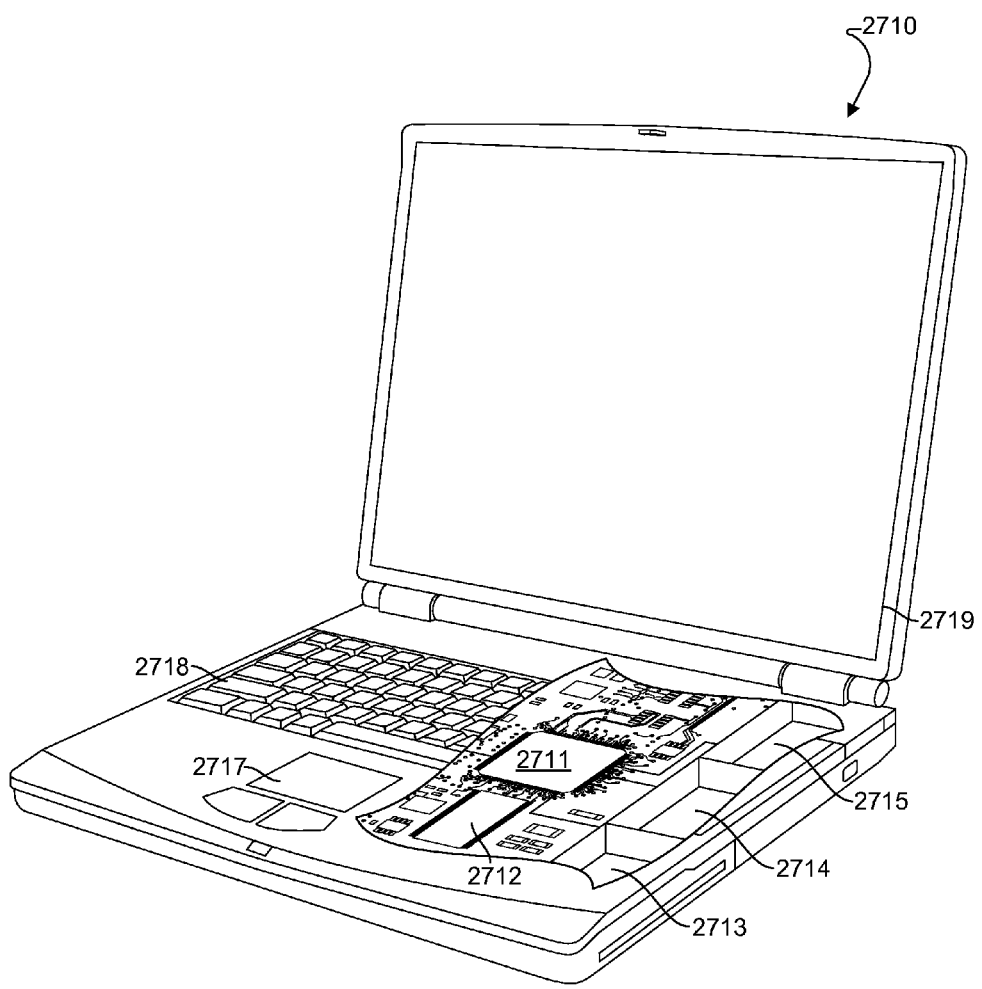
FIG. 27 is a component diagram of another example mobile receiver device suitable for use with the various embodiments.

The various embodiments described above may also be implemented within a variety of personal receiver devices, such as a laptop computer 2710 as illustrated in FIG. 27. Many laptop computers include a touch pad touch surface 2717 that serves as the computer's pointing receiver device, and thus may receive drag, scroll, and flick gestures similar to those implemented on mobile receiver devices equipped with a touch screen display and described above. A laptop computer 2710 will typically include a processor 2711 coupled to volatile memory 2712 and a large capacity nonvolatile memory, such as a disk drive 2713 of Flash memory. The computer 2710 may also include a floppy disc drive 2714 and a compact disc (CD) drive 2715 coupled to the processor 2711. The computer receiver device 2710 may also include a number of connector ports or other network interfaces coupled to the processor 2711 for establishing data connections or receiving external memory receiver devices, such as a USB or FireWire® connector sockets, or other network connection circuits for coupling the processor 2711 to a network (e.g., a communications network). In a notebook configuration, the computer housing includes the touchpad 2717, the keyboard 2718, and the display 2719 all coupled to the processor 2711. Other configurations of the receiver device may include a computer mouse or trackball coupled to the processor (e.g., via a USB input) as are well known, which may also be use in conjunction with the various embodiments.

Figure 28:
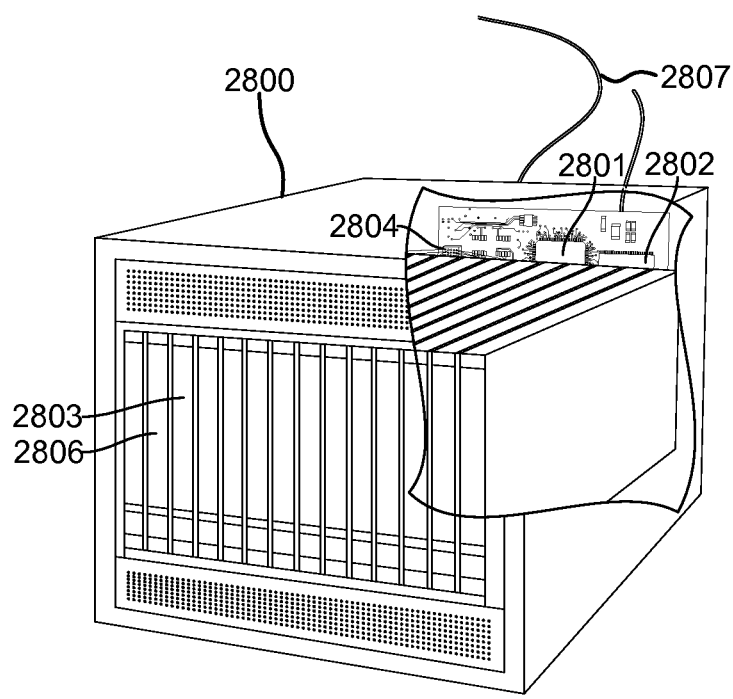
FIG. 28 is a component diagram of an example server suitable for use with the various embodiments.

The various embodiments may also be implemented on any of a variety of commercially available server receiver devices, such as the server 2800 illustrated in FIG. 28. Such a server 2800 typically includes a processor 2801 coupled to volatile memory 2802 and a large capacity nonvolatile memory, such as a disk drive 2803. The server 2800 may also include a floppy disc drive, compact disc (CD) or DVD disc drive 2806 coupled to the processor 2801. The server 2800 may also include network access ports 2804 coupled to the processor 2801 for establishing communications network interface connections with a network 2807, such as a local area network coupled to other broadcast system computers and servers.

The processors 2602, 2711, and 2801 may be any programmable microprocessor, microcomputer or multiple processor chip or chips that can be configured by software instructions (applications) to perform a variety of functions, including the functions of the various embodiments described above. In some receiver devices, multiple processors may be provided, such as one processor dedicated to wireless communication functions and one processor dedicated to running other applications. Typically, software applications may be stored in the internal memory 2604, 2610, 2712, 2713, 2802, and 2803 before they are accessed and loaded into the processors 2602, 2711, and 2801. The processors 2602, 2711, and 2801 may include internal memory sufficient to store the application software instructions. In many receiver devices the internal memory may be a volatile or nonvolatile memory, such as flash memory, or a mixture of both. For the purposes of this description, a general reference to memory refers to memory accessible by the processors 2602, 2711, and 2801 including internal memory or removable memory plugged into the receiver device and memory within the processor 2602, 2711, and 2801 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic receiver device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable or server-executable instructions or code on a non-transitory computer-readable medium. The steps of a method or algorithm disclosed herein may be embodied in processor-executable or server-executable software module which may reside on a tangible, non-transitory computer-readable storage medium. Non-transitory computer-readable storage media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage receiver devices, or any other medium which may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for delivering Over the Top ("OTT") television content to one or more receiver devices, comprising:
    broadcasting the OTT television content including Dynamic Adaptive Streaming over HTTP ("DASH") media segments to the one or more receiver devices;
    determining a network traffic level for the OTT television content including DASH media segments in a Designated Market Area ("DMA");
    determining whether the network traffic level for the OTT television content including DASH media segments in the DMA exceeds a traffic level threshold; and
    switching from the broadcasting to evolved Multimedia Broadcast Multicast Service ("eMBMS") for delivery of the OTT television content including DASH media segments in response to determining that the network traffic level for the OTT television content including DASH media segments in the DMA exceeds the traffic level threshold.

2. The method of claim 1, further comprising:
    determining the Multicast/Broadcast Single Frequency Networks ("MBSFNs") to turn on based at least in part on a distribution of the one or more receiver devices within the DMA.

3. The method of claim 1, further comprising:
    determining the Multicast/Broadcast Single Frequency Networks ("MBSFNs") to turn on based at least in part on a list of MBSFNs associated with the DMA.

4. The method of claim 1, wherein broadcasting the OTT television content to the one or more receiver devices further comprises broadcasting a unique ID associated with the broadcaster of the OTT television content.

5. The method of claim 4, wherein the unique ID is the broadcaster's Federal Communications Commission ("FCC") ID.

6. A server, comprising:
    a network interface configured to communicate with a communication network; and
    a processor coupled to the network interface, wherein the processor is configured with processor-executable instructions to perform operations comprising:
        broadcasting Over the Top ("OTT") television content including Dynamic Adaptive Streaming over HTTP ("DASH") media segments to one or more receiver devices via the network interface;
        determining a network traffic level for the OTT television content including DASH media segments in a Designated Market Area ("DMA");
        determining whether the network traffic level for the OTT television content including DASH media segments in the DMA exceeds a traffic level threshold; and
        switching from the broadcasting to evolved Multimedia Broadcast Multicast Service ("eMBMS") for the delivery of the OTT television content including DASH media segments in response to determining that the network traffic level for the OTT television content including DASH media segments in the DMA exceeds the traffic level threshold.

7. The server of claim 6, wherein the processor is configured with processor-executable instructions to perform operations further comprising:
    determining the Multicast/Broadcast Single Frequency Networks ("MBSFNs") to turn on based at least in part on a distribution of the one or more receiver devices within the DMA.

8. The server of claim 6, wherein the processor is configured with processor-executable instructions to perform operations further comprising:
    determining the Multicast/Broadcast Single Frequency Networks ("MBSFNs") to turn on based at least in part on a list of MBSFNs associated with the DMA.

9. The server of claim 6, wherein the processor is configured with processor-executable instructions to perform operations such that broadcasting the OTT television content to the one or more receiver devices further comprise broadcasting a unique ID associated with the broadcaster of the OTT television content.

10. The server of claim 9, wherein the processor is configured with processor-executable instructions to perform operations such that the unique ID is the broadcaster's Federal Communications Commission ("FCC") ID.

11. A non-transitory server readable medium having stored thereon server-executable instructions configured to cause a server to perform operations comprising:
    broadcasting Over the Top ("OTT") television content including Dynamic Adaptive Streaming over HTTP ("DASH") media segments to one or more receiver devices;
    determining a network traffic level for the OTT television content including DASH media segments in a Designated Market Area ("DMA");

determining whether the network traffic level for the OTT television content including DASH media segments in the DMA exceeds a traffic level threshold; and switching from the broadcasting to evolved Multimedia Broadcast Multicast Service ("eMBMS") for the delivery of the OTT television content including DASH media segments in response to determining that the network traffic level for the OTT television content including DASH media segments in the DMA exceeds the traffic level threshold.

12. The non-transitory server readable medium of claim 11, wherein the stored server-executable instructions are configured to cause a server to perform operations further comprising:

determining the Multicast/Broadcast Single Frequency Networks ("MBSFNs") to turn on based at least in part on a distribution of the one or more receiver devices within the DMA.

13. The non-transitory server readable medium of claim 11, wherein the stored server-executable instructions are configured to cause a server to perform operations further comprising:

determining the Multicast/Broadcast Single Frequency Networks ("MBSFNs") to turn on based at least in part on a list of MBSFNs associated with the DMA.

14. The non-transitory server readable medium of claim 11, wherein the stored server-executable instructions are configured to cause a server to perform operations such that broadcasting the OTT television content to the one or more receiver devices further comprise broadcasting a unique ID associated with the broadcaster of the OTT television content.

15. The non-transitory server readable medium of claim 14, wherein the stored server-executable instructions are configured to cause a server to perform operations such that the unique ID is the broadcaster's Federal Communications Commission ("FCC") ID.

* * * * *